(12) United States Patent
Ito et al.

(10) Patent No.: US 8,619,183 B2
(45) Date of Patent: Dec. 31, 2013

(54) IMAGE PICKUP APPARATUS AND OPTICAL-AXIS CONTROL METHOD

(75) Inventors: Hiroshi Ito, Osaka (JP); Makoto Kitagawa, Osaka (JP); Tomoya Shimura, Osaka (JP); Shinichi Arita, Osaka (JP); Satoru Inoue, Osaka (JP); Hirokazu Katakame, Osaka (JP); Sakae Saito, Osaka (JP); Shunichi Sato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 624 days.

(21) Appl. No.: 12/812,142

(22) PCT Filed: Jan. 9, 2009

(86) PCT No.: PCT/JP2009/050198
§ 371 (c)(1),
(2), (4) Date: Jul. 8, 2010

(87) PCT Pub. No.: WO2009/088068
PCT Pub. Date: Jul. 16, 2009

(65) Prior Publication Data
US 2010/0289941 A1    Nov. 18, 2010

(30) Foreign Application Priority Data

Jan. 10, 2008 (JP) ............... P2008-003075
Jul. 10, 2008 (JP) ............... P2008-180689

(51) Int. Cl.
| | | |
|---|---|---|
| H04N 5/232 | (2006.01) | |
| H04N 5/225 | (2006.01) | |
| G03B 13/00 | (2006.01) | |
| G02B 13/16 | (2006.01) | |
| G02F 1/03 | (2006.01) | |
| G02F 1/07 | (2006.01) | |
| G02F 1/153 | (2006.01) | |

(52) U.S. Cl.
USPC ........... 348/355; 348/345; 348/335; 348/354; 348/349; 359/245; 359/272; 359/253

(58) Field of Classification Search
USPC ............. 348/335–369, 42–50; 359/253, 272, 359/577–590
See application file for complete search history.

(56) References Cited

U.S. PATENT DOCUMENTS 5,132,802 A * 7/1992 Osthues et al. ............ 348/262
5,539,493 A * 7/1996 Kusaka .................... 396/96

(Continued)

FOREIGN PATENT DOCUMENTS

JP    5-7366 A    1/1993
JP    6-268894    9/1994

(Continued)

OTHER PUBLICATIONS

International Search Report for PCT/JP2009/050197 filed on Jan. 9, 2009.

(Continued)

*Primary Examiner* — Chia-Wei A Chen
(74) *Attorney, Agent, or Firm* — Birch, Stewart, Kolasch & Birch, LLP

(57) ABSTRACT

In order to perform adjustment of relative positions between an optical system and imaging devices, a plurality of the imaging devices, a plurality of solid lenses that form images of the imaging devices, and a plurality of optical-axis control units that control the direction of optical axes of light incident to the imaging devices are included.

10 Claims, 37 Drawing Sheets

(56) References Cited

U.S. PATENT DOCUMENTS

| | | | |
|---|---|---|---|
| 5,589,880 A * | 12/1996 | Tsukui | 348/229.1 |
| 5,631,697 A | 5/1997 | Nishimura et al. | |
| 5,907,434 A * | 5/1999 | Sekine et al. | 359/462 |
| 6,404,559 B1 * | 6/2002 | Chuang | 359/637 |
| 6,807,295 B1 * | 10/2004 | Ono | 382/154 |
| 2002/0117618 A1 * | 8/2002 | Schatz | 250/307 |
| 2003/0072566 A1 * | 4/2003 | Pastre | 396/20 |
| 2006/0104620 A1 | 5/2006 | Ebato | |
| 2006/0109540 A1 * | 5/2006 | Kueks et al. | 359/321 |
| 2006/0171696 A1 * | 8/2006 | Murata et al. | 396/72 |
| 2006/0291849 A1 * | 12/2006 | Shamir et al. | 396/334 |
| 2007/0047953 A1 * | 3/2007 | Kawai | 396/544 |
| 2007/0146503 A1 * | 6/2007 | Shiraki | 348/231.3 |
| 2007/0247733 A1 * | 10/2007 | Shiozawa et al. | 359/885 |
| 2007/0268600 A1 * | 11/2007 | Tsukagoshi | 359/754 |
| 2007/0279539 A1 * | 12/2007 | Suzuki et al. | 349/1 |
| 2008/0024614 A1 * | 1/2008 | Li et al. | 348/207.99 |
| 2008/0218612 A1 * | 9/2008 | Border et al. | 348/262 |
| 2009/0002505 A1 | 1/2009 | Imada | |
| 2009/0073544 A1 * | 3/2009 | Schweitzer et al. | 359/305 |
| 2009/0125242 A1 * | 5/2009 | Choi et al. | 702/19 |
| 2009/0168010 A1 * | 7/2009 | Vinogradov et al. | 349/200 |
| 2009/0180020 A1 * | 7/2009 | Nayar et al. | 348/335 |
| 2009/0185279 A1 * | 7/2009 | Goto | 359/629 |
| 2009/0296237 A1 * | 12/2009 | Bowers et al. | 359/724 |
| 2010/0194970 A1 * | 8/2010 | Kageyama | 348/349 |
| 2010/0208100 A9 * | 8/2010 | Olsen et al. | 348/227.1 |

FOREIGN PATENT DOCUMENTS

| | | |
|---|---|---|
| JP | 8-265804 A | 10/1996 |
| JP | 8-307776 A | 11/1996 |
| JP | 9-181960 | 7/1997 |
| JP | 11-252467 A | 9/1999 |
| JP | 2000-125169 A | 4/2000 |
| JP | 2000-193925 A | 7/2000 |
| JP | 2005-181720 A | 7/2005 |
| JP | 2005-277606 A | 10/2005 |
| JP | 2005-333336 A | 12/2005 |
| JP | 2006-139095 | 6/2006 |
| JP | 2006-217131 A | 8/2006 |
| JP | 2006-251613 A | 9/2006 |
| JP | 2007-520166 A | 7/2007 |
| WO | WO 2005/072370 A2 | 8/2005 |
| WO | WO 2007105804 A1 * | 9/2007 |
| WO | WO 2007/119468 A1 | 10/2007 |

OTHER PUBLICATIONS

International Search Report for PCT/JP2009/050198 mailed on Apr. 21, 2009.

* cited by examiner

FIG. 3
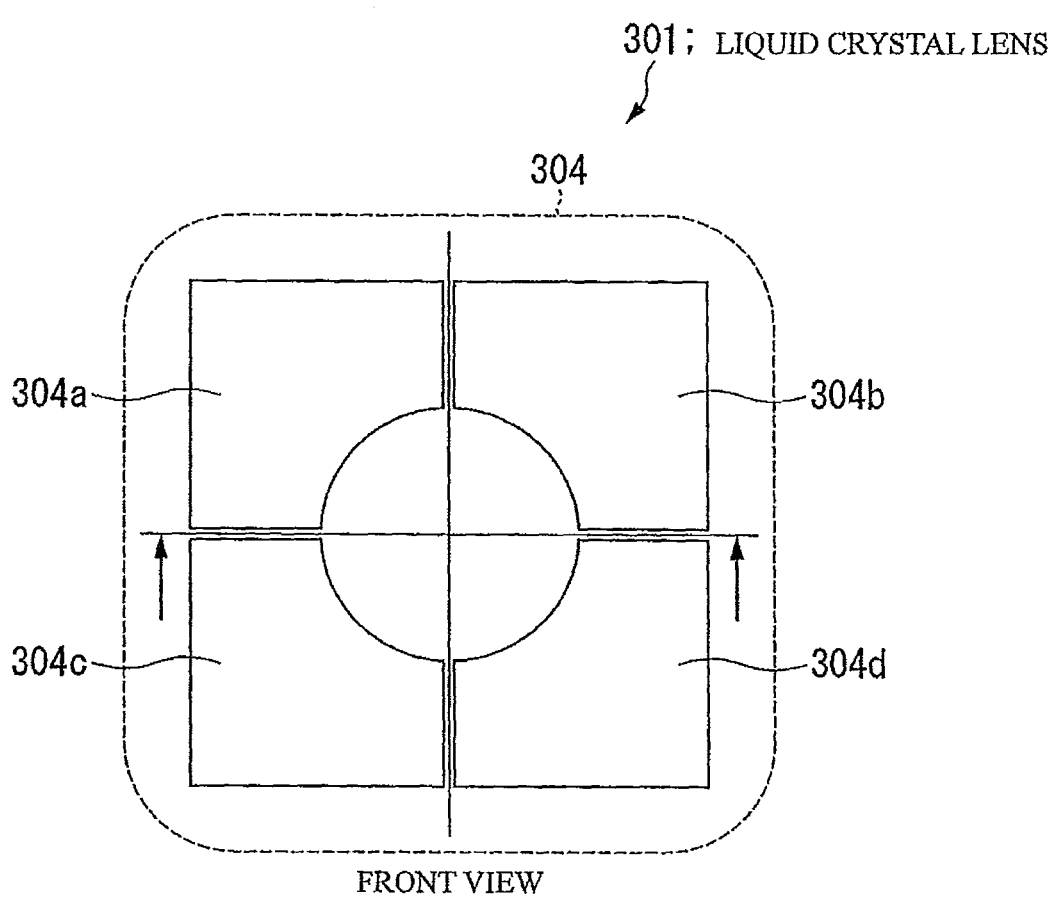
FRONT VIEW
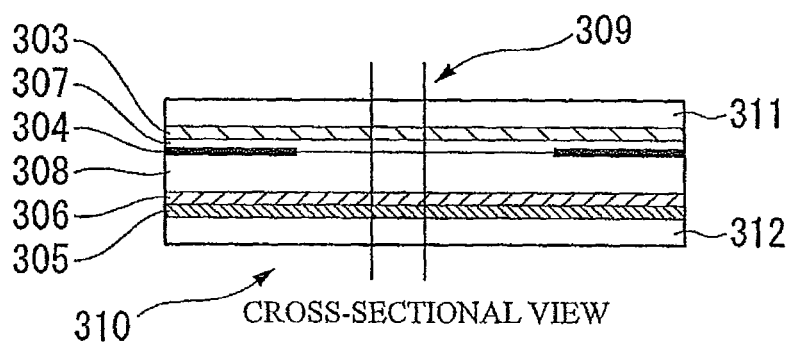
CROSS-SECTIONAL VIEW

Pu: PIXEL SIZE FOR u DIRECTION
Pv: PIXEL SIZE FOR v DIRECTION

Pu: PIXEL SIZE FOR u DIRECTION
Pv: PIXEL SIZE FOR v DIRECTION

Pu: PIXEL SIZE FOR u DIRECTION
Pv: PIXEL SIZE FOR v DIRECTION

Pu: PIXEL SIZE FOR u DIRECTION
Pv: PIXEL SIZE FOR v DIRECTION

IMAGE PICKUP APPARATUS AND
OPTICAL-AXIS CONTROL METHOD

TECHNICAL FIELD

The present invention relates to an image pickup apparatus and an optical-axis control method.

Priority is claimed on Japanese Patent Application No. 2008-003075, filed Jan. 10, 2008 and Japanese Patent Application No. 2008-180689, filed Jul. 10, 2008, the contents of which are incorporated herein by reference.

BACKGROUND ART

Recently, digital still cameras and digital video cameras (hereinafter, referred to as digital cameras) having high image quality have been widely used. In addition, developments for decreasing the size and the thickness of the digital camera have been made, and miniaturized digital cameras having high image quality have been built in mobile phone terminals and the like. An image pickup apparatus that is represented by a digital camera that includes an imaging device, an imaging optical system (lens optical system), an image processor, a buffer memory, a flash memory (card-type memory), an image monitor, and electronic circuits, mechanical mechanisms, and the like that control the above-described components. As the imaging devices, commonly, solid electronic devices such as CMOS (Complementary Metal Oxide Semiconductor) sensors and CCD (Charge Coupled Device) sensors are used. A photoelectric conversion process is performed for the light amount distribution imaged on the imaging device, and the acquired electrical signal is processed by the image processor and the buffer memory. As the image processor, a DSP (Digital Signal Processor) or the like is used. In addition, as the buffer memory, a DRAM (Dynamic Random Access Memory) or the like is used. The imaged image is recorded and stored in the card-type flash memory or the like, and the recorded and stored images can be displayed on a monitor.

The optical system that images an image on the imaging device is commonly configured by several aspheric lenses so as to eliminate aberration. In addition, in a case where an optical zoom function is included, a driving mechanism (actuator) that changes the focal length of a combined lens or spacing between the lens and the imaging device is needed.

In response to a request for implementing high image-quality and high functionality of the image pickup apparatus, the number of pixels of the imaging device is increased, and the resolution of the imaging device is raised. The aberration of the imaging optical system is lowered, and the resolution of the imaging optical system is raised. In addition, high functionality such as a zoom function, an auto-focus function, a hand-shake correcting function, and the like of the imaging optical system has advanced. Accordingly, the size of the image pickup apparatus is increased, and there is a problem in that it is difficult to decrease the size and the thickness thereof.

In order to solve such problems, an image pickup apparatus that is decreased in the size and the thickness by employing a compound eye structure in the imaging optical system or combining a non-solid lens such as a liquid crystal lens or a liquid lens is proposed. For example, an imaging lens device that is configured by a solid lens array disposed in a planar shape, a liquid crystal lens array, and one imaging device is proposed (for example, Patent Document 1). As shown in FIG. 38, the imaging lens device is configured by: a lens system that has a lens array 2001 having a fixed focal length; a variable focus-type liquid crystal lens array 2002 corresponding to the number of the lens array 2001; and a single imaging device 2003 that picks up an optical image that is imaged through this lens system. By employing such a configuration, images corresponding to the number of the lens arrays 2001 are imaged on the single imaging device 2003 in a divisional manner. Image processing is performed for a plurality of images acquired by the imaging device 2003 by using a calculation device 2004, and accordingly, the entire image is reconfigured. In addition, focus information is detected from the calculation device 2004, and auto-focus is performed by driving the liquid crystal lenses of the liquid crystal lens array 2002 through a liquid crystal driving device 2005. As described above, according to the imaging lens device of Patent Document 1, by combining a liquid crystal lens and a solid lens, the auto-focus function and the zoom function are implemented. In addition, the miniaturization of the above-described imaging lens device can be implemented.

In addition, there is an image pickup apparatus that is configured by one non-solid lens (a liquid lens or a liquid crystal lens), a solid lens array, and one imaging device (for example, Patent Document 2). As shown in FIG. 39, the image pickup apparatus is configured by a liquid crystal lens 2131, a compound-eye optical system 2120, an image synthesizer 2115, and a driving voltage calculating unit 2142. Similarly to Patent Document 1, the above-described image pickup apparatus forms images corresponding to the number of the lens arrays on a single imaging device 2105 and reconfigures an image through image processing. As described above, according to the image pickup apparatus of Patent Document 2, by combining one non-solid lens (a liquid lens or a liquid crystal lens array) and a solid lens array, a focus adjusting function can be implemented as a miniaturized apparatus of the thin type.

In addition, in a thin-type camera that is configured by a detector array as an imaging device and an imaging lens array and has a resolution of sub pixels, a method of increasing the resolution of the composed image by changing the relative positional deviation of two images on sub cameras has been known (for example, Patent Document 3). According to this method, a diaphragm is disposed in one sub camera, and light corresponding to half a pixel is blocked by this diaphragm. Accordingly, a problem in that the resolution cannot be enhanced in accordance with the subject distance is solved. In addition, according to Patent Document 3, a liquid lens capable of controlling a focal length by applying a voltage from the outside thereof is combined, and the imaging position of an image and the phase of a pixel are simultaneously changed by changing the focal length, whereby the resolution of the composed image is increased. As described above, according to the thin-type camera of Patent Document 3, high resolution of the composed image is implemented by combining an imaging lens array and an imaging device having a light shielding mechanism. In addition, by combining a liquid lens with the imaging lens array and the imaging device, high resolution of the composed image can be implemented.

Patent Document 1: Japanese Unexamined Patent Publication, First Publication No. 2006-251613
Patent Document 2: Japanese Unexamined Patent Publication, First Publication No. 2006-217131
Patent Document 3: PCT Japanese Translation Patent Publication No. 2007-520166

DISCLOSURE OF INVENTION

Problem to be Solved by the Invention

However, according to the imaging lens devices of Patent Documents 1 to 3, the accuracy of adjustment of the relative position of the optical system and the imaging device has influence on the image quality. Accordingly, there is a problem in that the adjustment needs to be performed precisely at the time of assembly. In addition, in a case where the adjustment of the relative position is performed depending only on a mechanical accuracy, a high precision non-solid lens or the like is needed, and there is a problem in that the cost is increased. In addition, even when the adjustment is accurately adjusted at the time of assembly of the device, the relative position of the optical system and the imaging device may change due to a temporal change or the like, whereby there is a case where the image quality deteriorates. When the positional adjustment is performed again, the image quality is enhanced. However, there is a problem in that the same adjustment as that performed at the time of assembly needs to be performed. In addition, in a device including many optical systems and many imaging devices, there are many portions to be adjusted, accordingly, there is a problem in that a tremendous amount of work time is needed.

The present invention is contrived in consideration of the above-described situations. The object of the present invention is to provide an image pickup apparatus and an optical-axis control method capable of performing adjustment of the relative position of the optical system and the imaging device without requiring a manual operation of the adjustment thereof for realizing a high image-quality image pickup apparatus.

Means for Solving the Problem

In accordance with an aspect of the present invention, a plurality of imaging devices; a plurality of solid lenses that form images of the imaging devices; and a plurality of optical-axis control units that control the direction of optical axes of light incident to the imaging devices are included.

In accordance with another aspect of the present invention, the optical-axis control unit is configured by a non-solid lens of which a refractive index distribution can be changed and deflects the optical axis of light incident to the imaging device by changing the refractive index distribution of the non-solid lens.

In accordance with another aspect of the present invention, the optical-axis control unit is configured by a refraction plate and an inclination angle changing mechanism that changes an inclination angle of the refraction plate and deflects the optical axis of light incident to the imaging device by changing the inclination angle of the refraction plate by using the inclination angle changing mechanism.

In accordance with another aspect of the present invention, the optical-axis control unit is configured by a variable apex-angle prism and deflects the optical axis of light incident to the imaging device by changing the apex angle of the variable apex-angle prism.

In accordance with another aspect of the present invention, the optical-axis control unit is configured by a movement mechanism that moves the solid lens and deflects the optical axis of light incident to the imaging device by moving the solid lens.

In accordance with another aspect of the present invention, the optical-axis control unit is configured by a movement mechanism that moves the imaging device and controls the optical axis of light incident to the imaging device by moving the imaging device.

In accordance with another aspect of the present invention, the optical-axis control unit controls the direction of the optical axis based on a relative positional relationship with respect to an imaging target that is known.

In accordance with another aspect of the present invention, each of the plurality of imaging devices has a different pixel pitch.

In accordance with another aspect of the present invention, each of the plurality of solid lenses has a different focal length.

In accordance with another aspect of the present invention, the plurality of imaging devices are disposed by being rotated around the optical axes by different angles.

In accordance with another aspect of the present invention, a plurality of imaging devices; a plurality of solid lenses that form images of the imaging devices; and a focus control unit that is configured by a non-solid lens of which a refractive index distribution can be changed and that changes the focal lengths of the solid lenses by changing the refractive index distribution of the non-solid lens are included.

In accordance with another aspect of the present invention, there is provided an optical-axis control method of an image pickup apparatus that includes: a plurality of imaging devices; a plurality of solid lenses that form images of the imaging devices; and a plurality of optical-axis control units that control the direction of optical axes of light incident to the imaging devices. The optical-axis control method includes: controlling directions of the optical axes based on a relative positional relationship between an imaging target that is known and the optical-axis control unit by using the plurality of optical-axis control units.

In accordance with another aspect of the present invention, there is provided an optical-axis control method of an image pickup apparatus that includes: a plurality of imaging devices: a plurality of solid lenses that form images of the imaging devices; and a focus control unit that is configured by a non-solid lens of which a refractive index distribution can be changed and that changes the focal lengths of the solid lenses by changing the refractive index distribution of the non-solid lens. The optical-axis control method including: controlling the focal lengths of the solid lenses based on a relative positional relationship between an imaging target that is known and the imaging devices by using the focus control unit.

Effect of the Invention

According to the present invention, a plurality of imaging devices; a plurality of solid lenses that form images of the imaging devices; and a plurality of optical-axis control units that control the direction of optical axes of light incident to the imaging devices are included. Accordingly, the adjustment of the relative position of the imaging optical system and the imaging device can be performed in an easy manner without requiring a manual operation. Therefore there is an advantage in that a high image-quality image pickup apparatus can be realized. In particular, the optical axis of incident light can be controlled to be set to an arbitrary position on the surface of the imaging device. Accordingly, a high image-quality image pickup apparatus capable of performing the positional adjustment between the optical system and the imaging device in a simple manner can be realized. In addition, the direction of the optical axis is controlled based on the relative positions of an imaging target and a plurality of optical-axis control units. Accordingly, the optical axis can be set to an arbitrary position on the surface of the imaging device, whereby an image pickup apparatus having a wide range of focal adjustment can be realized.

BRIEF DESCRIPTION OF THE DRAWINGS

FIG. 3 is a configuration diagram of a liquid crystal lens.

REFERENCE SYMBOLS

Figure 1:
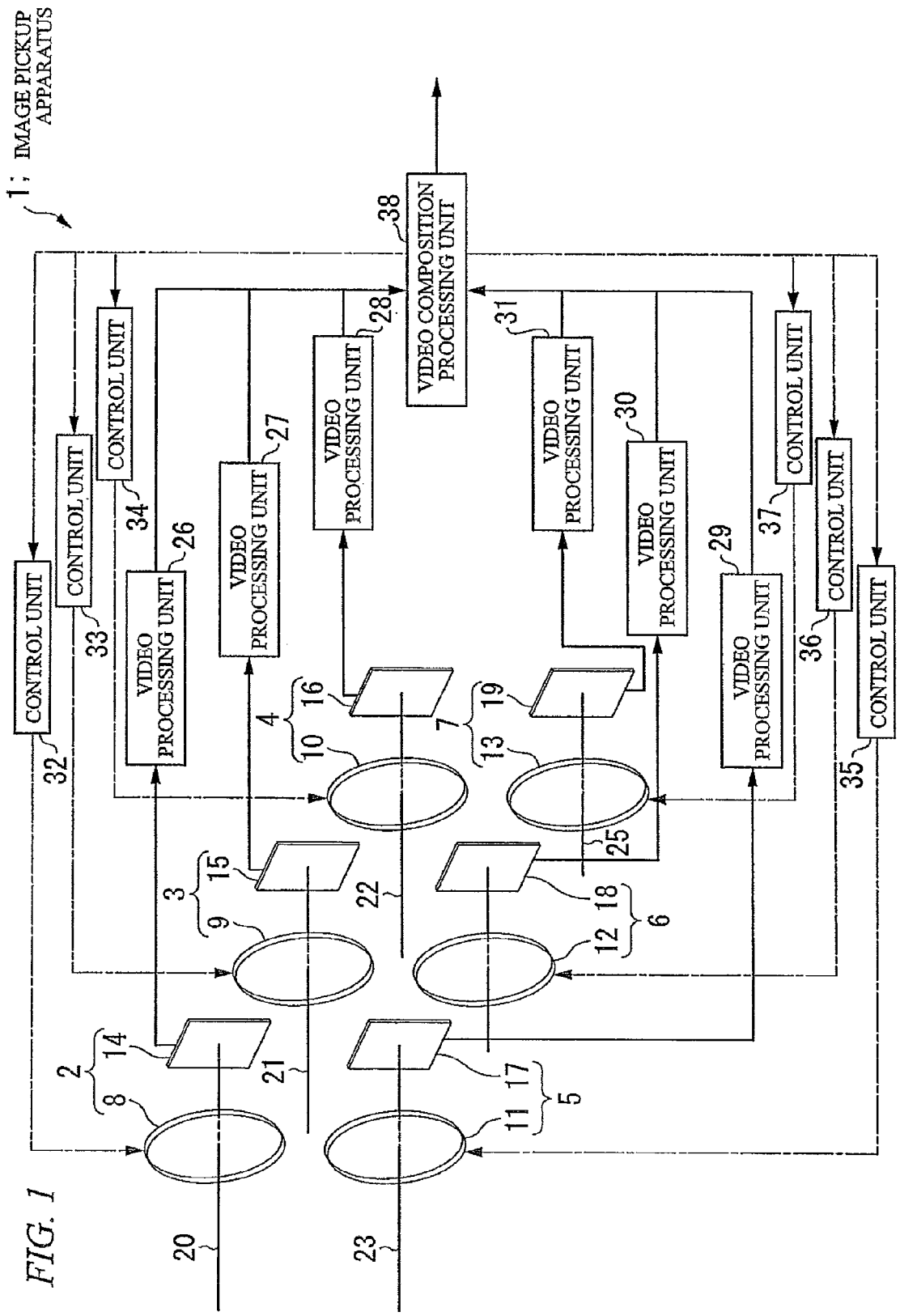
FIG. 1 is a block diagram showing the configuration of an image pickup apparatus according to a first embodiment of the present invention.

1: image pickup apparatus
2 to 7: unit imaging unit
8 to 13: imaging lens
14 to 19: imaging device
20 to 25: optical axis
26 to 31: video processing unit
32 to 37: control unit
38: video composition processing unit

BEST MODE FOR CARRYING OUT THE INVENTION

Hereinafter, embodiments of the present invention will be described in detail with reference to the accompanying drawings. FIG. 1 is a functional block diagram showing the entire configuration of an image pickup apparatus according to a first embodiment of the present invention. The image pickup apparatus 1 shown in FIG. 1 includes six systems of unit imaging units 2 to 7. The unit imaging unit 2 is configured by an imaging lens 8 and an imaging device 14. Similarly, the unit imaging unit 3 is configured by an imaging lens 9 and an imaging device 15, the unit imaging unit 4 is configured by an imaging lens 10 and an imaging device 16, the unit imaging unit 5 is configured by an imaging lens 11 and an imaging device 17, the unit imaging unit 6 is configured by an imaging lens 12 and an imaging device 18, and the unit imaging unit 7 is configured by an imaging lens 13 and an imaging device 19. Each imaging lens 8 to 13 images light transmitted from a photographing target on the corresponding imaging device 14 to 19. Reference numerals 20 to 25 shown in FIG. 1 represent the optical axes of light incident to the imaging devices 14 to 19.

Hereinafter, the flow of signals, for example, in the unit imaging unit 3 will be described. The imaging device 15 performs photoelectric conversion for an image imaged by the imaging lens 9, whereby an optical signal is converted into an electrical signal. The electrical signal converted by the imaging device 15 is converted into a video signal based on parameters set in advance by a video processing unit 27. The video processing unit 27 outputs the converted video signal to a video composition processing unit 38. The video composition processing unit 38 receives the video signals acquired by performing the conversion process for the electrical signals that are output by different unit imaging units 2 and 4 to 7 by using the corresponding video processing units 26 and 28 to 31 as inputs. The video composition processing unit 38 composes one video signal that is acquired by synchronizing six video signals imaged by the unit imaging units 2 to 7 and outputs the video signal as a high-resolution video. In addition, when the composed high-resolution video is degraded more than a determination value set in advance, the video composition processing unit 38 generates control signals based on the result of the determination and outputs the control signals to the six control units 32 to 37. The control units 32 to 37 controls the optical axes of the corresponding imaging lenses 8 to 13 based on the input control signals. Then, the video composition processing unit 38 performs determination for the high-resolution video again. When the result of the determination is accepted, the video composition processing unit 38 outputs the high-resolution video. On the other hand, when the result of the determination is not accepted, the video composition processing unit 38 repeats the operation of controlling the imaging lenses again.

Next, detailed configurations of the imaging lens 9 of the unit imaging unit 3 shown in FIG. 1 and the control unit 33 controlling this imaging lens 9 will be described with reference to FIG. 2. The unit imaging unit 3 is configured by a liquid crystal lens (non-solid lens) 301 and an optical lens (solid lens) 302. In addition, the control unit 33 is configured by four voltage control sections 33a, 33b, 33c, and 33d that control a voltage applied to the liquid crystal lens 301. The voltage control sections 33a, 33b, 33c, and 33d control the liquid crystal lens 301 by determining the voltage applied to the liquid crystal lens 301 based on the control signals generated by the video composition processing unit 38. Since the imaging lenses and the controls units of the other unit imaging units 2 and 4 to 7 shown in FIG. 1 have the same configuration, a detailed description thereof is omitted here.

Next, the configuration of the liquid crystal lens 301 shown in FIG. 2 will be described with reference to FIG. 3. The liquid crystal lens 301 according to this embodiment is configured by a transparent first electrode 303; a second electrode 304; a transparent third electrode 305; a liquid crystal layer 306 that is interposed between the second electrode 304 and the third electrode 305; a first insulating layer 307 that is interposed between the first electrode 303 and the second electrode 304; a second insulating layer 308 that is interposed between the second electrode 304 and the third electrode 305; a third insulating layer 311 that is disposed on the outer side of the first electrode 303; and a fourth insulating layer 312 that is disposed on the outer side of the third electrode 305. Here, the second electrode 304 has a circular hole. As shown in the front view of FIG. 3, the second electrode 304 is configured by four electrodes 304a, 304b, 304c, and 304d that are vertically and horizontally divided. Accordingly, independent voltages can be applied to the electrodes. In addition, in the liquid crystal layer 306, liquid crystal molecules are aligned in one direction so as to face the third electrode 305. Thus, by applying a voltage between the electrodes 303, 304, and 305 having the liquid crystal layer 306 interposed therebetween, alignment of the liquid crystal molecules is controlled. In addition, the insulating layer 308 has a large diameter and, for example, transparent glass having a thickness of about several hundred μm or the like is used.

As an example, the dimension of the liquid crystal lens 301 is represented as below. The size of the circular hole of the second electrode 304 is about φ2 mm, a gap between the first electrode 303 and the second electrode is 70 μm, and the thickness of the second insulating layer 308 is 700 μm. The thickness of the liquid crystal layer 306 is 60 μm. In this embodiment, the first electrode 303 and the second electrode 304 are formed in different layers. However, the first electrode 303 and the second electrode 304 may be formed on a same face. In such a case, the first electrode 303 has a circular shape smaller than the circular hole of the second electrode 304, is disposed in the position of the hole of the second electrode 304, and has a configuration in which an electrode extracting portion is disposed in the division portion of the second electrode 304. At this time, independent voltage control can be performed for the first electrode 303 and the electrodes 304a, 304b, 304c, and 304d configuring the second electrode. By employing such a configuration, the entire thickness can be decreased.

Next, the operation of the liquid crystal lens 301 shown in FIG. 3 will be described. In the liquid crystal lens 301 shown in FIG. 3, by simultaneously applying a voltage between the transparent third electrode 305 and the second electrode 304, which is configured by an aluminum foil or the like, and applying a voltage between the first electrode 303 and the second electrode 304, an electric field gradient that is axis-symmetrical to the center axis 309 of the second electrode 304 having the circular hole can be formed. In accordance with the axis-symmetrical electric field gradient formed on the periphery of the edge of the circular electrode described as above, the liquid crystal molecules of the liquid crystal layer 306 are aligned in the direction of the electric field gradient. As a result, in accordance with a change in the alignment distribution of the liquid crystal layer 306, the refractive index distribution of extraordinary light changes in the center of the circular electrode up to the periphery thereof. Accordingly, the liquid crystal layer 306 can serve as a lens. The refractive index distribution of this liquid crystal layer 306 can be freely changed based on a method of applying the voltage between the first electrode 303 and the second electrode 304. Therefore, the optical characteristic of the liquid crystal layer 306 can be freely controlled to be like a convex lens, a concave lens, or the like.

In this embodiment, an effective voltage of 20 Vrms is applied between the first electrode 303 and the second electrode 304, an effective voltage of 70 Vrms is applied between the second electrode 304 and the third electrode 305, and an effective voltage of 90 Vrms is applied between the first electrode 303 and the third electrode 305, whereby the liquid crystal layer serves as a convex lens. Here, the liquid crystal driving voltage (the voltage applied between the electrodes) has an AC waveform of a sinusoidal wave or a square wave having a duty ratio of 50%. The value of the applied voltage is represented by an effective voltage (rms: root mean square value). For example, the AC sinusoidal wave of 100 Vrms is a voltage waveform having peak values of ±144 V. In addition, as the frequency of the AC voltage, for example, 1 kHz is used. Furthermore, by applying different voltages between the electrodes 304a, 304b, 304c, and 304d configuring the second electrode 304 and the third electrode 305, the refractive index distribution that is axis-symmetrical at a time when a same voltage is applied becomes an asymmetrical distribution of which the axis is deviated with respect to the center axis 309 of the second electrode having the circular hole. Accordingly, an advantage can be acquired in that incident light deviates from the straight travelling direction. In such a case, by appropriately changing the voltage applied between the divided second electrode 304 and the third electrode 305, the direction of deviation of the incident light can be changed. For example, by applying 70 Vrms between the electrode 304a and the electrode 305 and between the electrode 304c and the electrode 305 and applying 71 Vrms between the electrode 304b and the electrode 305 and between the electrode 304d and the electrode 305, the position of the optical axis that is denoted by a reference numeral 309 is shifted to the position denoted by a reference numeral 310. The amount of the shift, for example, is 3 µm.

Figure 4:
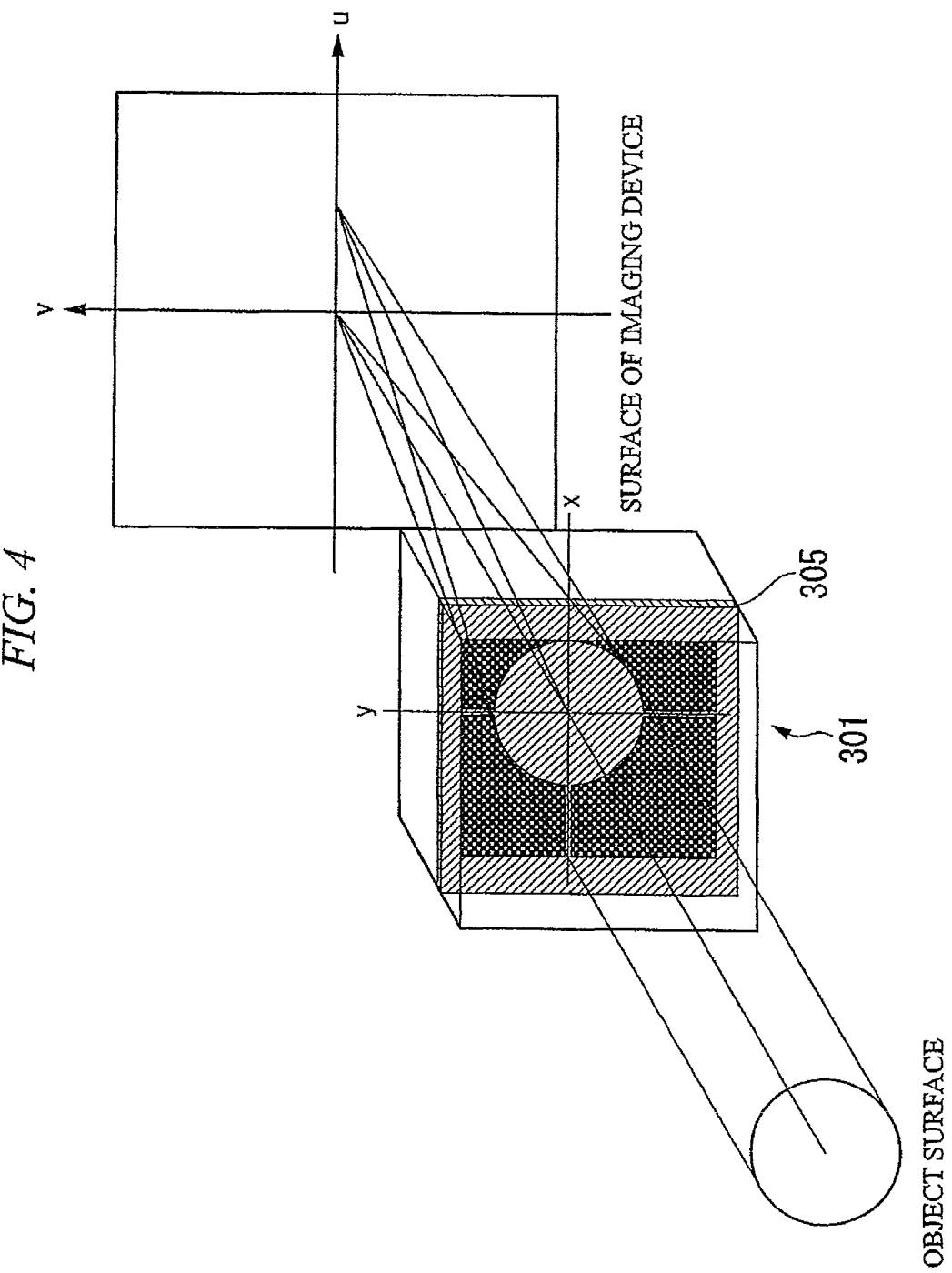
FIG. 4 is a schematic diagram illustrating the function of a liquid crystal lens used in an image pickup apparatus according to the first embodiment.

FIG. 4 is a schematic diagram illustrating the optical-axis shifting function of the liquid crystal lens 301. As described above, by controlling the voltages applied between the electrodes 304a, 304b, 304c, and 304d configuring the second electrode and the third electrode 305 for each of the electrodes 304a, 304b, 304c, and 304d, the center axis of the imaging device and the center axis of the refractive index distribution of the liquid crystal lens can be displaced from each other. Since this corresponds to displacing of the lens within the xy plane for the surface of the imaging device, light beams input to the imaging device can be deflected within the uv plane.

Figure 2:
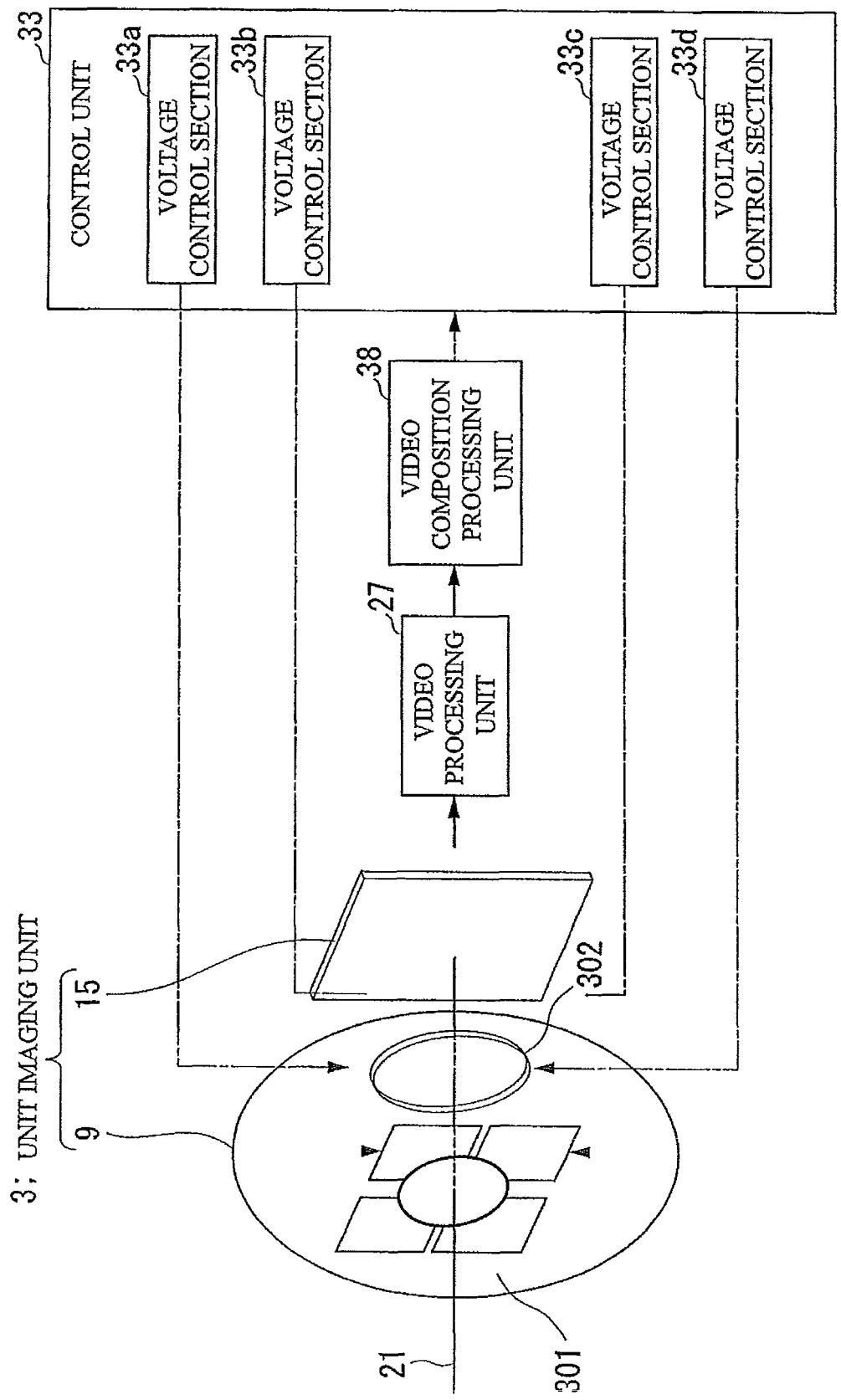
FIG. 2 is a detailed configuration diagram of a unit imaging unit of the image pickup apparatus according to the first embodiment shown in FIG. 1.
Figure 5:
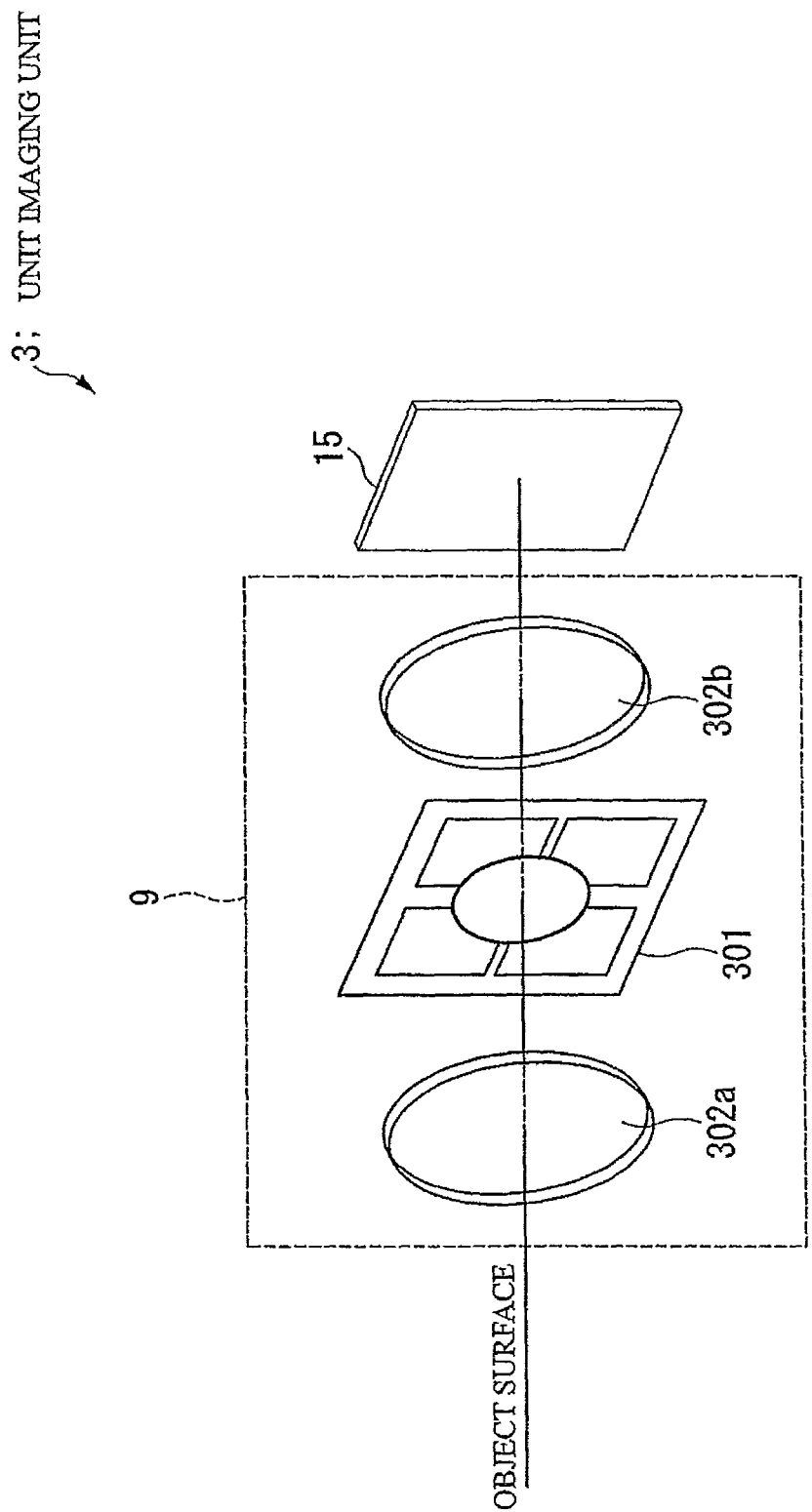
FIG. 5 is a schematic diagram illustrating a liquid crystal lens of an image pickup apparatus according to the first embodiment.

FIG. 5 shows a detailed configuration of the unit imaging unit 3 shown in FIG. 2. The optical lens 302 of the unit imaging unit 3 is configured by two optical lenses 302a and 302b, and the liquid crystal lens 301 is interposed between the optical lens 302a and the optical lens 302b. Each of the optical lenses 302a and 302b is configured by one or a plurality of lenses. The light beams incident from the object surface are collected by the optical lens 302a disposed on the object surface side of the liquid crystal lens 301 and are incident to the liquid crystal lens 301 in the state in which the spot thereof is decreased. At this time, the incident angle of the beams incident to the liquid crystal lens 301 is in the state being approximately parallel to the optical axis. The light beams outgoing from the liquid crystal lens 301 is imaged on the surface of the imaging device 15 by the optical lens 302b that is disposed on the imaging device 15 side of the liquid crystal lens 301. By employing such a configuration, the diameter of the liquid crystal lens 301 can be decreased, and a decrease in the voltage applied to the liquid crystal lens 301, an increase in the lens effect, and a decrease in the thickness of the lens according to a decrease in the thickness of the second insulating layer 308 can be achieved.

In the image pickup apparatus 1 shown in FIG. 1, a configuration in which one imaging lens is disposed for one imaging device is used. However, a configuration in which a plurality of the second electrodes 304 is configured on a same substrate of the liquid crystal lens 301, and a plurality of liquid crystal lenses is integrally formed may be used. In other words, the hole portion of the second electrode 304 of the liquid crystal lens 301 corresponds to a lens. Thus, by disposing the pattern of a plurality of the second electrodes 304 on one substrate, the hole portion of each of the second electrodes 304 has a lens effect. Accordingly, by disposing a plurality of the second electrodes 304 on the same substrate in accordance with the disposition of a plurality of imaging devices, a single liquid crystal lens unit can cover all the imaging devices.

In addition, in the description presented above, the number of the liquid crystal layer is one. However, by decreasing the thickness of one layer and configuring a plurality of layers, the responsiveness can be improved with collecting of light being maintained to the same degree. The reason for this is based on the characteristic that the response speed deteriorates as the thickness of the liquid crystal layer is increased. In addition, in a case where the liquid crystal layer is configured by a plurality of layers, by changing the polarization directions of the liquid crystal layers, the lens effect can be acquired for the light beams incident to the liquid crystal lens in all the polarization directions. In addition, the number of divided electrodes is described as being four as an example. However, the number of divided electrodes can be changed in accordance with the desired movement direction.

Figure 6:
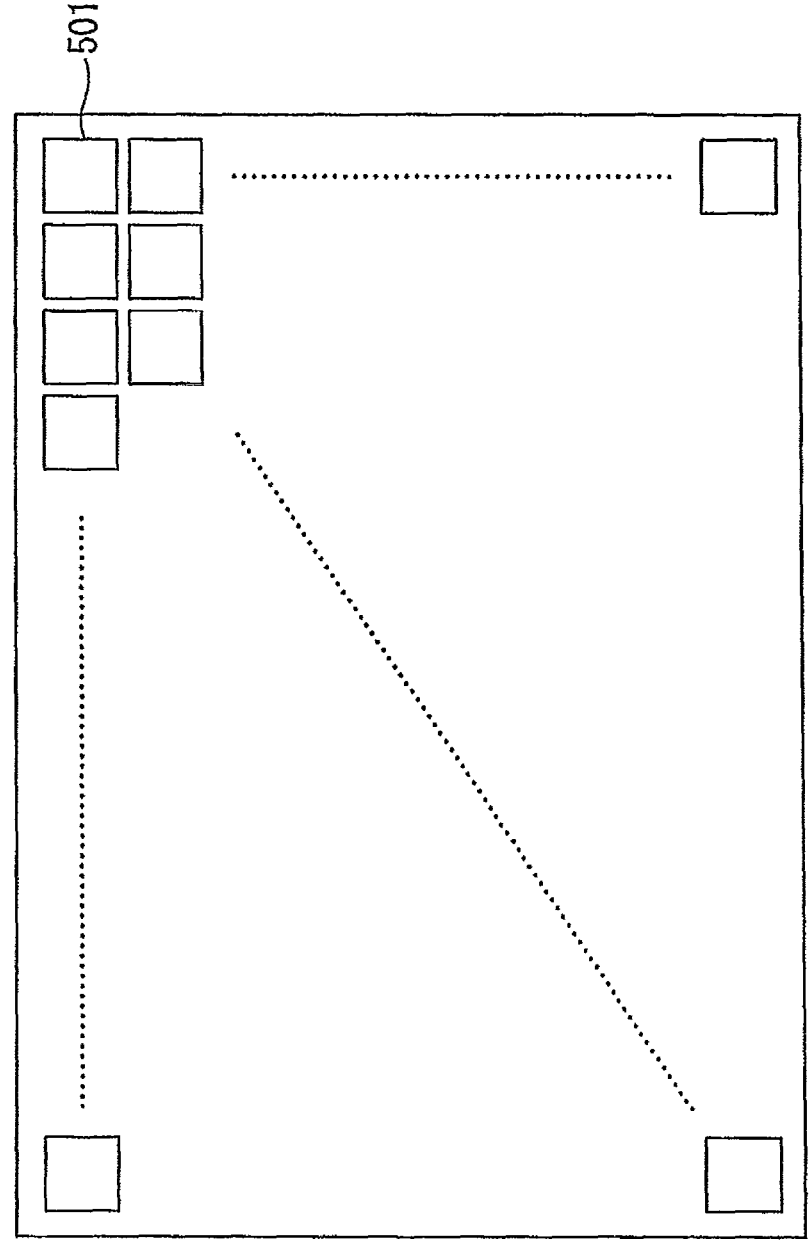
FIG. 6 is a schematic diagram illustrating an imaging device of the image pickup apparatus according to the first embodiment shown in FIG. 1.

Next, the configuration of the imaging device 15 shown in FIG. 1 will be described with reference to FIGS. 6 and 7. As the imaging device of the image pickup apparatus according to this embodiment, a CMOS imaging device can be used as an example. As shown in FIG. 6, the imaging device 15 is configured by two-dimensionally arranged pixels 501. The pixel size of the CMOS imaging device of this embodiment is 5.6 µm×5.6 µm, the pixel pitch thereof is 6 µm×6 µm, and the number of effective pixels is 640 (horizontal)×480 (vertical). Here, a pixel is a minimum unit for an image pickup operation performed by the imaging device. Commonly, one pixel corresponds to one photoelectric conversion device (for example, a photodiode). Within each pixel size of 5.6 µm×5.6 µm, there is a light sensing portion that has an area (spatial expansion). The pixel averages and integrates light incident to the light sensing portion so as to be the intensity of the light and converts the light into an electrical signal. The time during which the light is averaged is controlled by an electronic shutter, a mechanical shutter, or the like. Generally, the operating frequency coincides with the frame frequency of a video signal output by the image pickup apparatus, and is, for example, 60 Hz.

Figure 7:
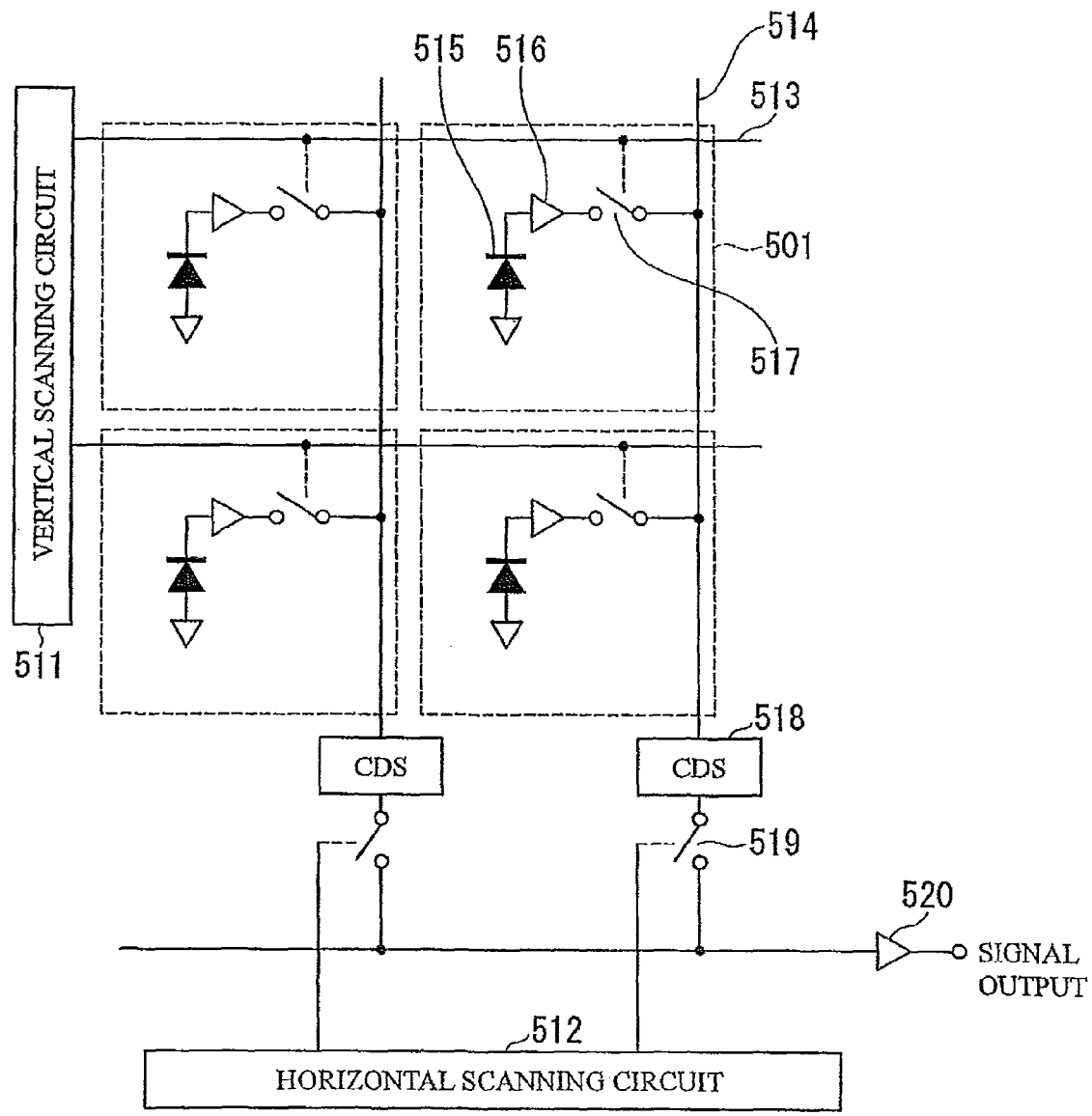
FIG. 7 is a detailed schematic diagram of an imaging device.

FIG. 7 shows a detailed configuration of the imaging device 15. The pixel 501 of the CMOS imaging device 15 amplifies signal electric charges, which have been photoelectrically converted by a photodiode 515, by using an amplifier 516. The signal of each pixel is selected by a vertical scanning circuit 511 and a horizontal scanning circuit 512 in a vertical and horizontal address mode and is extracted as a voltage or as a current. A CDS (Correlated Double Sampling) 518 is a circuit that performs correlated double sampling and can suppress 1/f noise out of random noise generated by the amplifier 516 or the like. Pixels other than the pixel 501 have the same configuration and functions. In addition, since the CMOS imaging devices can be produced in a massive scale by applying a CMOS logic LSI manufacturing process, the cost of the CMOS imaging device can be decreased, compared to a CCD image sensor having a high-voltage analog circuit. In addition, there are advantages in that power consumption is low due to miniaturization of the elements thereof, and smear or blooming does not occur in principle. In this embodiment, the monochrome CMOS imaging device 15 is used. However, color filters of R, C, and B may be individually installed for each pixel so as to be used as a color CMOS imaging device. In addition, by using a Bayer pattern in which repetitions of R, and B are arranged in a check pattern, the colors can be implemented in a simple manner by using one imaging device.

Figure 8:
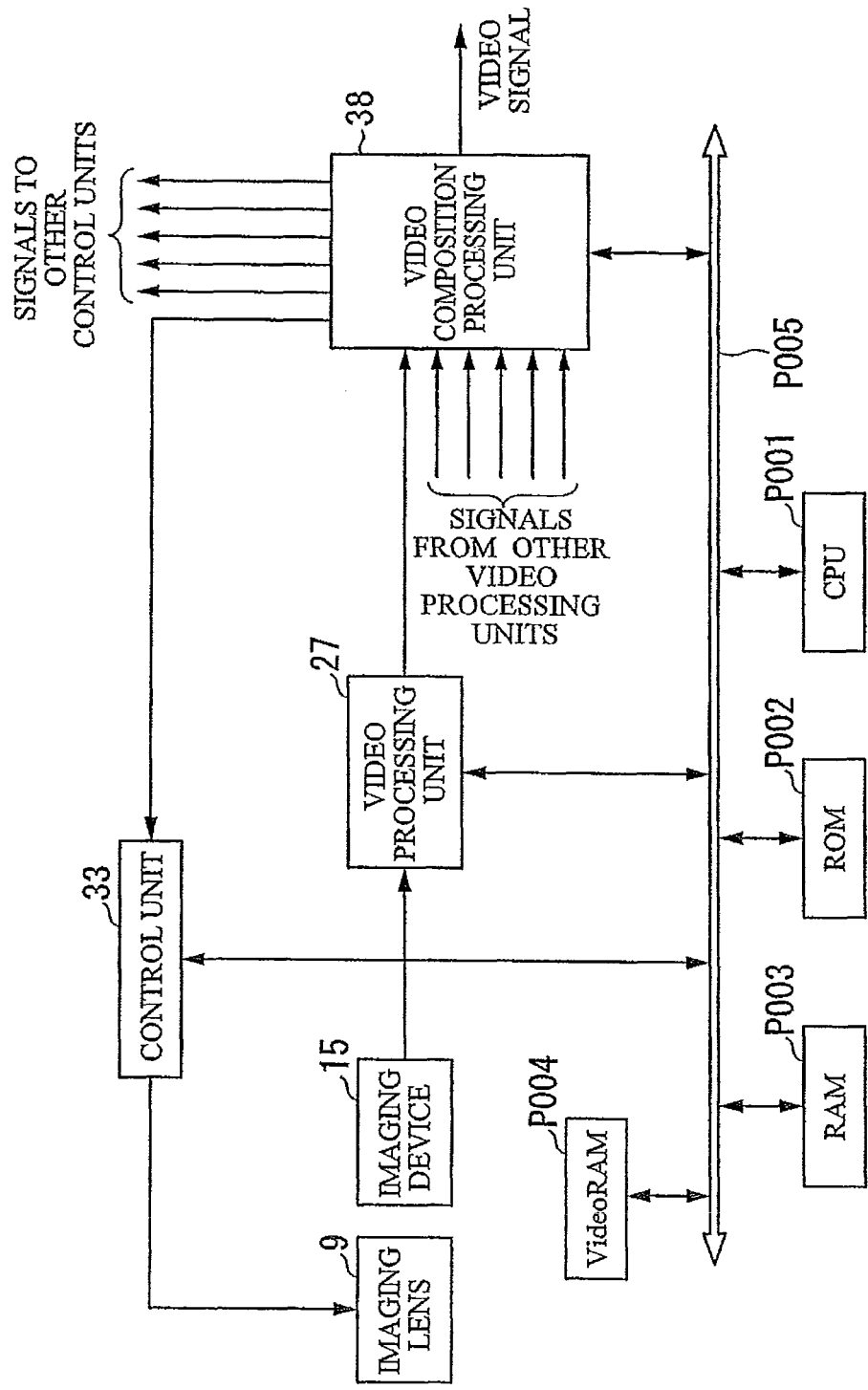
FIG. 8 is a block diagram showing the entire configuration of the image pickup apparatus 1 shown in FIG. 1.

Next, the entire configuration of the image pickup apparatus 1 will be described with reference to FIG. 8. In FIG. 8, the same reference numeral is assigned to the same portions that are shown in FIG. 1, and a description thereof is omitted. In FIG. 8, P001 is a CPU (Central Processing Unit) that controls the overall processing operation of the image pickup apparatus 1 and may be called a micro controller (microcomputer). P002 is a ROM (Read Only Memory) that is configured by a non-volatile memory and stores set values needed for programs of the CPU P001 or each processing unit. P003 is a RAM (Random Access Memory) and stores temporary data of the CPU. P004 is a Video RAM, is mainly used for storing video signals, image signals during a calculation process, and is configured by an SDRAM (Synchronous Dynamic RAM) or the like.

FIG. 8 is a configuration in which the RAM P003 is included for storing programs of the CPU P001 and the Video RAM P004 is included for storing images. However, for example, a configuration may be used in which the two RAM blocks are uniformly configured by the Video RAMs P004. P005 is a system bus. To the system bus P005, the CPU P001, the ROM P002, the RAM P003, the Video RAM P004, the video processing unit 27, the video composition processing unit 38, and the control unit 33 are connected. In addition, the system bus P005 is also connected to internal blocks of the video processing unit 27, the video composition processing unit 38, and the control unit 33 that will be described later. The CPU P001 controls the system bus P005 as a host, and setting data needed for video processing, image processing, and optical-axis control flows in two-way directions.

In addition, for example, when an image in the middle of a calculation process of the video composition processing unit 38 is stored in the Video RAM P004, this system bus P005 is used. A bus for an image signal requiring a high transmission speed and a low-speed data bus may be configured as different bus lines. To the system bus P005, an interface with an external device such as a USB or a flash memory not shown in the figure or a display driving controller of a liquid crystal display as a viewfinder is connected.

Figure 9:
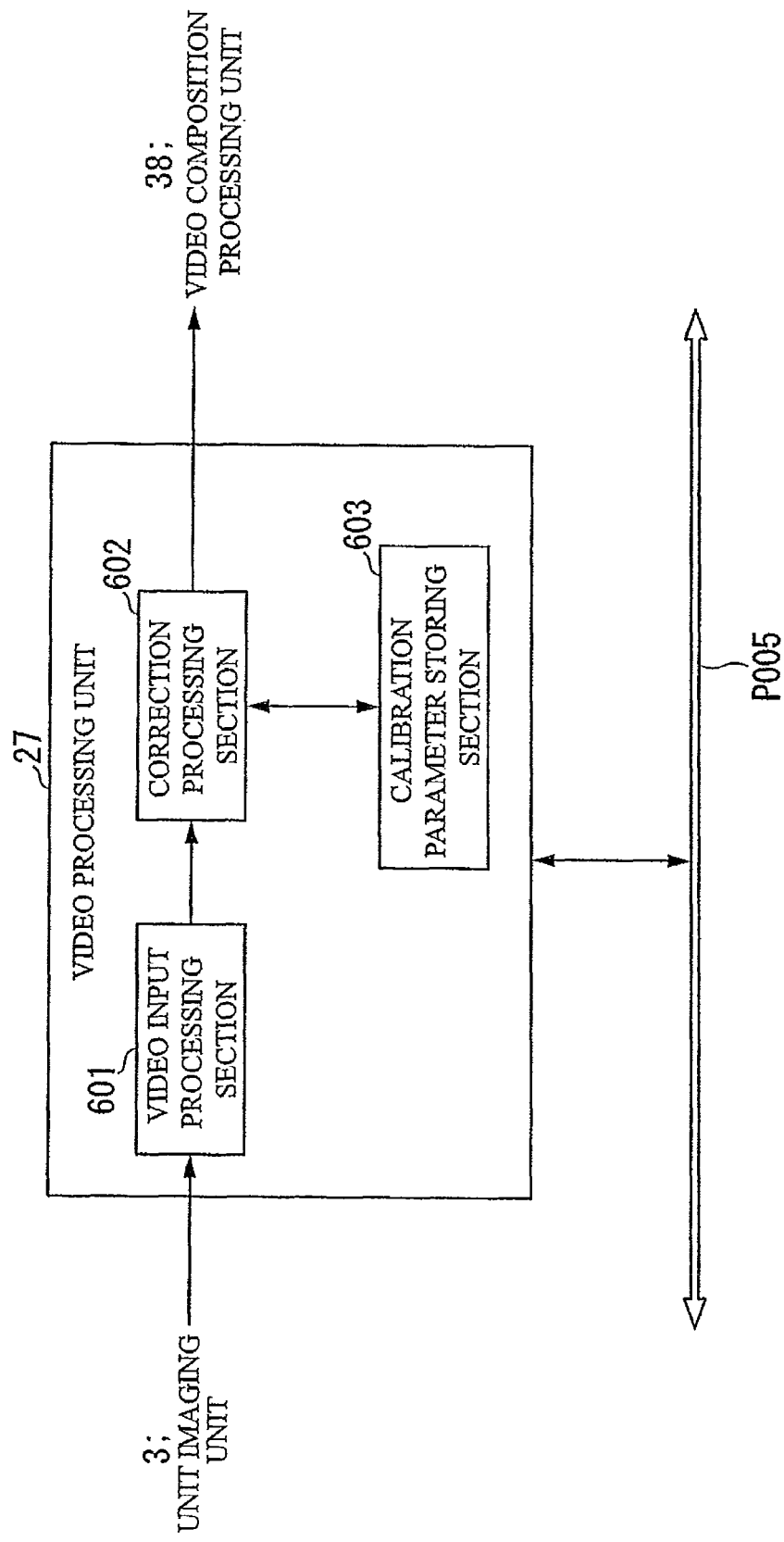
FIG. 9 is a detailed block diagram of a video processing unit of an image pickup apparatus according to the first embodiment.

Next, the processing operations of the video processing unit 27 and the video composition processing unit 38 will be described with reference to FIGS. 9 and 10. FIG. 9 is a block diagram showing the configuration of the video processing unit 27. In FIG. 9, 601 is a video input processing section, 602 is a correction processing section, and 603 is a calibration parameter storing section. The video input processing section 601 inputs a video signal taken from the unit imaging unit 3 and, for example, performs a signal process such as a knee process or a gamma process for the video signal and controls white balance. The output of the video input processing section 601 is passed to the correction processing section 602, and a correction process for distortion is performed based on the calibration parameters acquired by a calibration process to be described later. For example, distortion caused by installation error of the imaging device 15 is calibrated, The calibration parameter storing section 603 is a RAM (Random Access Memory) and stores a calibration value (calibrated value) therein. The correction-completed video signal that is the output from the correction processing section 602 is output to the video composition processing unit 38. The data stored in the calibration parameter storing section 603, for example, is updated by the CPU P001 when the power of the image pickup apparatus is turned on. Alternatively, the calibration parameter storing section 603 may be configured as a ROM (Read Only Memory), and input data may be determined in the calibration process at the time of factory shipment and may be stored in the ROM.

The video input processing section 601, the correction processing section 602, and the calibration parameter storing section 603 are connected to the system bus P005. For example, the characteristics of the above-described gamma process of the video input processing section 601 is stored in the ROM P002. The video input processing section 601 receives data stored in the ROM P002 through the system bus P005 in accordance with the program of the CPU P001. In addition, the correction processing section 602 writes out image data in the middle of a calculation process into the Video RAM P004 or reads out the image data from the Video RAM P004 through the system bus P005. In this embodiment, the imaging device 15 that is the monochrome CMOS is used. However, in a case where a color CMOS imaging device is used, for example, in a case where the imaging device has a Bayer pattern, a Bayer interpolation process is performed by the video processing section 601.

Figure 10:
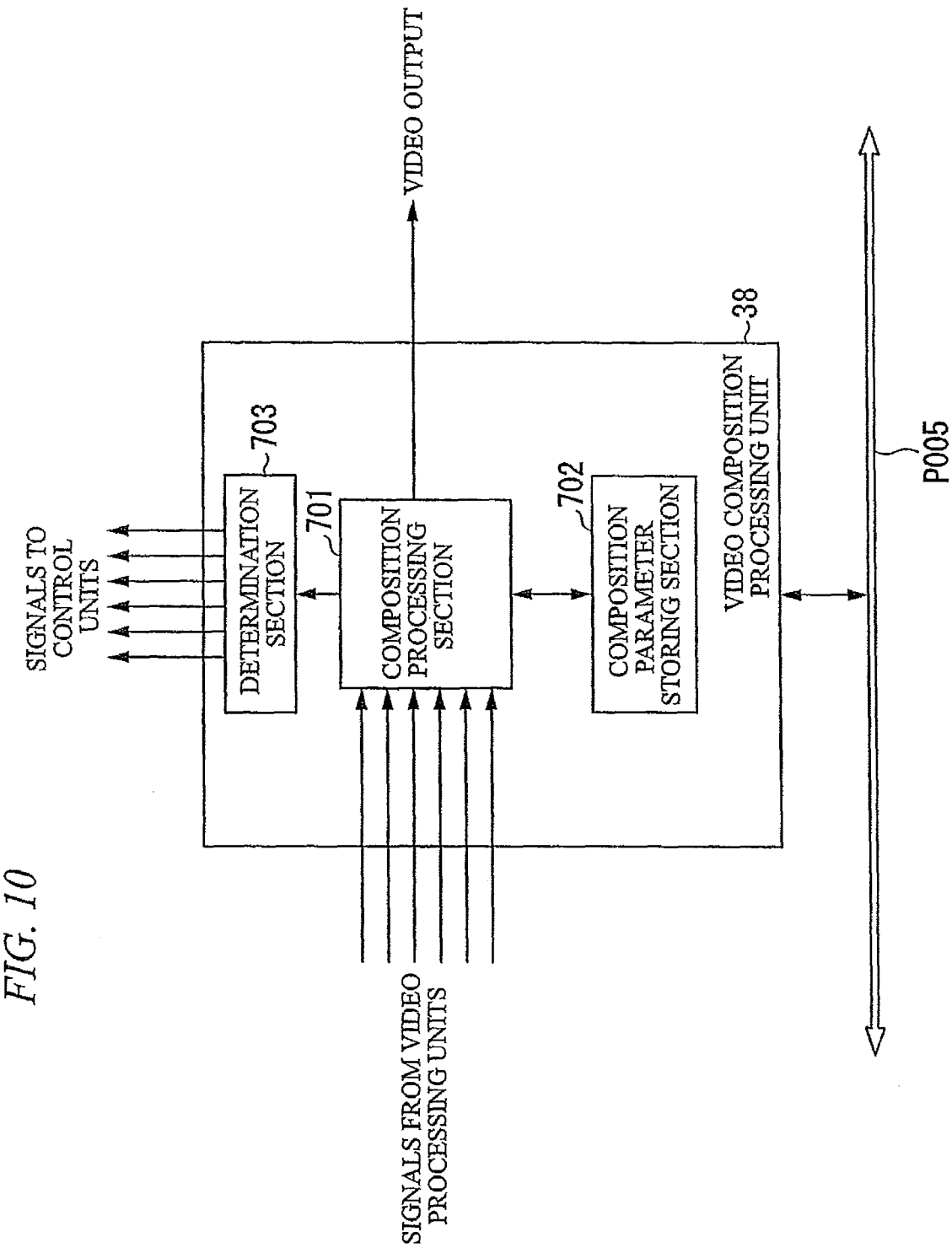
FIG. 10 is a detailed block diagram of an image composition processing unit of image processing of an image pickup apparatus according to the first embodiment.

FIG. 10 is a block diagram showing the configuration of the image composition processing unit 38. A composition processing section 701 performs a composition process for the imaging results of a plurality of the unit imaging units 2 to 7. By performing the composition process, the resolution of the image to be described later can be improved. A composition parameter storing section 702, for example, stores data of the amount of image shift that is acquired from three-dimensional coordinates between the unit imaging units, for example, derived by the calibration to be described later. The composition processing section 701 combines images by being shifted based on the shift amount. A determination section 703 detects the power of the high frequency-band component of the video signal, for example, by performing a Fourier transform of the result of the composition process. Here, a case where the composition process is performed, for example, for four unit imaging units will be assumed. The imaging device is assumed to be the wide VGA (854 pixels× 480 pixels).

In addition, the video output that is the output of the video composition processing unit 38 is assumed to be a high vision signal (1920 pixels×1080 pixels). In such a case, the frequency band determined by the determination section 703 is about 20 MHz to 30 MHz. The upper limit of the frequency band of a video frequency that can be reproduced by a video signal of the wide VGA is about 10 MHz to 15 MHz. By performing a composition process by using the composition processing section 701 by using this wide VGA signal, a component of 20 MHz to 30 MHz is restored. Here, although the imaging device is the wide VGA, there is a condition that the imaging optical system, which is mainly configured by imaging lenses 8 to 13, has characteristics for not deteriorating the frequency band of the high vision signal.

The control units 32 to 37 are controlled such that the power of the frequency band (the component of 20 MHz to 30 MHz in the example described above) of the video signal after this composition becomes the maximum. For a determination in the frequency axis, the determination section 703 performs a Fourier transform process and determines the magnitude of energy at frequencies that are equal to or higher than a specific frequency (for example, 20 MHz) as the result of the process.

The effect of reproduction of the video signal frequency band that exceeds the frequency band of the imaging device changes in accordance with a phase at a time when an image imaged on the imaging device is sampled in a range determined based on the size of the pixel. In order to allow this phase to be in an optimized state, the imaging lenses 8 to 13 are controlled by using the control units 32 to 37. In particular, the control unit 33 controls the liquid crystal lens 301 of the imaging lens 9. By controlling the balance of the voltages applied to the divided electrodes 304a, 304b, 304c, and 304d of the liquid crystal lens 301, as shown in FIG. 4, an image formed on the imaging device surface is moved. The ideal state of the result of the control is the state in which the sampled phases of the imaging results of the unit imaging units are shifted in the horizontal, vertical, and inclined directions by half of the pixel size. In a case where such an ideal state is formed, the energy of the high frequency band of the result of the Fourier transform becomes the maximum. In other words, the energy of the result of the Fourier transform is controlled to be the maximum by the control of the liquid crystal lens and a feedback loop that determines the composition process of the results thereof.

As described above, in this control method, the imaging lens 2 and the imaging lenses 4 to 7 are controlled through the control units 32 and 34 to 37 other than the control unit 33 with a video signal output from the video processing unit 27 used as a reference. In such a case, the optical-axis phase of the imaging lens 2 is controlled by the control unit 32. The optical-axis phases of the other imaging lenses 4 to 7 are controlled in the same manner. The phase control is performed for a size smaller than the pixel of each imaging device, whereby the offset of phases that are averaged by the imaging device is optimized. In other words, a sampled phase at a time when the image imaged on the imaging device is sampled by the pixel is controlled to be in an ideal state for implementing high resolution by controlling the optical-axis phase. As a result, it is possible to compose a high resolution video signal having high image quality. The determination section 703 determines the result of the composition process. Then, when a high-resolution video signal having high image quality is composed, the determination section 703 maintains the control value and outputs the high-resolution video signal having high image quality as video. On the other hand, when a high-resolution video signal having high image quality is not composed, the determination section 703 controls the imaging lens again.

Here, in order to set phases of the pixel of the imaging device 1 and the formed image as an imaging target to be equal to or less than the size of the pixel, a sub-pixel is defined so as to be named thereby. However, the structure of the sub-pixel dividing the pixel does not actually exist on the imaging device. In addition, the output of the video composition processing unit 38, for example, is a video signal. The output of the video composition processing unit 38 is output to a display not shown in the figure or passed to an image recording unit not shown in the figure and is recorded in a magnetic tape or an IC card. The composition processing section 701, the composition parameter storing section 702, and the determination section 703 are connected to the system bus P005. The composition parameter storing section 702 is configured by a RAM. For example, the composition parameter storing section 702 is updated through the system bus P005 by the CPU P001 when the power of the image pickup apparatus is turned on. In addition, the composition processing section 701 writes the image data in the middle of a calculation process into the Video RAM P004 through the system bus P005 or reads out the image data from the Video RAM P004.

Figure 11:
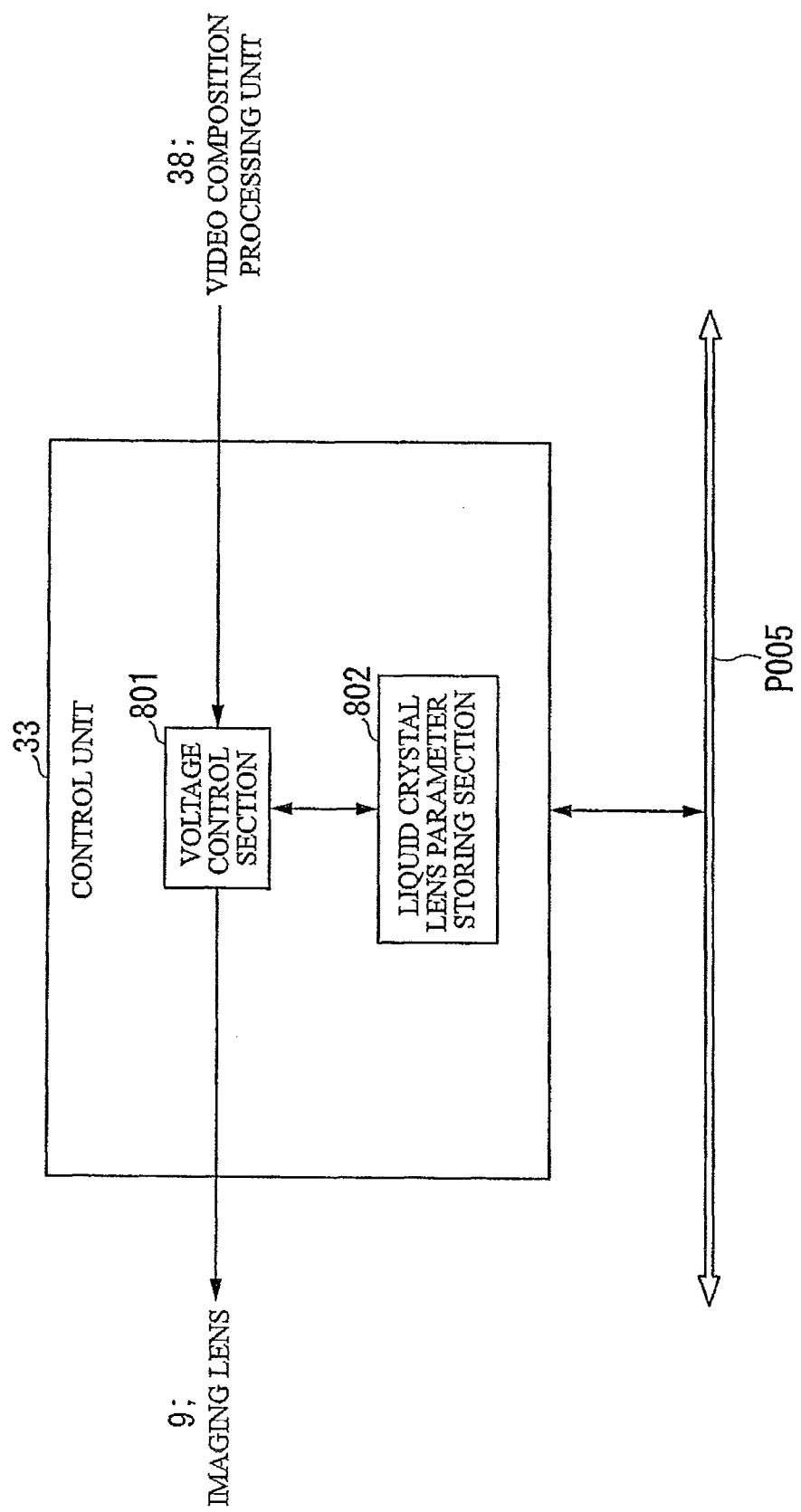
FIG. 11 is a detailed block diagram of a control unit of image processing of an image pickup apparatus according to the first embodiment.

Next, the configuration of the control unit 33 will be described with reference to FIG. 11. In FIG. 11, 801 is a voltage control section, and 802 is a liquid crystal lens parameter storing section 802. The voltage control section 801 controls voltages of electrodes of the liquid crystal lens 301 included in the imaging lens 9 in accordance with a control signal transmitted from the determination section 703 of the video composition processing unit 38. The controlled voltages are determined with the parameter values read out from the liquid crystal lens parameter storing section 802 used as a reference.

By performing such a process, the electric field distribution of the liquid crystal lens 301 is ideally controlled, and as shown in FIG. 4, the optical axis is controlled. As a result, the photoelectric conversion in the imaging device 15 is performed in the state in which the taken phase is corrected. By performing such control, the phase of the pixel is ideally controlled. As a result, the resolution of the video output signal is improved. When the control result of the control unit 33 is in the ideal state, detection of energy of the result of the Fourier transform that is the process of the determination section 703 becomes the maximum. In order to form such a state, the control unit 33 configures a feedback loop formed by the imaging lens 9, the video processing unit 27, and the video composition processing unit 38, whereby controlling the liquid crystal lens so as to increase the energy of the high band frequency. The voltage control section 801 and the liquid crystal lens parameter storing section 802 are connected to the system bus P005. The liquid crystal lens parameter storing section 802, for example, is configured by a RAM and is updated by the CPU P001 through the system bus P005 when the power of the image pickup apparatus 1 is turned on.

In addition, the calibration parameter storing section 603, the composition parameter storing section 702, and the liquid crystal lens parameter storing section 802 shown in FIGS. 9 to 11 may be configured to use the same RAM or ROM by separating addresses for storage. In addition, the calibration parameter storing section 603, the composition parameter storing section 702, and the liquid crystal lens parameter storing section 802 may be configured to use a part of the addresses of the ROM P002 or the RAM P003.

Figure 12:
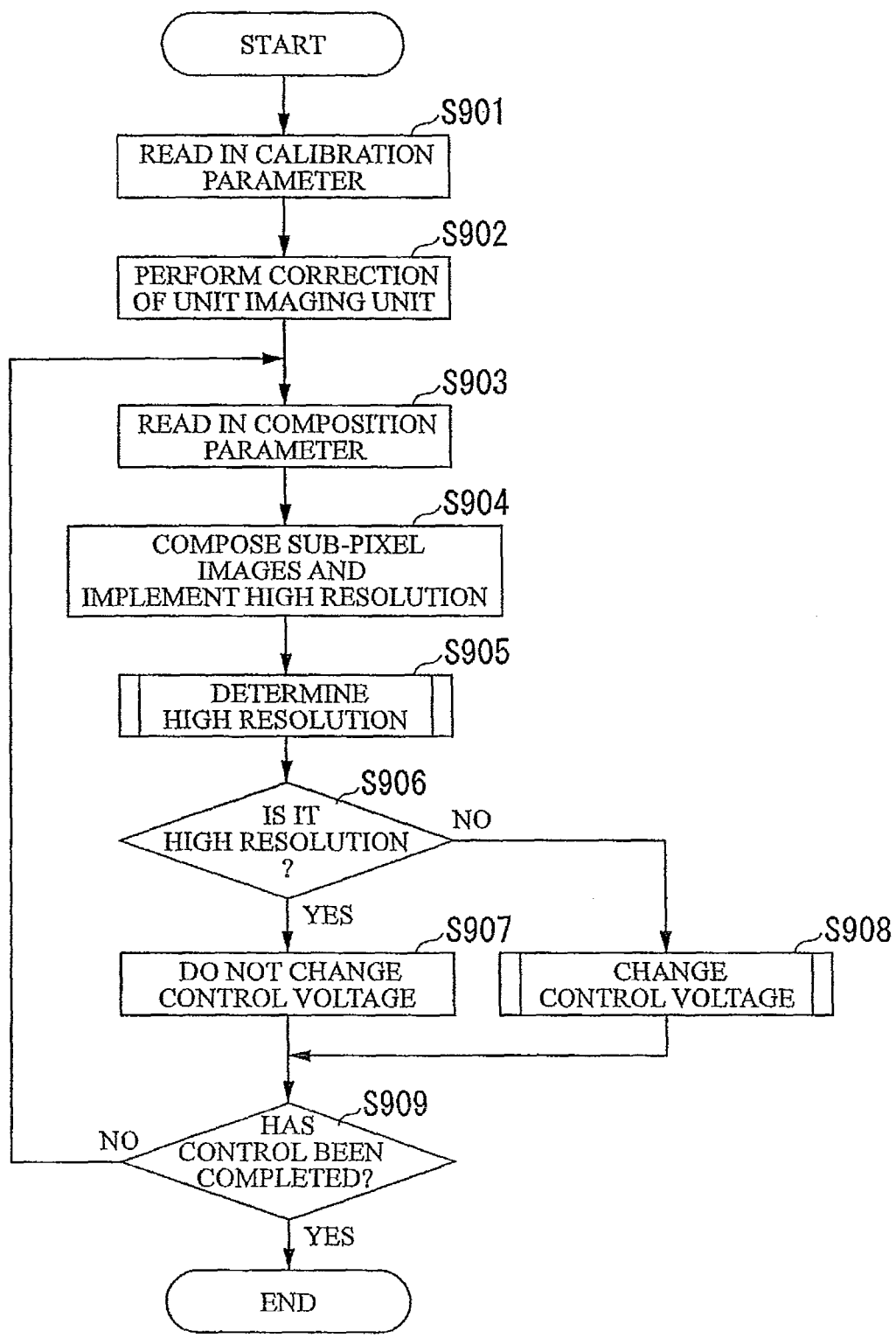
FIG. 12 is a flowchart illustrating an example of the operation of a control unit

Next, the control operation of the image pickup apparatus 1 will be described. FIG. 12 is a flowchart representing the operation of the image pickup apparatus 1. Here, an example in which spatial frequency information of a video is used in a video composition process is shown. First, when the CPU P001 directs a starting of a control process, the correction processing section 602 reads in calibration parameters from the calibration parameter storing section 603 (Step S901). The correction processing section 602 performs correction for each of the unit imaging units 2 to 7 based on the read-out calibration parameters (Step S902). This correction eliminates distortion of each of the unit imaging units 2 to 7 to be described later. Next, the composition processing section 701 reads in composition parameters from the composition parameter storing section 702 (Step S903). Then, the composition processing section 701 performs a sub-pixel video composition high-resolution implementing process is performed based on the read-in composition parameters (Step S904). To be described later, a high-resolution image is built based on information having different phases in units of one sub-pixel.

Next, the determination section 703 performs determination on high resolution (Step S905) and determines whether or not high resolution is achieved (Step S906). The determination section 703 maintains a threshold value for determination therein, determines the degree of high resolution, and passes the information on the determination result to the control units 32 to 37. When the high-resolution is achieved, the control units 32 to 37 do not change the control voltages, and the liquid crystal lens parameters are maintained to have the same values (Step S907). On the other hand, when high-resolution is determined not to have been achieved, the control units 32 to 37 change the control voltages of the liquid crystal lens 301 (Step S908). The CPU P001 manages the control completion condition and, for example, determines whether or not the power-off condition of the apparatus is satisfied (Step S909). When the control completion condition is not satisfied, the process returns to Step S903, and the process is repeated. On the other hand, when the control completion condition is satisfied, the process is completed. In addition, as the control completion condition, it may be configured that the number of times, such as ten times, of determining the high-resolution is set in advance when the power of the apparatus is turned on, and the process of Steps S903 to S909 is repeated for the set number of times.

Figure 13:
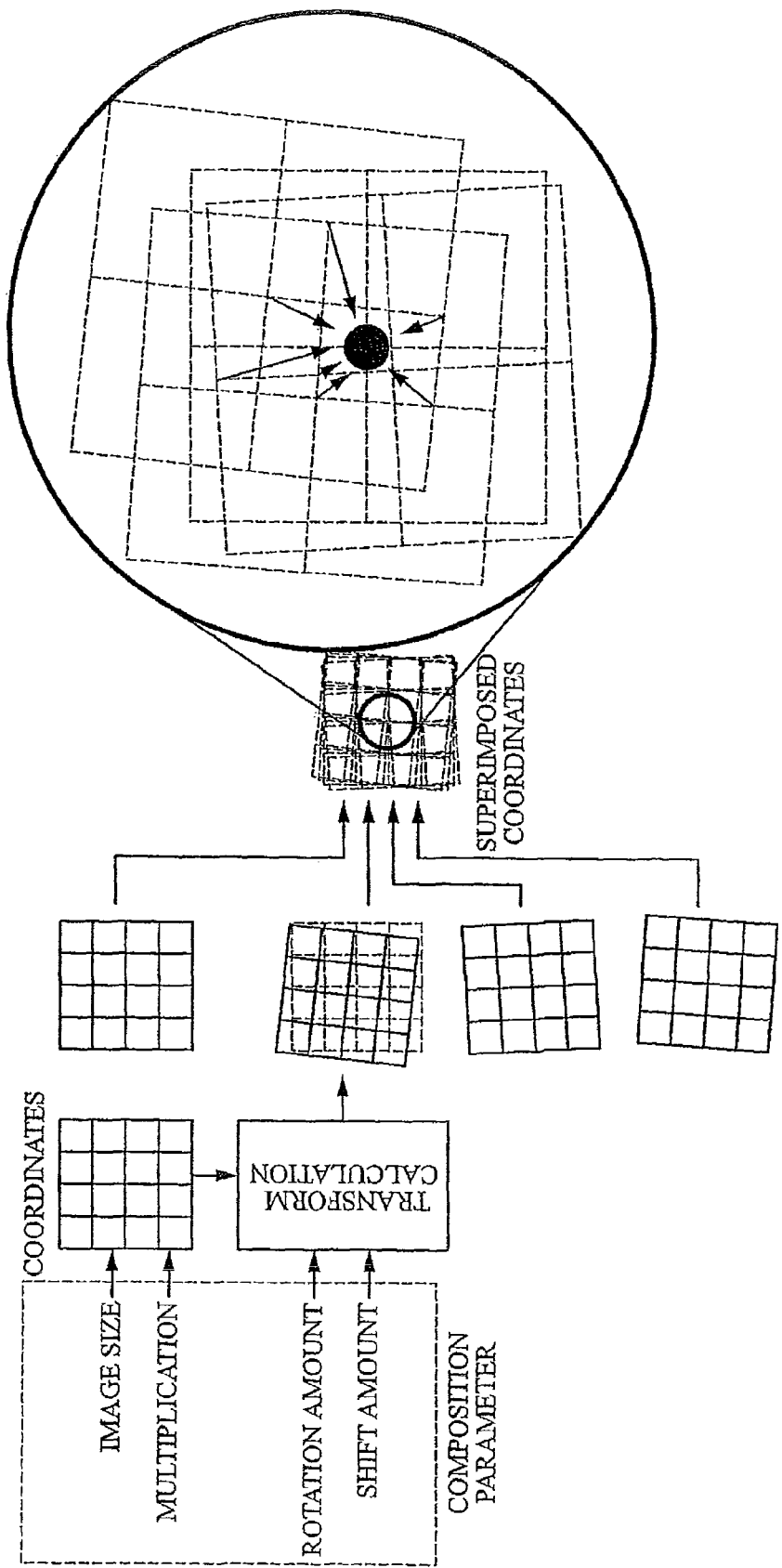
FIG. 13 is an explanatory diagram representing the operation of a sub-pixel video composition high-resolution implementation process shown in FIG. 12.

Next, the operation of the sub-pixel video composition high-resolution implementing process (Step S904) shown in FIG. 12 will be described with reference to FIG. 13. The image size, the magnification, the rotation amount, and the shift amount are the composition parameters and are parameters that are read out from the composition parameter storing section 702 in the composition parameter reading process (Step S903). Here, a case where one high-resolution image is acquired from four unit imaging units will be assumed. Four images imaged by individual unit imaging units are superimposed in one coordinate system by using the parameters of the rotation amount and the shift amount. Then, filter calculation is performed based on a weighting coefficient according to four images and a distance. For example, a cubic (third order approximation) filter is used. The weighting w acquired from a pixel located at a distance of d is as in the following equation.

$$w = 1 - 2 \times d^2 + d^3 \quad (0 \le d < 1)$$
$$= 4 - 8 \times d + 5 \times d^2 - d^3 \quad (1 \le d < 2)$$
$$= 0 \quad (2 \le d)$$

Figure 14:
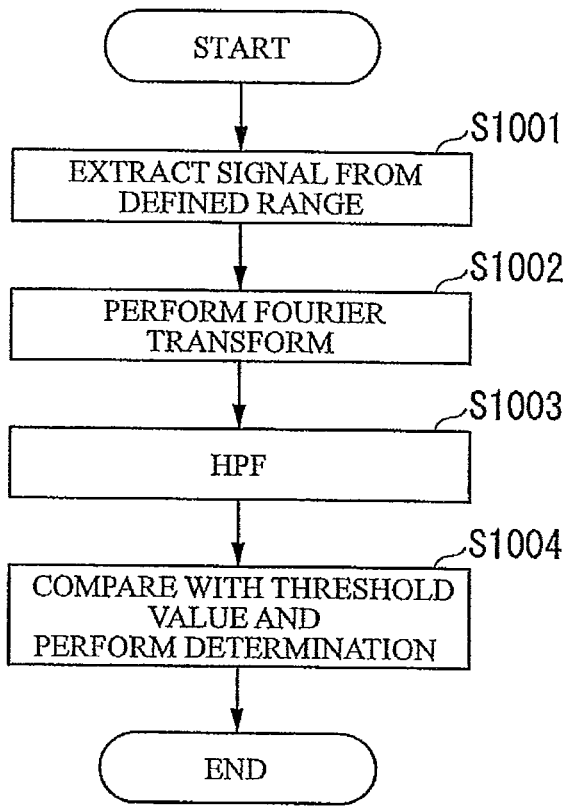
FIG. 14 is a flowchart illustrating an example of a high-resolution determination.

Next, a detailed operation of the high-resolution determining process (Step S905) performed by the determination section 703 shown in FIG. 12 will be described with reference to FIG. 14. First, the determination section 703 extracts signals in a defined range (Step S1001). For example, in a case where one screen in units of one frame is the defined range, a frame memory block not shown in the figure is included, and a signal corresponding to one screen is stored in advance. For example, when the VGA resolution is used, one screen is two-dimensional information formed by 640×480 pixels. The determination section 703 performs a Fourier transform for this two-dimensional information, whereby information on the time axis is converted into information on the frequency axis (Step S1002). Next, a high frequency-band signal is extracted by an HPF (High pass filter) (Step S1003). For example, a case where the aspect ratio of the imaging device 9 is 4:3, the signal of the imaging device 9 is a VGA signal (640 pixels×480 pixels) of 60 fps (Frame Per Second) (progressive), and the video output signal that is the output of the video composition processing unit is Quad-VGA will be assumed. A case where the limiting resolution of the VGA signal is about 8 MHz, and a signal of 10 MHz to 16 MHz is reproduced in the composition process will be assumed. In such a case, the HPF, for example, has characteristics of passing components of frequencies of 10 MHz or higher. The determination section 703 makes determination by comparing the signal of 10 MHz or higher with a threshold value (Step S1004). Regarding the threshold value, for example, the threshold value of energy of 10 MHz or higher is set to 0.5 in a case where the DC (direct current) component of the result of the Fourier transform is "1", and the threshold value is used for the comparison.

In the description presented above, a case where a Fourier transform is performed with an image corresponding to one frame of an imaging result having specific resolution being used as a reference has been described. However, when the defined range is defined in units of one line (in units of repetition of horizontal synchronization, and in units of 1920 pixels corresponding to the number of effective pixels for the case of the high vision), the frame memory block is not necessary. Accordingly, the scale of the circuit can be decreased. In such a case, for example, in the case of the high vision signal, the degree of high resolution of one screen may be determined by repeatedly performing a Fourier transform 1080 times that is, for example, the number of lines and by integrating determinations on comparison with the threshold value that are performed 1080 times in units of one line. In addition, the degree of high resolution may be determined by using several frames of the results of determinations on comparison with the threshold value in units of one screen. As described above, by making a comprehensive determination based on the plurality of determination results, the effect of unexpected noise and the like can be eliminated. In addition, although a fixed threshold value may be used for the threshold value determination, the threshold value may be adaptively changed. In addition, it may be configured that the characteristics of an image for the determination are additionally extracted, and the threshold value is changed based on the result thereof. For example, the characteristics of an image may be extracted by detecting a histogram. In addition, the current threshold value may be changed in association with the past determination result.

Figure 15:
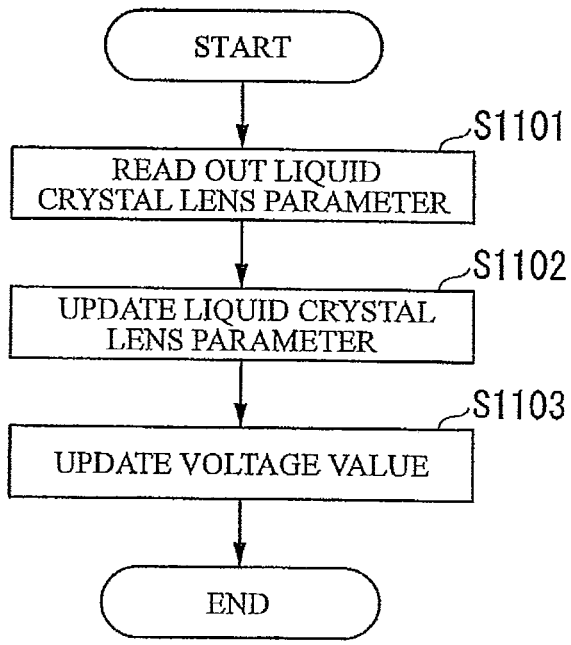
FIG. 15 is a flowchart illustrating an example of a control voltage changing process.

Next, a detailed operation of the control voltage changing process (Step S908) performed by the control units 32 to 37 shown in FIG. 12 will be described with reference to FIG. 15. Here, only the processing operation of the control unit 33 is described as an example. However, the processing operations of the control units 32 and 34 to 37 are the same. First, the voltage control section 801 reads out the current parameter values of the liquid crystal lens from the liquid crystal lens parameter storing section 802 (Step S1101). Then, the voltage control section 801 updates the parameter values of the liquid crystal lens (Step S1102). The liquid crystal lens parameters have history of the past. In a case where, as the history of the past, the voltage of the voltage control unit 33a is in the middle of increasing to 40 V, 45 V, 50 V, and 5 V, for example, for currently four voltage control units 33a, 33b, 33c, and 33d, the voltage is determined to be further raised based on the history and the determination of non-high resolution for this time, the voltage control unit 33b. Accordingly, the voltage of the voltage control unit 33a is updated to 55 V while the voltage values of the voltage control unit 33b, the voltage control unit 33c, and the voltage control unit 33d are maintained. As described above, the voltage values applied to the four electrodes 304a, 304b, 304c, and 304d of the liquid crystal lens are sequentially updated. In addition, in accordance with the updated values, the values of the liquid crystal lens parameters are updated as the history.

By performing the above-described processing operations, imaged images of the plurality of the unit imaging units 2 to 7 are composed in units of one sub pixel, the degree of high resolution thereof is determined, and the control voltages are changed so as to maintain a high-resolution capability, whereby a high image-quality image pickup apparatus can be realized. By applying different voltages to the electrode 304a, the electrode 304b, the electrode 304c, and the electrode 304d that are divided, the sampled phases at a time when the images imaged on the imaging devices by the imaging lenses 8 to 13 are sampled by the pixels of the imaging devices are changed. The ideal state of the control is the state in which the sampled phases of the imaging results of the unit imaging units are relatively shifted by half of the pixel size in the horizontal, vertical, and inclined directions. The determination on whether it is the ideal state is determined by the determination section 703.

Figure 16:
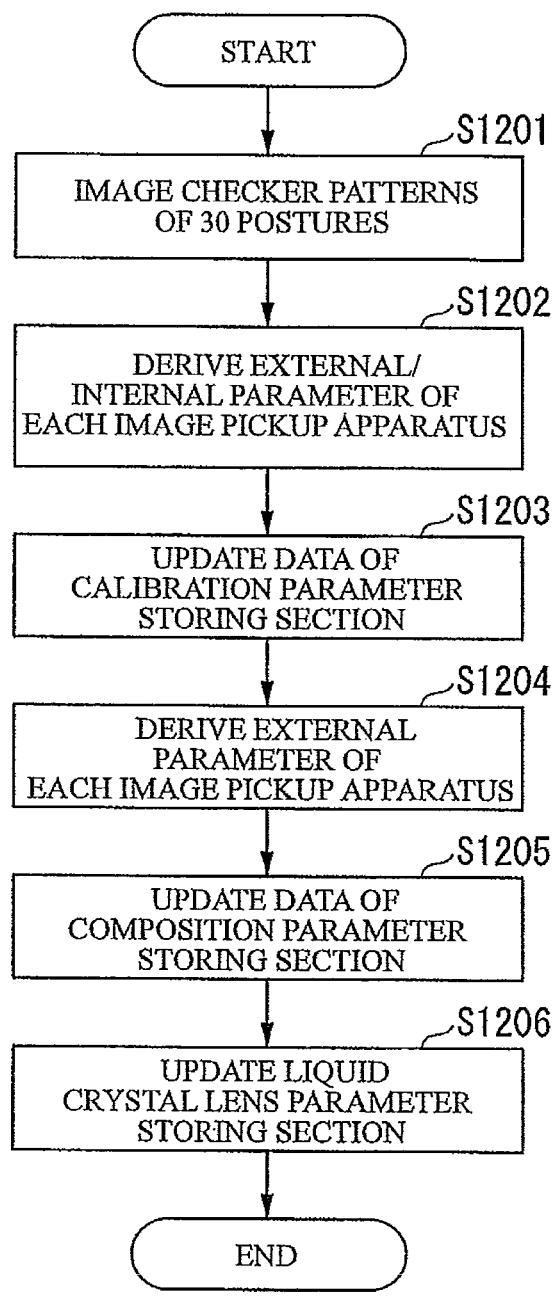
FIG. 16 is a flowchart illustrating an example of camera calibration.

Next, the processing operation of the camera calibration will be described with reference to FIG. 16. This processing operation, for example, is a process that is performed when the image pickup apparatus 1 is manufactured in a factory. By performing a specific operation such as simultaneously pushing a plurality of operation buttons when power of the image pickup apparatus is turned on, this camera calibration is performed. This camera calibration process is performed by the CPU P001. First, an operator who adjusts the image pickup apparatus 1 prepares a test chart of a checkered pattern or a check shape having a known pattern pitch and acquires images by imaging the checkered patterns of 30 types of postures while changing the posture or the angle (Step S1201). Subsequently, the CPU P001 analyzes the imaged images for each of the unit imaging units 2 to 7 and derives external parameter values and internal parameter values of each of the unit imaging units 2 to 7 (Step S1202). For example, in a general camera model, for example, as referred to as a pinhole camera model, relating to the external parameter values, six of three-dimensional rotation information values and translation information values of the posture of the camera become the external parameters. In addition, similarly, there are five internal parameters. Deriving such parameters is calibration. In a general camera model, there are a total of six external parameters of three-axis vectors of a yaw, a pitch, and a roll representing the posture of a camera in the world coordinates and three-axis components of a translation vector that represent translation components. In addition, there are five internal parameters of an image center ($u_0$, $v_0$), in which the optical axis of the camera crosses the imaging device, the angle of the coordinates and the aspect ratio that are assumed on the imaging device, and the focal length.

Next, the CPU P001 stores the acquired parameters in the calibration parameter storing section 603 (Step S1203). As described above, by using the parameters in the correction process (Step S902 shown in FIG. 12) for the unit imaging units 2 to 7, individual camera distortions of the unit imaging units 2 to 7 are corrected. In other words, there is a case where a checker pattern that is originally a straight line is imaged as a curve due to distortion of the camera. Accordingly, the parameters for restoring the curve back to the straight line are derived by this camera calibration process, and correction for the unit imaging units 2 to 7 is performed.

Next, the CPU P001 derives the external parameters among the unit imaging units 2 to 7 (Step S1204) as the parameters among the unit imaging units 2 to 7 and updates the parameters stored in the composition parameter storing section 702 and the liquid crystal lens parameter storing section 802 (Steps S1205 and S1206). These values are used in the sub-pixel video composition high-resolution implementation process S904 and the control voltage changing process S908.

In addition, here, a case where the function of camera calibration is included in the CPU or the microcomputer inside the image pickup apparatus is represented. However, for example, a configuration in which an additional PC is prepared, the same process is performed on this PC, and only the acquired parameters downloaded to the image pickup apparatus may be used.

Figure 17:
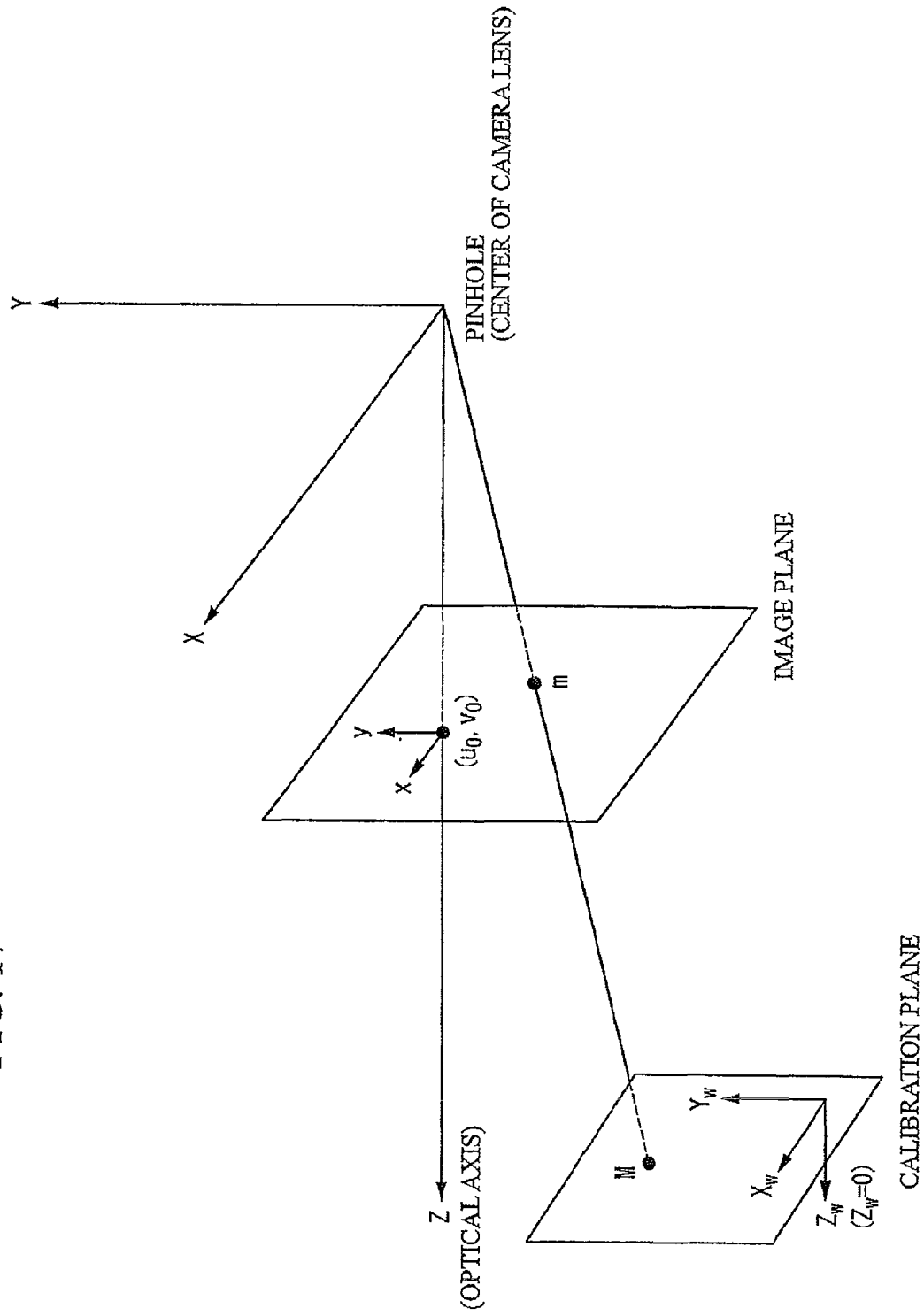
FIG. 17 is a schematic diagram illustrating camera calibration of a unit imaging unit.

Next, the principle of the camera calibration of the unit imaging units 2 to 7 will be described with reference to FIG. 17. Here, in the appearance of projection of the camera, it is assumed that a pinhole camera model as shown in FIG. 17 is used. In the pinhole camera model, light reaching an image plane passes through a pinhole that is one point located at the center of all the lenses and images an image in positions intersecting the image plane. A coordinate system in which intersection of the optical axis and the image plane is set as the origin point, and the x axis and the y axis are taken in accordance with the axis of disposition of the devices of the camera is referred to as an image coordinate system, and a coordinate system in which the center of the lens of the camera is set as the origin point, the optical axis is set as the Z axis, the X axis and the Y axis are taken to be parallel to the x axis and the y axis is referred to as a camera coordinate system. Here, three-dimensional coordinates M=$[X, Y, Z]^T$ in the world coordinate system ($X_w$, $Y_w$, $Z_w$) that is a coordinate system representing a space and a point m=$[u, v]^T$ located on the image coordinate system (x, y) that is a projection thereof can be associated with each other as in Equation (1).

$$s\tilde{m} = A[R\ t]\tilde{M} \qquad (1)$$

Here, A is referred to as an internal parameter matrix and is a matrix as shown in the following Equation (2).

$$A = \begin{bmatrix} \alpha & \gamma & u_0 \\ 0 & \beta & v_0 \\ 0 & 0 & 1 \end{bmatrix} \qquad (2)$$

Here, $\alpha$ and $\beta$ are scale coefficients that are products of the size of the pixel and the focal length, and ($u_0$, $v_0$) is the image center, and y is a parameter representing the distortion of the coordinate axis of the image. In addition, [R t] is referred to as an external parameter matrix and is a 4×3 matrix acquired by lining up a rotation 3×3 matrix R and a translation vector t.

According to the Zhang's calibration technique, internal parameters, external parameters, and a lens distortion parameter can be acquired by only photographing an image (three times or more) while moving a flat plate to which a known pattern is attached. In this technique, calibration is performed with the plane of $Z_w$=0 of the world coordinate system used as the calibration plane. The relationship between the point M located on the calibration plane that is represented in Equation (1) and a corresponding point m located on an image acquired by photographing the plane can be rewritten as in the following Equation (3).

$$s\begin{bmatrix} u \\ v \\ 1 \end{bmatrix} = A[r_1\ r_2\ r_3\ t]\begin{bmatrix} X \\ Y \\ 0 \\ 1 \end{bmatrix} = A[r_1\ r_2\ t]\begin{bmatrix} X \\ Y \\ 1 \end{bmatrix} \qquad (3)$$

The relationship between the point located on the plane and the point located on the image can be described as in Equation (4) by using a 3×3 homography matrix, $$s\tilde{m} = H\tilde{M}H = A[r_1 r_2 t] \tag{4}$$

When one image of the calibration plane is given, one homography matrix H can be acquired. When this homography $H=[h_1\ h_2\ h_3]$ is acquired, the following Equation (5) can be acquired by using Equation (4).

$$[h_1 h_2 h_3] = \lambda A[r_1 r_2 t] \tag{5}$$

Since R is a rotation matrix, r1 and r2 are orthogonal to each other, whereby Equations (6) and (7), which are two constraint equations relating to the internal parameters, represented below can be acquired.

$$h_1^T A^{-T} A^{-1} h_2 = 0 \tag{6}$$

$$h_1^T A^{-T} A^{-1} h_1 = h_2^T A^{-T} A^{-1} h_2 \tag{7}$$

$A^{-T}A^{-1}$, as Equation (8), is a 3×3 target matrix and includes 6 unknown numbers. Thus, two equations can be set with respect to one H. Accordingly, when three or more H are acquired, the internal parameter A can be determined. Here, $A^{-T}A^{-1}$ has a target property.

$$B = A^{-T} A^{-1} = \begin{bmatrix} B_{11} & B_{12} & B_{13} \\ B_{12} & B_{22} & B_{23} \\ B_{13} & B_{23} & B_{33} \end{bmatrix} \tag{8}$$

Accordingly, elements of 13 represented in Equation (8) are defined as in Equation (9).

$$b = [B_{11} B_{12} B_{22} B_{13} B_{23} B_{33}]^T \tag{9}$$

When the i-th column of the homography H is denoted by $[h_i = h_{i1}\ h_{i2}\ h_{i3}]^T$, (i=1, 2, 3), $h_i^T B h_j$ can be represented as in Equations 10 and 11.

$$h_i^T B h_j = v_{ij}^T b \tag{10}$$

$$v_{ij} = [h_{i1}h_{j1}\ h_{i1}h_{j2}+h_{i2}h_{j1}\ h_{i2}h_{j2}\ h_{i3}h_{j1}+h_{i1}h_{j3}\ h_{i3}h_{j2}+h_{i2}h_{j3}\ h_{i3}h_{j3}]^T \tag{11}$$

Accordingly, Equations (6) and (7) become the following equations.

$$\begin{bmatrix} v_{12}^T \\ (v_{11} - v_{22})^T \end{bmatrix} b = 0 \tag{12}$$

When n images are acquired, by building up n equations described above, Equation (13) can be acquired.

$$Vb = 0 \tag{13}$$

Here, V is a 2n×6 matrix. Accordingly, b is acquired as an eigenvector corresponding to a minimum eigenvalue of $V^T V$. In such a case, when n≥3, the solution to b can be directly acquired. However, when n=2, the solution is acquired by setting γ of the internal parameters to zero and inserting Equation [010000]b=0 into Equation (13). In addition, when n=1, only two internal parameters can be acquired. Thus, for example, the solution is acquired by setting only α and β to be unknown and setting the remaining internal parameters to be known. When B is acquired by acquiring b, the internal parameters of the camera are calculated by using Equation (14) by using $B=\mu A^{-T}A$.

$$\begin{aligned} v_0 &= (B_{12}B_{13} - B_{11}B_{23})/(B_{11}B_{12} - B_{12}^2) \\ \mu &= B_{33} - [B_{13}^2 + v_0(B_{12}B_{13} - B_{11}B_{23})]/B_{11} \\ \alpha &= \sqrt{\mu/B_{11}} \\ \beta &= \sqrt{\mu B_{11}/(B_{11}B_{22} - B_{12}^2)} \\ \gamma &= -B_{12}\alpha^2 \beta/\mu \\ u_0 &= \gamma v_0/\beta - B_{13}\alpha^2/\mu \end{aligned} \tag{14}$$

Thus, when the internal parameter A is acquired, the external parameters can be acquired in Equation (15) by using Equation (5).

$$\begin{aligned} r_1 &= \lambda A^{-1} h_1 \\ r_2 &= \lambda A^{-1} h_2 \\ r_3 &= r_1 \times r_2 \\ t &= \lambda A^{-1} h_3 \\ \lambda &= 1/\|A^{-1} h_1\| = 1/\|A^{-1} h_2\| \end{aligned} \tag{15}$$

Accordingly, optimal external parameters can be acquired by optimizing the parameters by using a nonlinear least-squares method with the parameters acquired as described above being as its initial values.

As described above, when all the internal parameters are unknown, the camera calibration can be performed by using three or more images that are photographed in a state in which the internal parameters are fixed at a different time point. At this time, generally, as the number of images is increased, the estimate accuracy increases. In addition, when the rotation between the images used in the calibration is small, the error increases.

Figure 18:
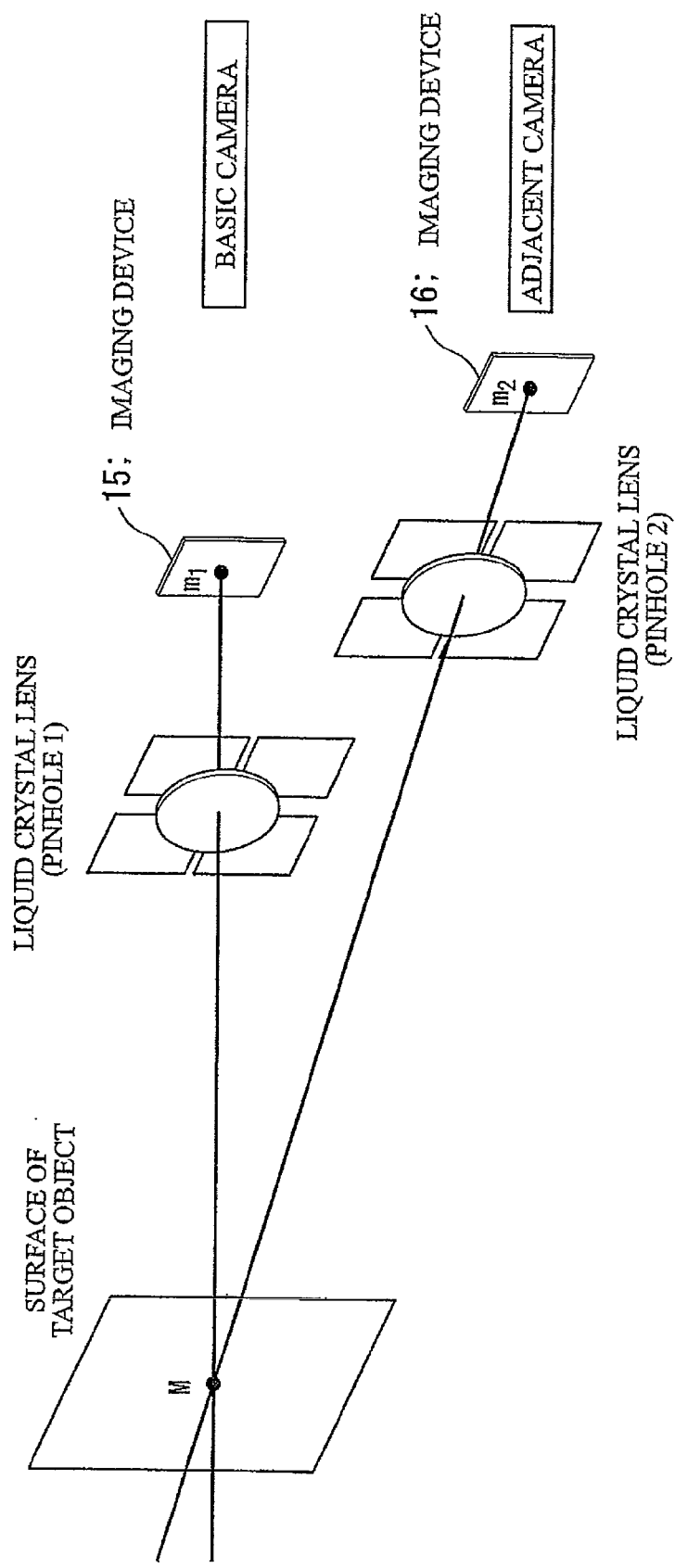
FIG. 18 is a schematic diagram illustrating camera calibration of a plurality of unit imaging units.
Figure 19:
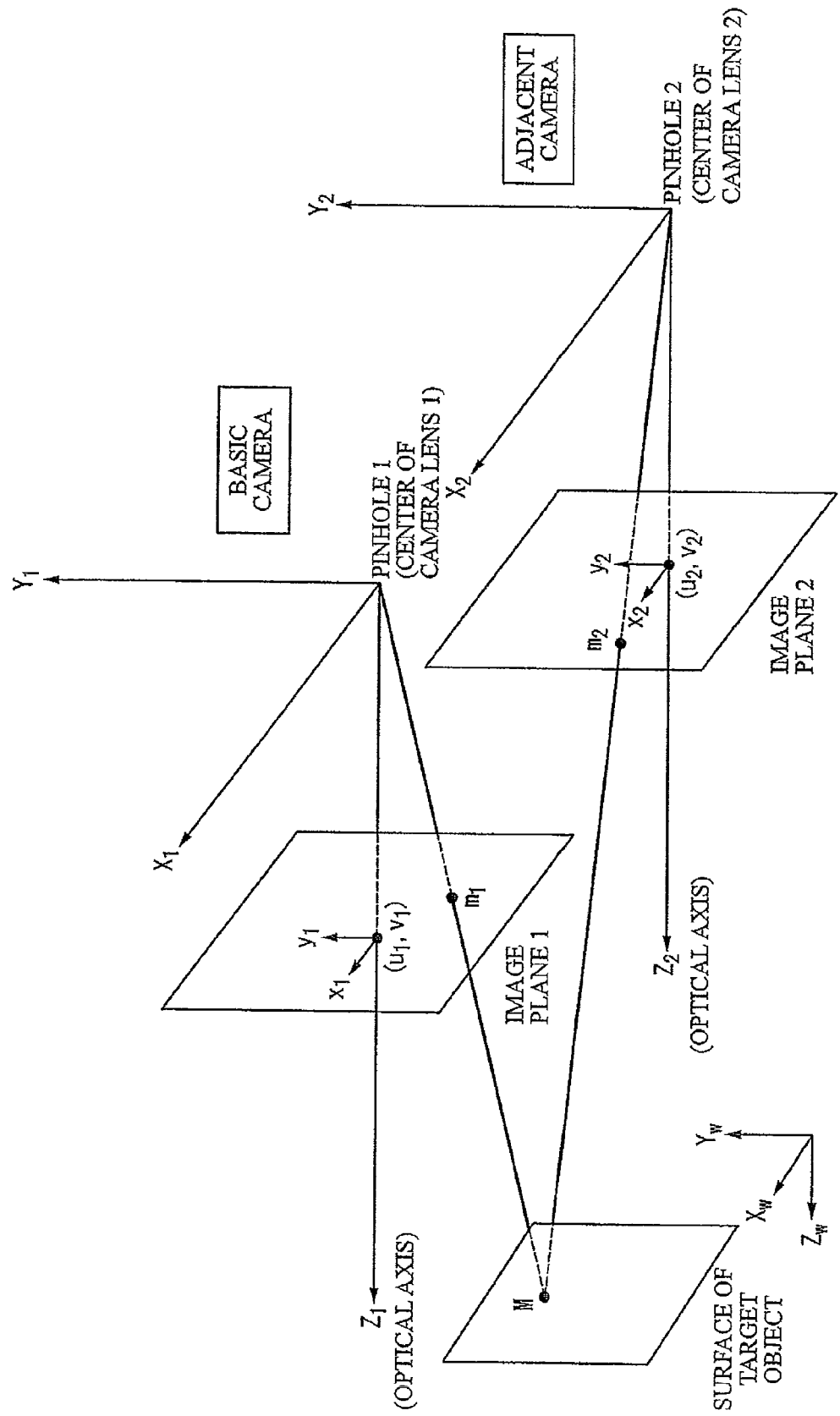
FIG. 19 is another schematic diagram illustrating camera calibration of a plurality of unit imaging units.

Next, a method of associating areas in which the same area is shown in the images at the accuracy of the sub pixel based on the camera parameters representing the position and the posture of the camera (image pickup apparatus) that are acquired by the camera calibration will be described with reference to FIGS. 18 and 19. FIG. 18 represents a case where a point M located on the surface of a target object is projected (photographed) onto a point m1 or m2 located on each imaging device through the above-described liquid crystal lens by a basic imaging device 15 (this is referred to as a basic camera) and an adjacent imaging device 16 (this is referred to as an adjacent camera) that is adjacent thereto. In addition, FIG. 19 represents FIG. 18 by using the pinhole camera model shown in FIG. 17. The relationship between the point M on the world coordinate system and the point m on the image coordinate system can be represented by using Equation (1) as Equation (16) by using a central projection matrix P based on the mobility and the like of the camera.

$$m = PM \tag{16}$$

By using the calculated P, the correspondence relationship between a point within a three-dimensional space and a point located on a two-dimensional image plane can be described. In the configuration shown in FIG. 19, the central projection matrix of the basic camera is denoted by $P_1$, and the central projection matrix of the adjacent camera is denoted by $P_2$. In order to acquire, from a point $m_1$ on the image plane 1, a point $m_2$ located on the image plane 2 corresponding to the point, the following method is used.

(1) A point M within a three-dimensional space is acquired by using Equation (16) based on $m_1$. Since the central projection matrix P is a 3×4 matrix, the point is acquired by using a pseudo inverse matrix of P.

$$M=(P_1{}^TP_1)^{-1}P_1{}^Tm_1 \quad (17)$$

(2) The corresponding point $m_2$ of the adjacent image is acquired by using the central projection matrix $P_2$ of the adjacent camera based on the calculated three-dimensional position.

$$m_2=P_2((P_1{}^TP_1)^{-1}P_1{}^Tm_1) \quad (18)$$

Since the camera parameter P has an analog value, the calculated corresponding point $m_2$ of the adjacent image that is adjacent to the basic image is acquired in units of one sub-pixel. According to corresponding point matching using the camera parameter, the camera parameter is acquired in advance. Accordingly, there is an advantage in that the corresponding point can be instantly calculated only by performing matrix calculation.

Next, the distortion of the lens and the camera calibration will be described. Until now, the description is presented based on the pinhole model in which a lens is regarded as one point. However, actually, the lens has a finite size, and thus there are cases that cannot be described by the pinhole model. The distortion correction for such cases will be described below. When a convex lens is used, distortion occurs due to refraction of incident light. Correction coefficients for such distortion in the radiation direction are denoted by k1, k2, and k5. In addition, in a case where the lens and the imaging device are not disposed to be parallel to each other, distortion occurs in the tangential direction. The correction coefficients for such distortion formed in the normal direction are denoted by k3 and k4. Such distortion is referred to as aberration distortion. Here, the equation for correcting the distortion is as shown below.

$$x_d=(1+k_1r^2+k_2r^4+k_5r^6)x_u+2k_3x_uy_u+k_4(r^2+2x_u{}^2) \quad (19)$$

$$y_d=(1+k_1r^2+k_2r^4+k_5r^6)y_u+k_3(r^2+2y_u{}^2)+2k_4x_uy_u \quad (20)$$

$$r^2=x_u{}^2+y_u{}^2 \quad (21)$$

Here, $(x_u, y_u)$ are image coordinates of the imaging result of an ideal lens having no aberration, and $(x_d, y_d)$ are image coordinates of a lens having distortion aberration. Both the coordinate systems of these coordinates are the above-described image coordinate systems having the x axis and the y axis. In addition, r is a distance from the image center to $(x_u, y_u)$. The image center is determined by the above-described internal parameters u0 and v0. When the coefficients k1 to k5 and the internal parameters are derived by performing calibration with the above-described model being assumed, differences in the imaging coordinates due to existence and non-existence of distortion are acquired. Accordingly, distortion due to actual lenses can be corrected.

Figure 20:
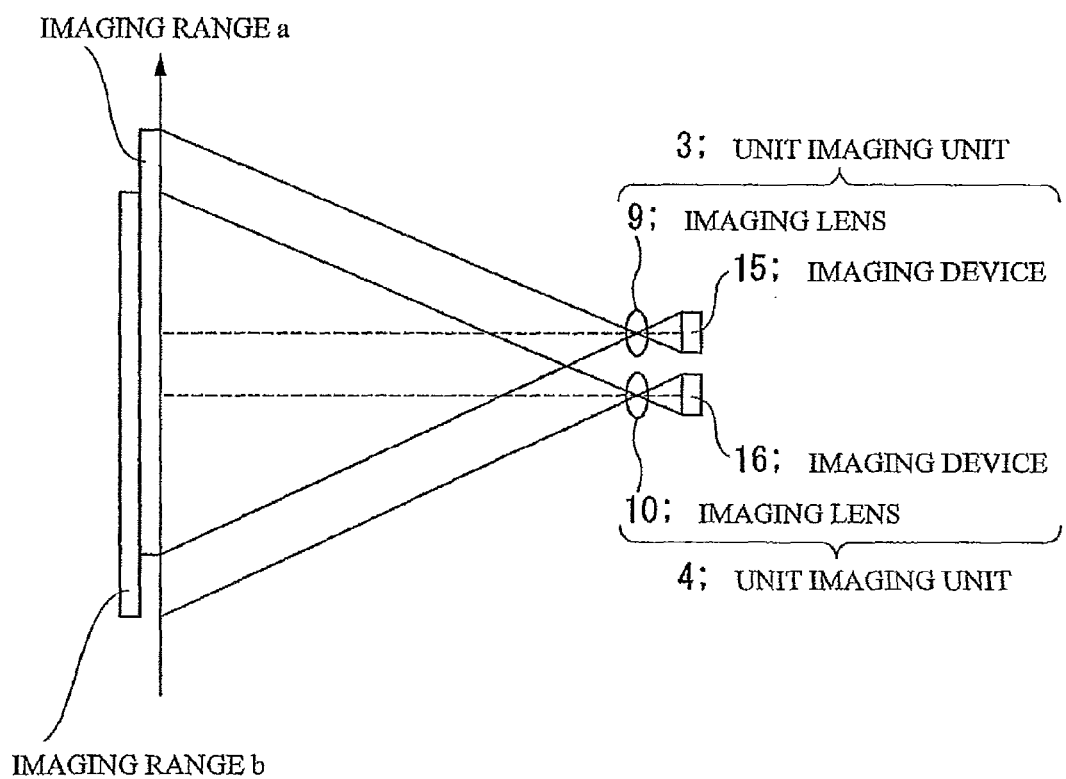
FIG. 20 is a schematic diagram showing the imaging appearance of the image pickup apparatus 1.

FIG. 20 is a schematic diagram showing the imaging appearance of the image pickup apparatus 1. The unit imaging unit 3 that is configured by the imaging device 15 and the imaging lens 9 images an imaging range a. The unit imaging unit 4 that is configured by the imaging device 16 and the imaging lens 10 images an imaging range b. The two unit imaging units 3 and 4 image approximately the same imaging range. For example, in a case where a disposition gap between the imaging devices 15 and 16 is 12 mm, the focal length of each of the unit imaging units 3 and 4 is 5 mm, the distance to the imaging range is 600 mm, and the optical axes of the unit imaging units 3 and 4 are parallel to each other, the area in which the imaging ranges a and b are different from each other is about 3%. As described above, a same portion is imaged, and a high resolution implementing process is performed by the composition processing unit 38.

Figure 21:
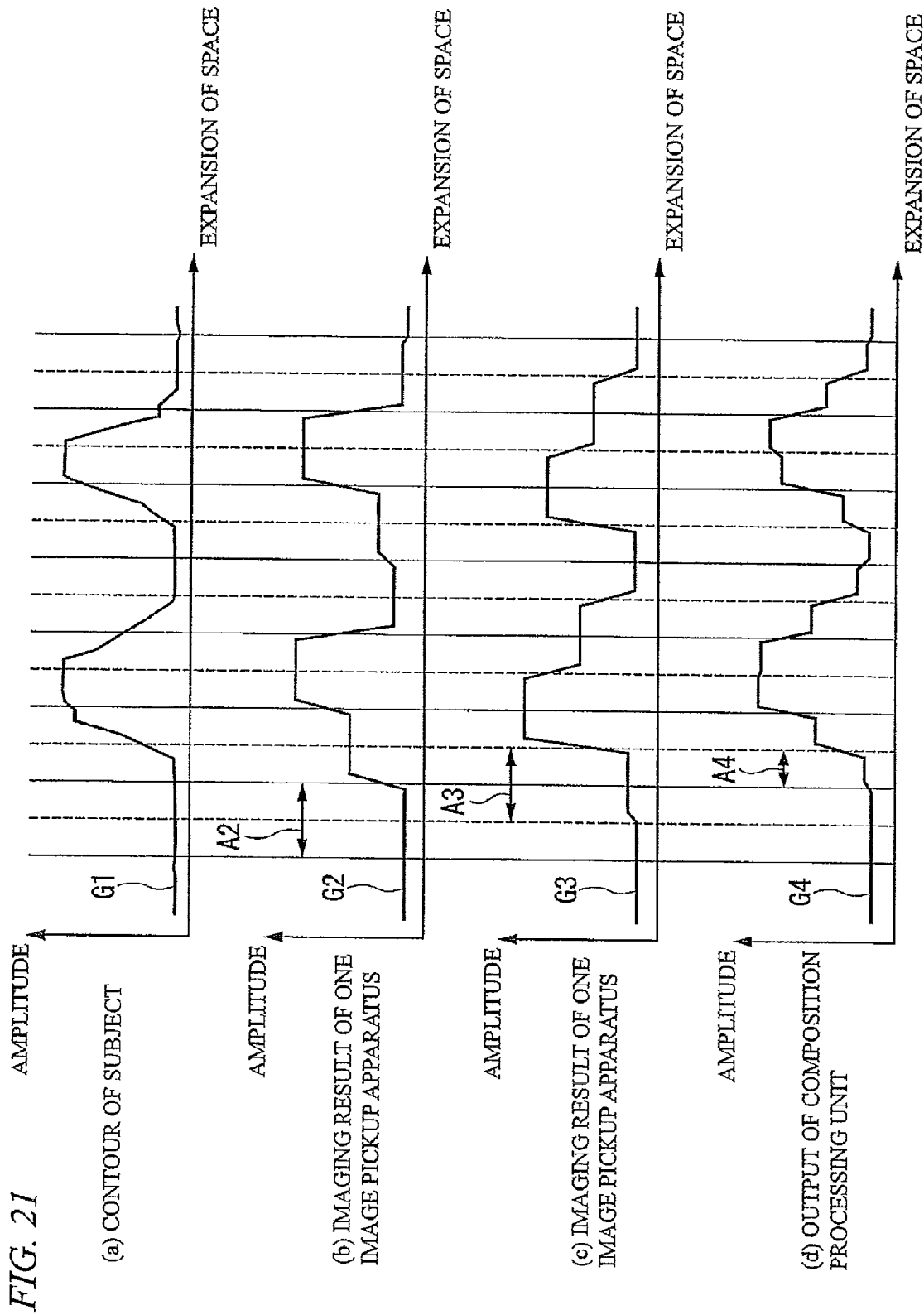
FIG. 21 is a schematic diagram illustrating a high-resolution sub-pixel.

Next, the high resolution implementation of the image pickup apparatus 1 will be described with reference to FIGS. 21 and 22. The horizontal axis in FIG. 21 represents expansion of a space. This expansion of a space represents both the expansion of an actual space and the expansion of a virtual space of the imaging device. This represents that transformation and conversion therebetween can be performed by using the external parameters and the internal parameters. In addition, when considering video signals that are sequentially read out from the imaging devices, the horizontal axis in FIG. 21 is a time axis. However, even such a case is recognized as being expansion of a space by the observer's eyes when the video signals are displayed in a display. Accordingly, a case where the horizontal axis is the time axis of the video signal represents the same as the expansion of a space. The vertical axis in FIG. 21 represents the amplitude or the intensity. As the intensity of reflected light from an object is photo-electrically converted by the pixel of the imaging device so as to be output as a voltage level, the vertical axis may be regarded as the amplitude.

A graph G1 shown in FIG. 21 is a contour of an object in the actual space. In order to integrate this contour, that is, the intensity of light reflected from the object as being the expansion of the pixel of the imaging device, the unit imaging units 2 to 7 receive the contour as a graph G2 shown in FIG. 21. For example, the integration is performed by using a LPF (Low Pass Filter). An arrow A2 shown in FIG. 21 is the expansion of the pixel of the imaging device. A graph G3 shown in FIG. 21 is the result of imaging by using other unit imaging units 2 to 7, and light is integrated as the expansion of the pixel denoted by an arrow A3 shown in FIG. 21. As in the graphs G2 and G3 shown in FIG. 21, the contour (profile) of the reflected light that is equal to or less than the expansion determined in accordance with the resolution (the size of the pixels) of the imaging device cannot be reproduced by the imaging device.

However, as an aspect of the present invention, there is an offset in the phase relationship between the graphs G2 and G3 shown in FIG. 21. By taking in the light with such an offset so as to be optimally composed by the composition processing unit, the contour shown in a graph G4 of FIG. 21 can be reproduced. As is apparent from the graphs G1 to G4 shown in FIG. 21, the contour of the graph G1 shown in FIG. 21 is reproduced the best in the graph G4 shown in FIG. 21, and the capability equivalent to the size of the pixels of the imaging device corresponding to the width of the arrow shown in the graph G4 of FIG. 21 can be performed. According to this embodiment, by using a plurality of unit imaging units configured by a non-solid lens that is representatively presented as a liquid crystal lens and an imaging device, a video output exceeding the resolution limit can be performed by the above-described averaging (integration using an LPF).

Figure 22:
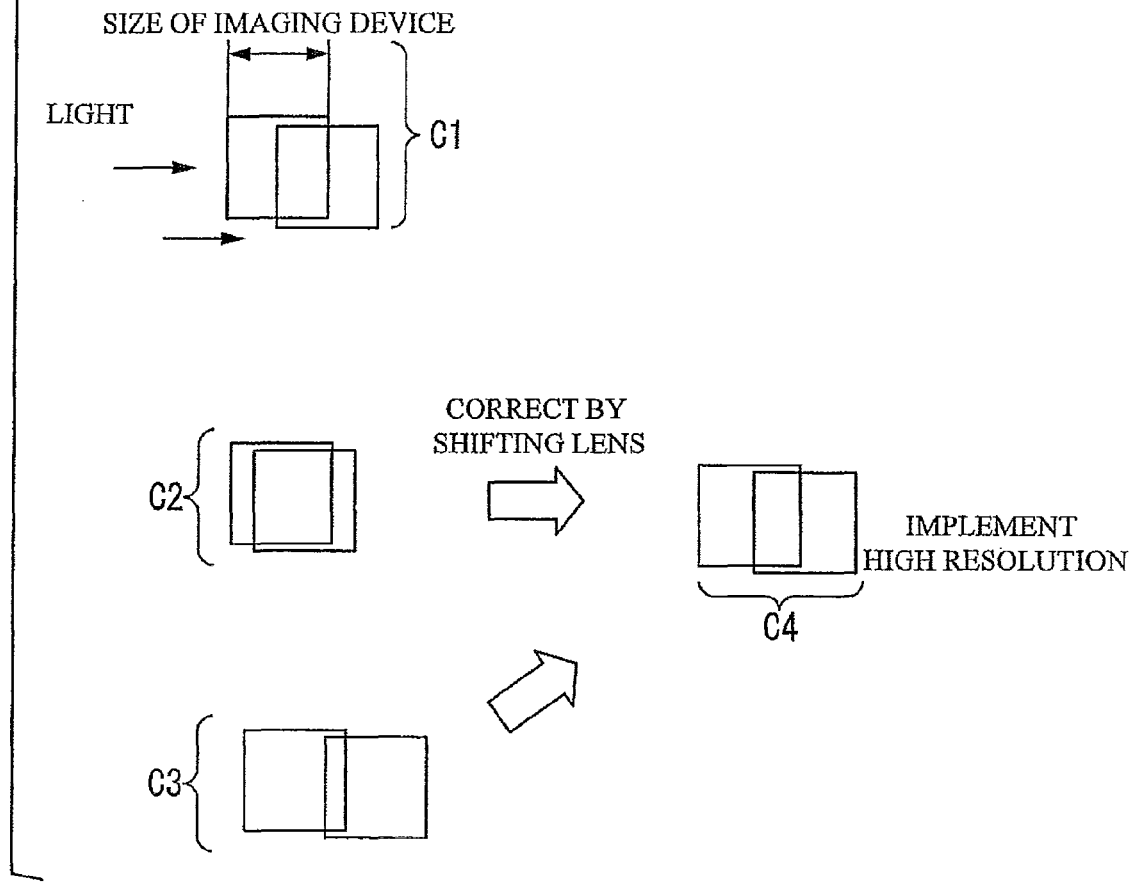
FIG. 22 is another schematic diagram illustrating a high-resolution sub-pixel.

FIG. 22 is a schematic diagram representing the relative phase relationship of two unit imaging units. In a case where high resolution is implemented by image processing performed on a latter stage, it is preferable that the relative relationship of the sampling phases of the imaging device is equally spaced. Here, sampling represents the same as sampling and represents a process of extracting analog signals from discrete positions. In FIG. 22, a case where two unit imaging units are used is assumed. Accordingly, as the phase relationship, the phase relationship of 0.5 pixel size is ideal as denoted by a reference sign C1.

However, there are cases where the phase relationship is as denoted by reference sign C2 or C3, shown in FIG. 22, in relation with the imaging distance or assembly of the apparatus. In such a case, even when the image processing operation is performed only by using a video signal that has been averaged, the signals averaged to have the phase relationship as denoted by reference sign C2 or C3 of FIG. 22 cannot be restored. Thus, it is essential to control the phase relationship denoted by reference sign C2 or C3 shown in FIG. 22 to be the phase relationship denoted by reference sign C4. According to the present invention, this control is realized by performing optical-axis shift by using the liquid crystal lens shown in FIG. 4. By performing the above-described process, the ideal phase relationship is maintained all the time, whereby an observer can be provided with an optimal image.

Here, in FIG. 22, one-dimensional phase relationship has been described. By performing one-dimensional shift in each of the horizontal direction, the vertical direction, and the direction of 45-degree inclination, for example, by using four unit imaging units, phase control in a two-dimensional space can be performed by the operation shown in FIG. 22. In addition, two-dimensional phase control may be realized, for example, by two-dimensionally (horizontally, vertically, or horizontally and vertically) performing phase control for one of unit imaging units with respect to a reference unit imaging unit by using the two unit imaging units.

For example, a case where four images are acquired by photographing photographing targets (subjects) that are approximately the same by using four unit imaging units will be assumed. A high-resolution image can be acquired by determining characteristic points on the frequency axis by performing a Fourier transform for individual images with respect to an image used as a reference and calculating the rotation amount and the shift amount with respect to the reference image, and performing an interpolated filtering process by using the rotation amount and the shift amount. For example, when the number of pixels of the imaging device corresponds to VGA (640×480 pixels), a high-resolution image corresponding to Quad-VGA (1280×960 pixels) can be acquired by the four unit imaging units of VGA.

In the above-described interpolated filtering process, for example, a cubic (third-order approximation) method is used. The interpolated filtering process is a process of weighting in accordance with a distance from an interpolated point. Although the resolution limitation of the imaging device is VGA, the imaging lens has the capability of passing the frequency band of Quad-VGA. By repeatedly performing aliasing distortion (aliasing) for the frequency band component of the Quad-VGA that is equal to or higher than VGA, the imaging is performed at the VGA resolution. By using the aliasing distortion, a high frequency-band of Quad-VGA is restored by performing the video composition process.

Figure 23A:
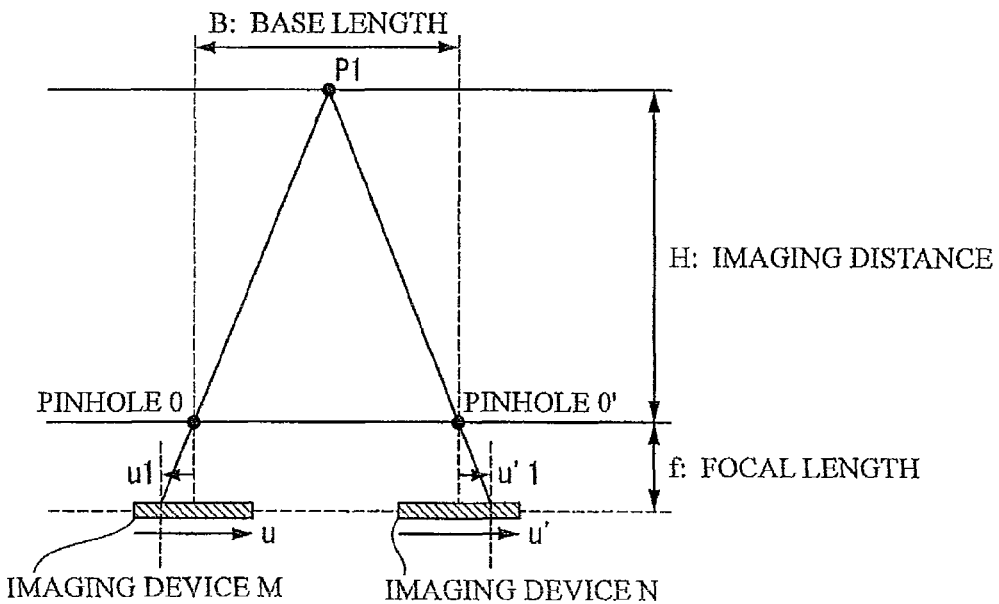
FIG. 23A is an explanatory diagram representing the relationship between an imaging target (subject) and imaging.
Figure 23B:
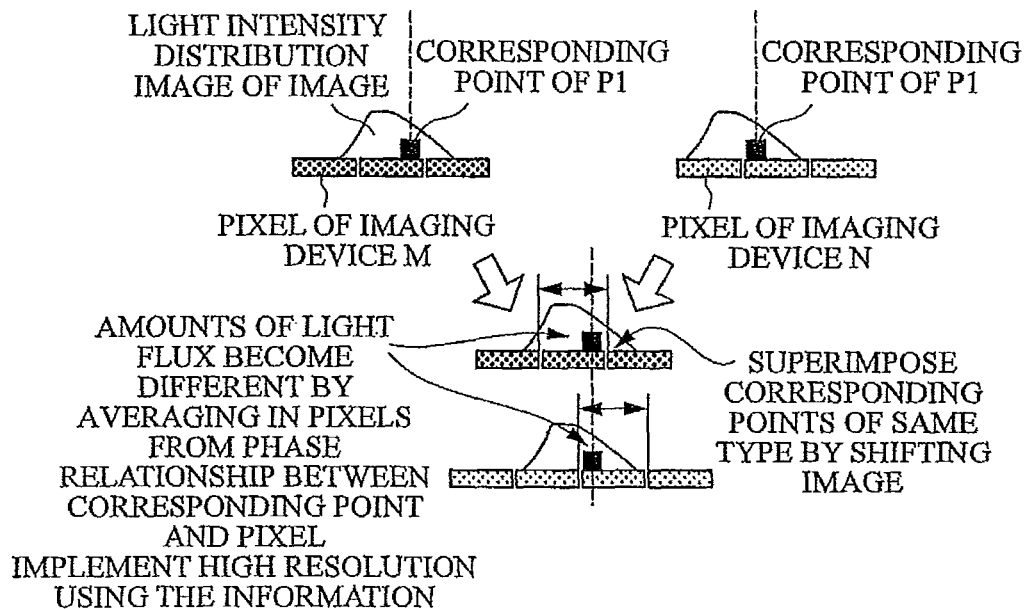
FIG. 23B is another explanatory diagram representing the relationship between an imaging target (subject) and imaging.
Figure 23C:
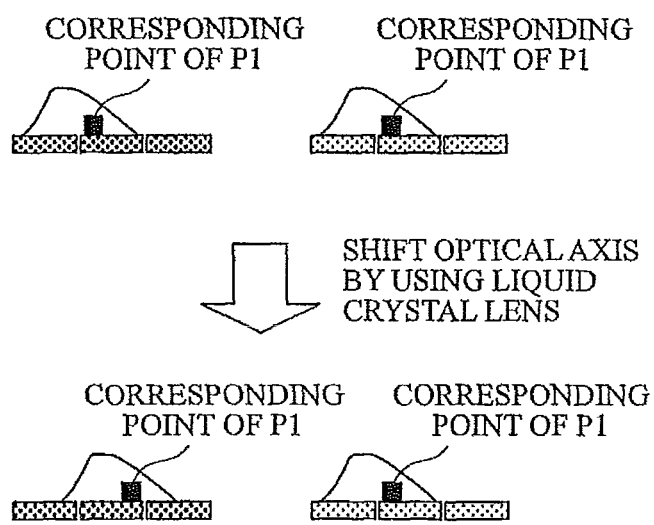
FIG. 23C is another explanatory diagram representing the relationship between an imaging target (subject) and imaging.

FIGS. 23A to 23C are diagrams representing the relationship between a photographing target (subject) and imaging. In the figures, a pinhole model ignoring lens skewness becomes the base. An image pickup apparatus having small lens skewness can be described by using this model and can be described only by geometric optics. In FIG. 23A, P1 is a photographing target, and a photographing distance is H. In addition, pinholes O and O' correspond to imaging lenses of two unit imaging units, and this figure is a schematic diagram representing that one image is imaged by two unit imaging units of imaging devices M and N. FIG. 23B is an appearance in which the image of P1 is imaged in a pixel of the imaging device. As described above, the phase of an image imaged in the pixel of the imaging device is determined. This phase is determined by the relative positional relationship (a base length B) of imaging devices, a focal length f, and an imaging distance H.

In other words, there are cases where the positional relationship is different from a designed value depending on the accuracy of installation of the imaging devices, and the relationship is also changed in accordance with the photographing distance. In such a case, there are cases where the phases coincide with each other as shown in FIG. 23C in a specific combination. The light intensity distribution image shown in FIG. 23B schematically shows the intensity of light corresponding to expansion. The imaging device averages the input of such light in the range of expansion of the pixel. As shown in FIG. 23B, when light is taken by two unit imaging units with different phases, the same light intensity distributions are averaged at different phases. Accordingly, a high frequency-band component (for example, when the imaging device is VGA resolution, a high frequency-band that is equal to or higher than the VGA resolution) can be reproduced by a composition process performed on a latter stage. Since there are two unit imaging units, a phase deviation of 0.5 pixels is ideal.

However, as in FIG. 23C, when the phases coincide with each other, information taken by the imaging devices becomes the same, and high resolution cannot be implemented. Thus, as shown in FIG. 23C, high resolution is achieved by controlling the phase to be in an optimal state by shifting the optical axis. The optimal state is realized by the process shown in FIG. 14. As the phase relationship, it is preferable that the phases of the used unit imaging units are equally spaced. Since the present invention has the function of optical-axis shift, such an optimal state can be achieved by external voltage control.

Figure 24A:
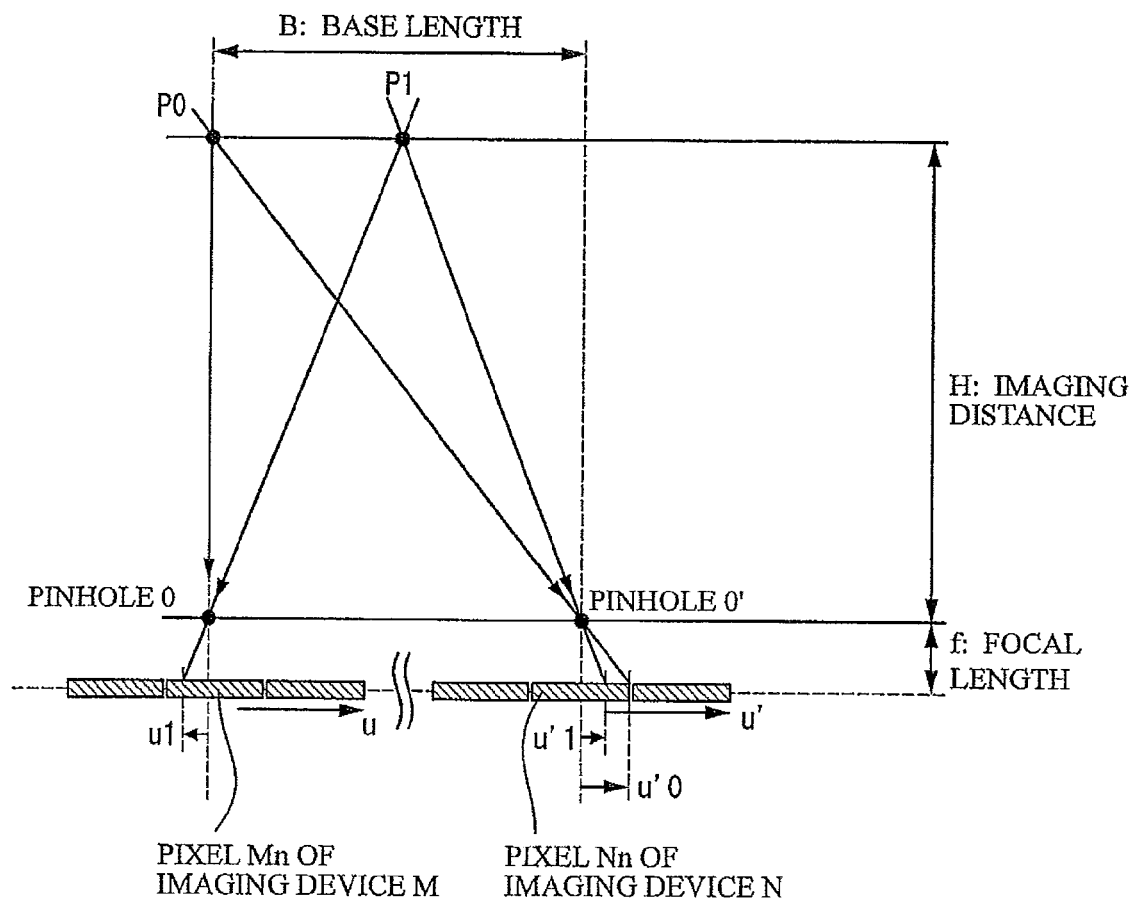
FIG. 24A is a schematic diagram illustrating the operation of the image pickup apparatus 1.
Figure 24B:
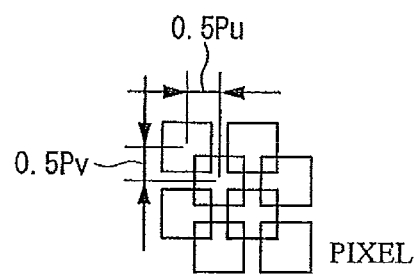
FIG. 24B is another schematic diagram illustrating the operation of the image pickup apparatus 1.

FIGS. 24A and 24B are schematic diagrams illustrating the operation of the image pickup apparatus 1. FIGS. 24A and 24B illustrate the appearance of imaging by using an image pickup apparatus that is configured by two unit imaging units. Each imaging device is, for the convenience of description, enlarged in units of one pixel unit. The plane of the imaging device is defined in two dimensions of u and v, and FIG. 24A corresponds to the cross-section of the u axis. The imaging targets P0 and P1 are at the same imaging distance H. The image of P0 is imaged at u0 and u'0. In addition, u0 and u'0 are distances on the imaging devices with the optical axes thereof used as references. In FIG. 24A, P0 is located on the optical axis of the imaging device M, and accordingly u0=0. In addition, the distances of images of P1 from the respective optical axes are u1 and u'1. Here, the relative phases of the positions in which P0 and P1 are imaged on the imaging devices M and N with respect to the imaging devices M and N determine the performance of the image shift. This relationship is determined by the photographing distance H, the focal length f, and the base length B that is the distance between optical axes of the imaging devices.

In FIGS. 24A and 24B, the imaging positions, that is, u0 and u'0 are relatively shifted by half of the pixel size. In addition, u0 (=0) is located at the center of the pixel of the imaging device M. To the contrary, u'0 is imaged on the periphery of the pixel of the imaging device N. In other words, the relationship of being deviated by half pixel of the pixel size is formed. In addition, u1 and u'1 are shifted by a distance half the size of a pixel as described above. FIG. 24B is a schematic diagram showing an operation of restoring and generating one image by operating the same images of a same type of imaged images. Pu represents the pixel size in the u direction, and Pv represents the pixel size in the v direction. In FIG. 24B, the relationship being relatively shifted by half of the pixel is formed, and image shift is performed to be in an ideal state for generating a high-resolution image.

Figure 25A:
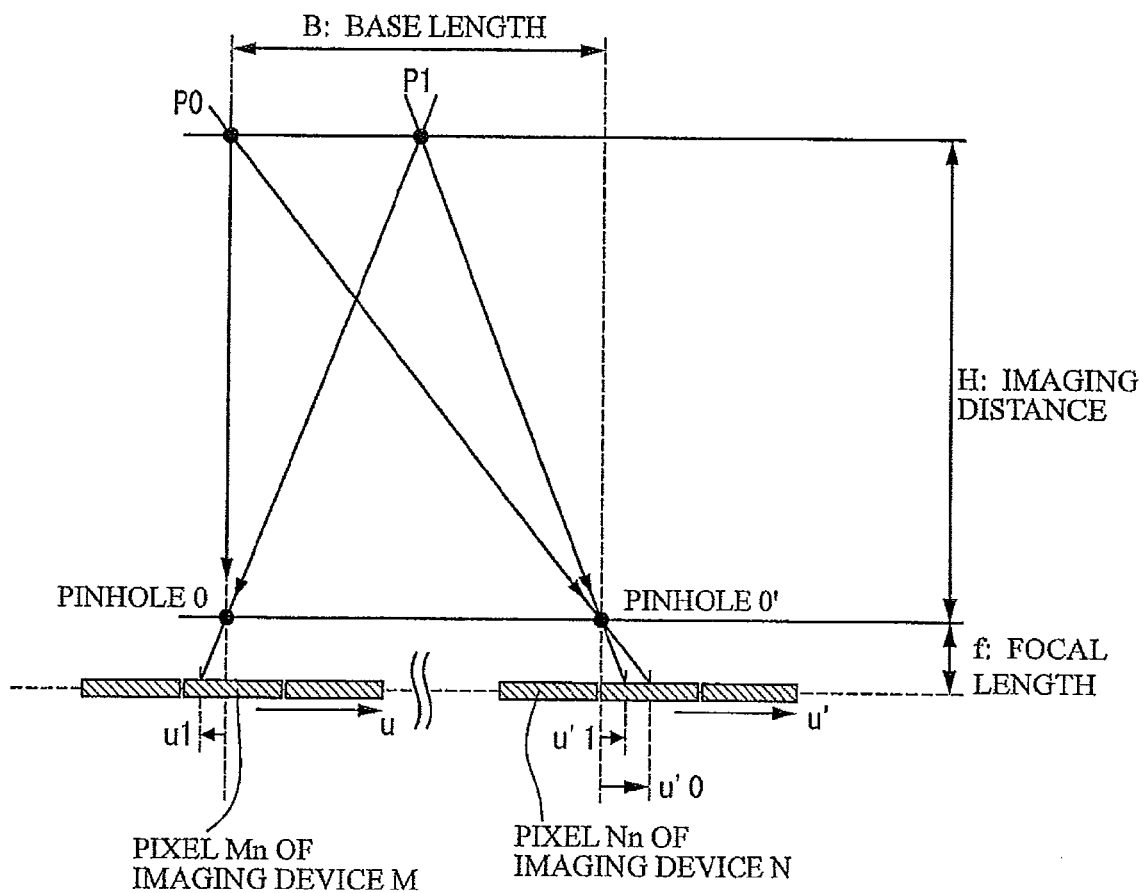
FIG. 25A is a schematic diagram for a case where an imaging device is installed to be deviated due to installation error.
Figure 25B:
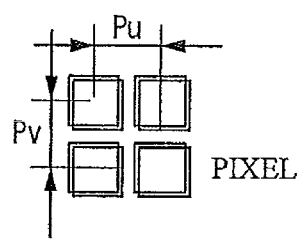
FIG. 25B is another schematic diagram for a case where an imaging device is installed to be deviated due to installation error.

FIGS. 25A and 25B are schematic diagrams of a case where the imaging device N is installed with being deviated by half of the pixel size from the design thereof, for example, due to installation error with respect to FIGS. 24A and 24B. In such a case, in the relative relationship between u1 and u'1, the phases are the same with respect to the pixel of each imaging device. In FIG. 25A, both are imaged in positions deviated to the left side with respect to the pixels. The relationship between u0 (=0) and u0 is similar thereto. Accordingly, as FIG. 25B, the relative phases approximately coincide with each other.

Figure 26A:
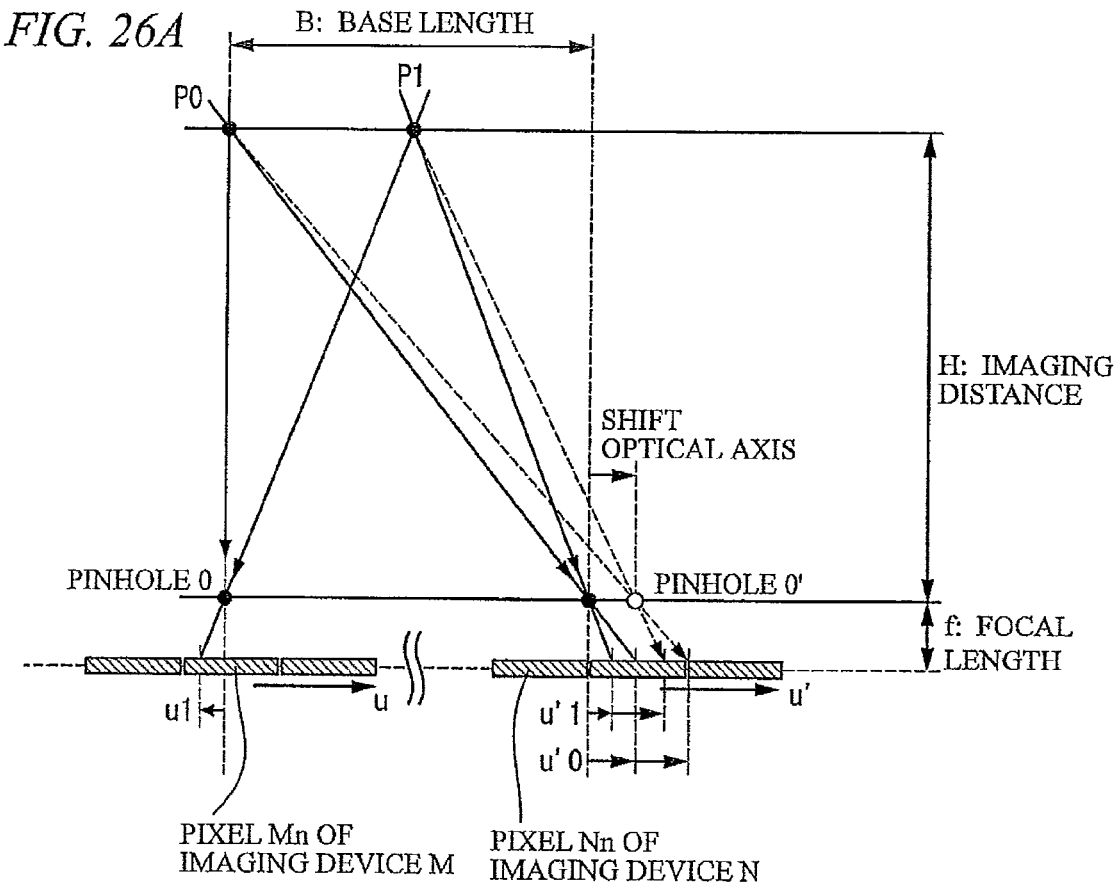
FIG. 26A is a schematic diagram representing the operation of optical-axis shift control.
Figure 26B:
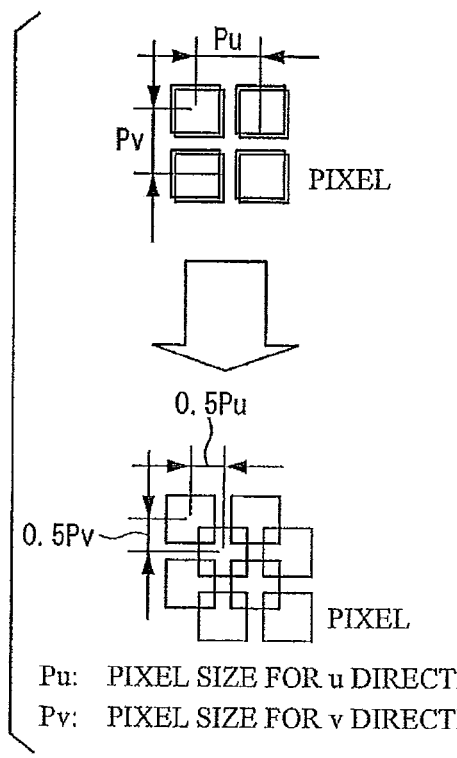
FIG. 26B is another schematic diagram representing the operation of optical-axis shift control.

FIGS. 26A and 26B are schematic diagrams of a case where the optical-axis shift according to the present invention is operated in FIGS. 25A and 25B. The movement toward the right side referred to as optical axis shift shown in FIG. 26A is the image of the operation. As described above, by displacing the pinhole O' by using an optical shifting mechanism, the position in which an imaging target is imaged with respect to the pixel of the imaging device can be controlled. As FIG. 26B, the ideal positional relationship can be achieved.

Figure 27A:
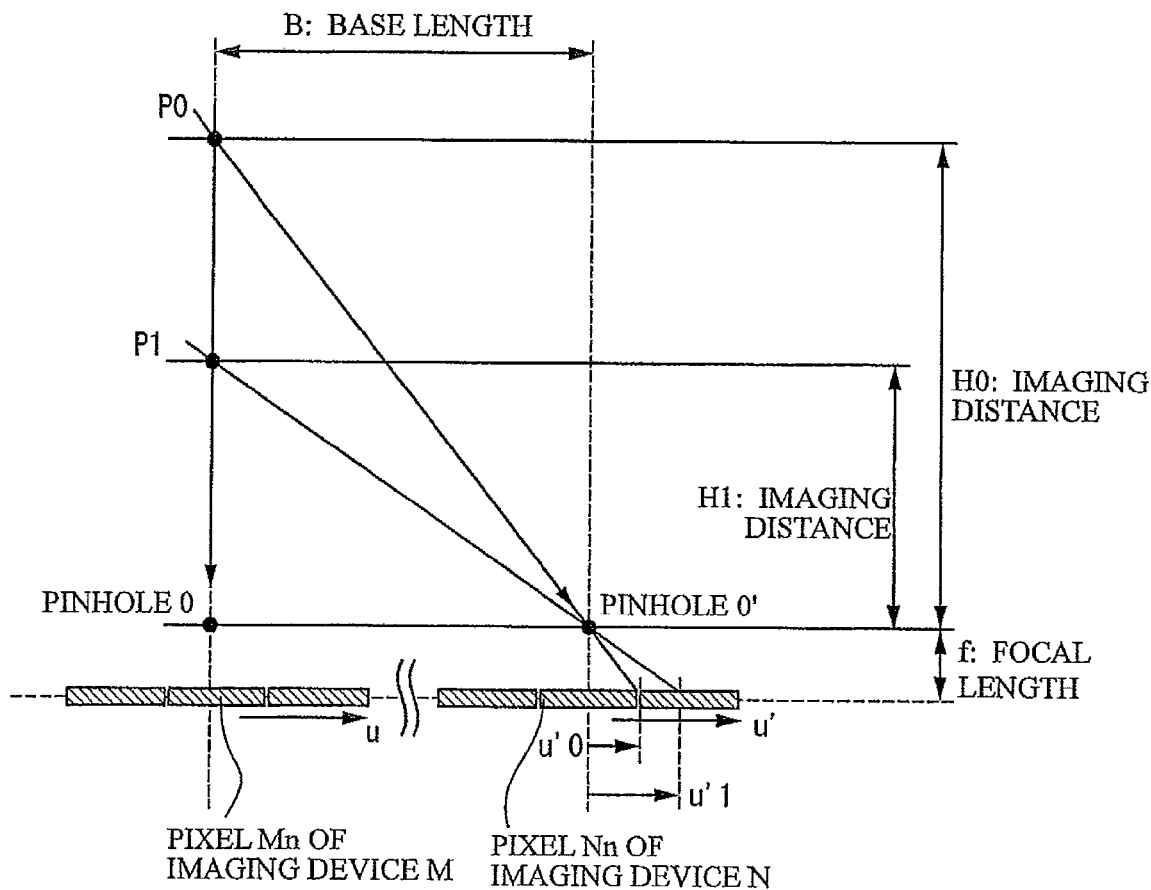
FIG. 27A is an explanatory diagram representing the relationship between an imaging distance and optical-axis shift.
Figure 27B:
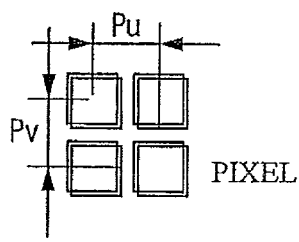
FIG. 27B is another explanatory diagram representing the relationship between an imaging distance and optical-axis shift.

Next, the relationship between the imaging distance and the optical-axis shift will be described with reference to FIGS. 27A and 27B. FIG. 27A is a schematic diagram illustrating a case where a subject is shifted to an object P1 located at a distance H1 from the state in which P0 is imaged at an imaging distance H0. In FIG. 27A, since P0 and P1 are assumed to be located on the optical axis on the imaging device M, u0=0, and u1=0. The relationship between the pixel of the imaging device B and images of P0 and P1 at a time when P0 and P1 are imaged in the imaging device N will be focused. P0 is imaged at the center of the pixel of the imaging device M. On the other hand, the P0 is imaged on the periphery of the pixel of the imaging device N. Accordingly, it can be stated that the optimal phase relationship is formed when P0 is imaged. FIG. 27B is a schematic diagram showing the relative phase relationship between the imaging elements in a case where the subject is P1. As in FIG. 27B, after the subject is switched to P1, the relative phases approximately coincide with each other.

Figure 28A:
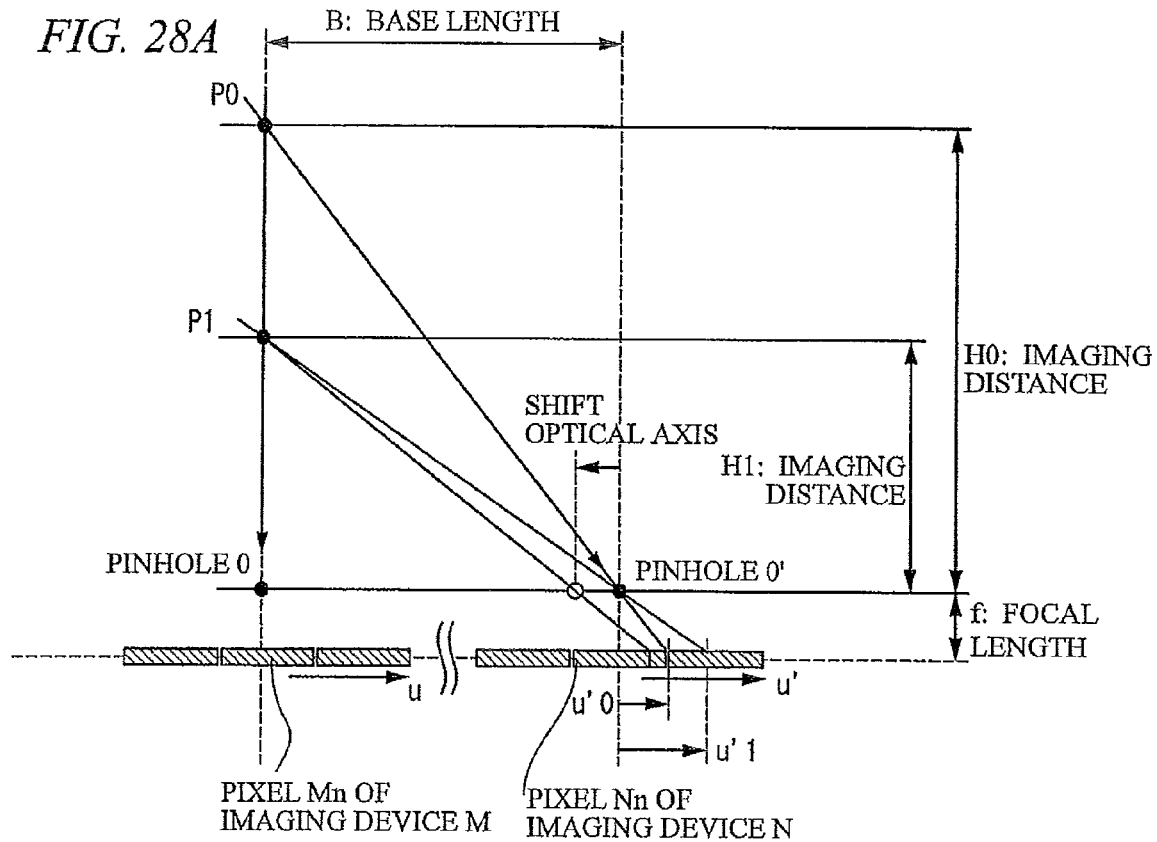
FIG. 28A is an explanatory diagram representing the relationship between an imaging distance and optical-axis shift.
Figure 28B:
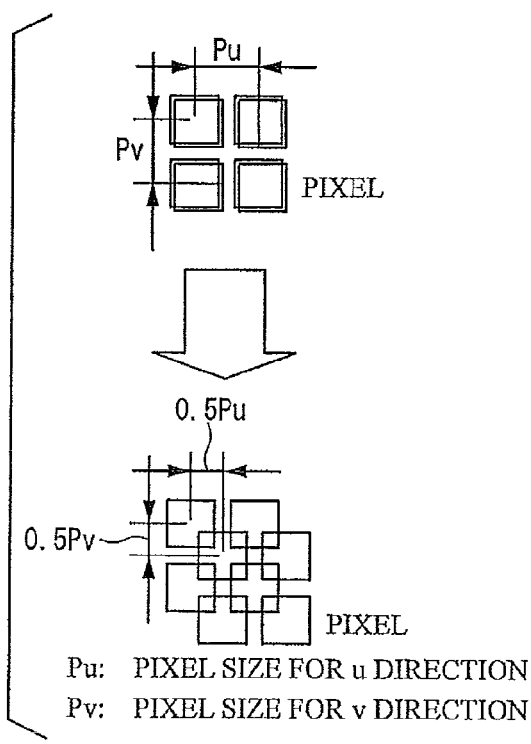
FIG. 28B is another explanatory diagram representing the relationship between an imaging distance and optical-axis shift.

Accordingly, as in FIG. 28A, by moving the optical axis by using the optical shifting mechanism when the subject P1 is imaged, as shown in FIG. 28B, it can be controlled to be in the ideal phase relationship. Accordingly, high resolution can be implemented by performing image shift. Here, in the method of acquiring information on the imaging distance, it is preferable that a distance measuring mechanism for measuring a distance is additionally included. Alternatively, the distance may be measured by the image pickup apparatus according to the present invention. An example in which a distance is measured by using a plurality of cameras (unit imaging units) is general for the measurement or the like. The capability of distance measurement is in proportion to the base length that is the distance between the cameras and the focal length of the camera and is in inverse proportion to the distance to the object to be measured.

The image pickup apparatus according to the present invention, for example, is configured to have eight eyes, that is, eight unit imaging units.

In a case where the measurement distance, that is, the distance from the subject is 500 mm, four cameras having relatively short distances (base length) between optical axes out of eight-eye cameras are assigned to the imaging and image shift processes, and the distance to the subject is measured by using the remaining four cameras having relatively long base lengths. In addition, in a case where the distance to the subject is 2000 mm so as to be far separated, it may be configured that a high resolution process of the image shift is performed by using eight eyes, and the distance measurement is performed by a process of determining the amount of defocusing, for example, by analyzing the imaged image and estimating the distance. In the case of the above-described 500 mm, for example, by combinedly using other distance measuring mechanism such as a TOF (Time of Flight), the accuracy of the distance measurement may be improved.

Figure 29A:
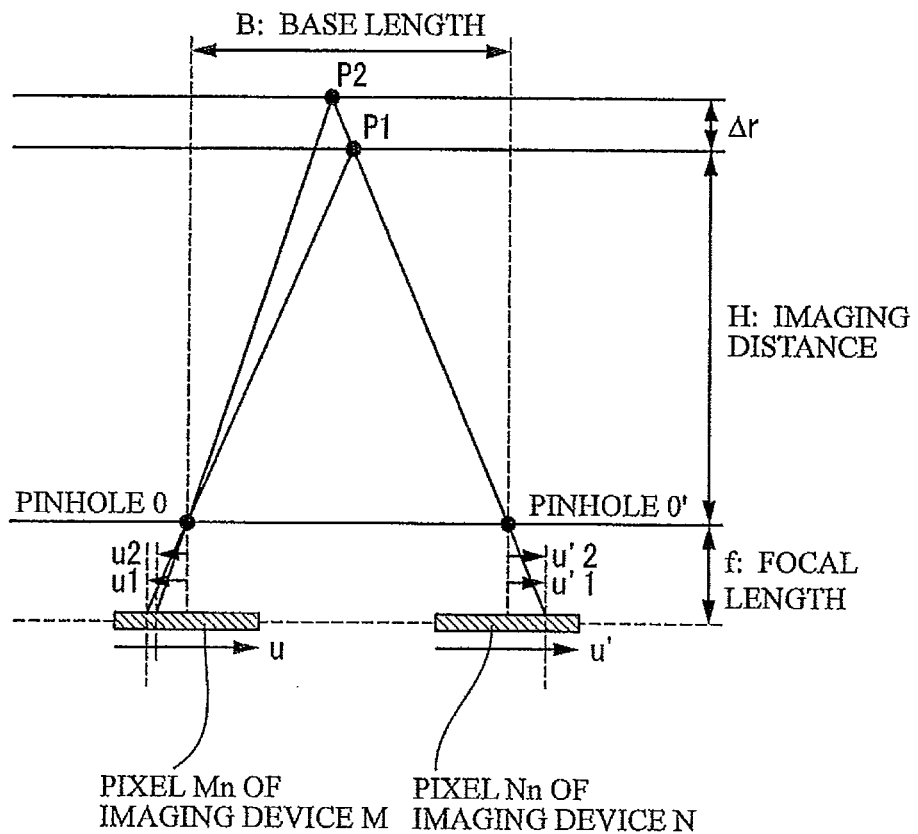
FIG. 29A is an explanatory diagram representing the effect of image shift due to a depth and optical-axis shift.
Figure 29B:
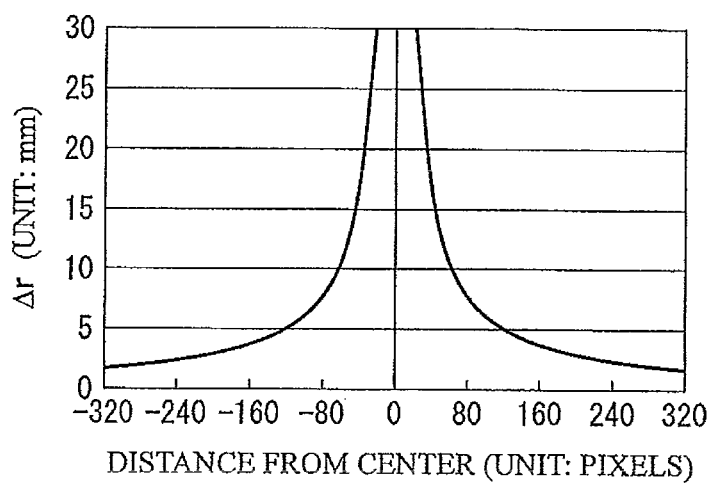
FIG. 29B is another explanatory diagram representing the effect of image shift due to a depth and optical-axis shift.

Next, the effect of image shifting acquired by shifting the depth and optical axis will be described with reference to FIGS. 29A and 29B. FIG. 29A is a schematic diagram illustrating imaging P1 and P2 in consideration of a depth Δr. A difference (u1−u2) in the distances from the respective optical axes is defined by Equation (22), $$(u1-u2)=\Delta r \times u1/H \qquad (22)$$

Here, u1−u2 is a value that is determined by the base length B, the imaging distance H, and the focal length f.

Here, such conditions B, H, and f are fixed so as to be regarded as constants. In addition, it is assumed that the ideal optical-axis relationship is maintained by the optical-axis shifting mechanism. The relationship between Δr and the position (a distance of the image imaged in the imaging device from the optical axis) of the pixel is as in Equation (23).

$$\Delta r=(u1-u2) \times H/u1 \qquad (23)$$

In other words, Δr is in the inversely proportional relationship with respect to u1. In addition, in FIG. 29B, the conditions for allowing the effect of the depth to be within the range of one pixel are derived as an example, assuming a case where the pixel size is 6 μm, the imaging distance is 600 mm, and the focal length is 5 mm. Under the conditions allowing the effect of the depth to be within the range of one pixel, the effect of image shifting is sufficient. For example, deterioration of the image shifting capability due to the depth can be avoided by setting differently in accordance with an application such as a narrowing the viewing angle.

As described above, video signals acquired by individual image pickup apparatuses can be composed as a high resolution video by performing optical-axis shift control of the liquid crystal lens.

In the description presented above, an example in which the liquid crystal lens is used for controlling the optical axis of light incident to the imaging device has been described. However, the optical-axis shift control for controlling the optical axis of light incident to the imaging device can be achieved by mechanism other than the non-solid lens such as a liquid crystal lens. Thus, hereinafter, other embodiments will be described.

Figure 30:
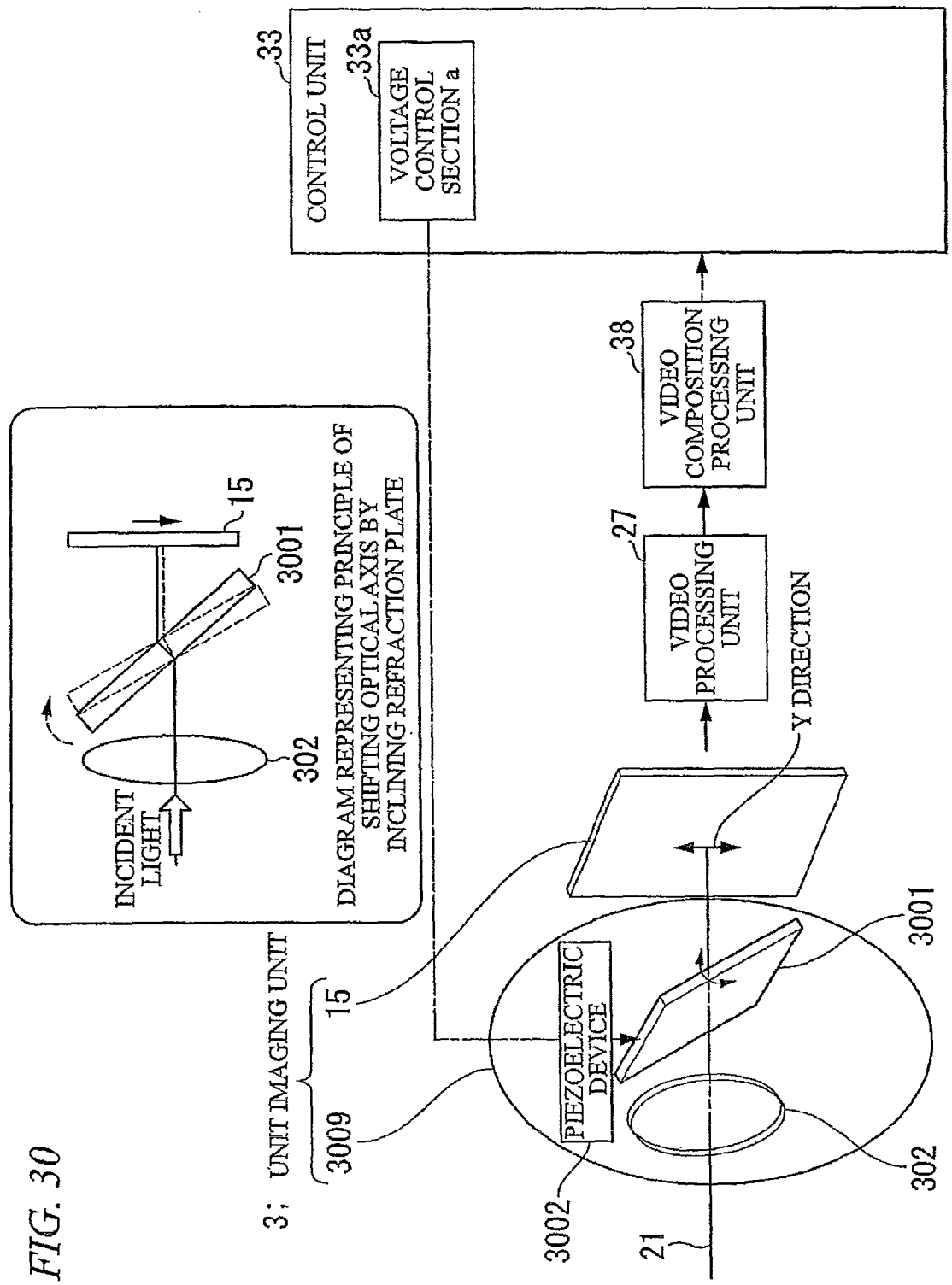
FIG. 30 is a configuration diagram representing the configuration for performing optical-axis shift control according to a second embodiment.

First, a second embodiment will be described with reference to FIG. 30. An image pickup apparatus according to the second embodiment is acquired by interposing refraction plates between a plurality of solid lenses and a plurality of imaging devices. FIG. 30 is a diagram showing a configuration in which the liquid crystal lens 301 of the unit imaging unit 3 shown in FIG. 2 is changed to be used, a refraction plate 3001, of which the incident surface and the outgoing surface are parallel to each other, is interposed between the solid lens 302 and the imaging device 15, and the optical axis is controlled by inclining the optical axis by using an inclination mechanism such as an actuator using a piezoelectric device 3002. As shown in "DIAGRAM REPRESENTING PRINCIPLE OF SHIFTING OPTICAL AXIS BY INCLINING REFRACTION PLATE" of FIG. 30, the shift amount of the optical axis is changed by the refraction plate 3001 in accordance with the inclination angle so as to change the position in which light is incident to the imaging device 15, whereby the optical axis can be shifted. However, the direction of the shift of the optical axis generated by inclining the refraction plate 3001 is the direction (in the figure, the Y direction) of only one axis.

Thus, by additionally disposing a refraction plate for shifting the optical axis in the X direction, the optical-axis shifting can be performed in the directions of two axes. Accordingly, the optical axis can be shifted in an arbitrary direction within the surface of the imaging device.

Next, a third embodiment will be described with reference to FIG. 31. An image pickup apparatus according to the third embodiment is acquired by using a plurality of variable apex-angle prism, a plurality of solid lenses, and a plurality of imaging devices.

Figure 31:
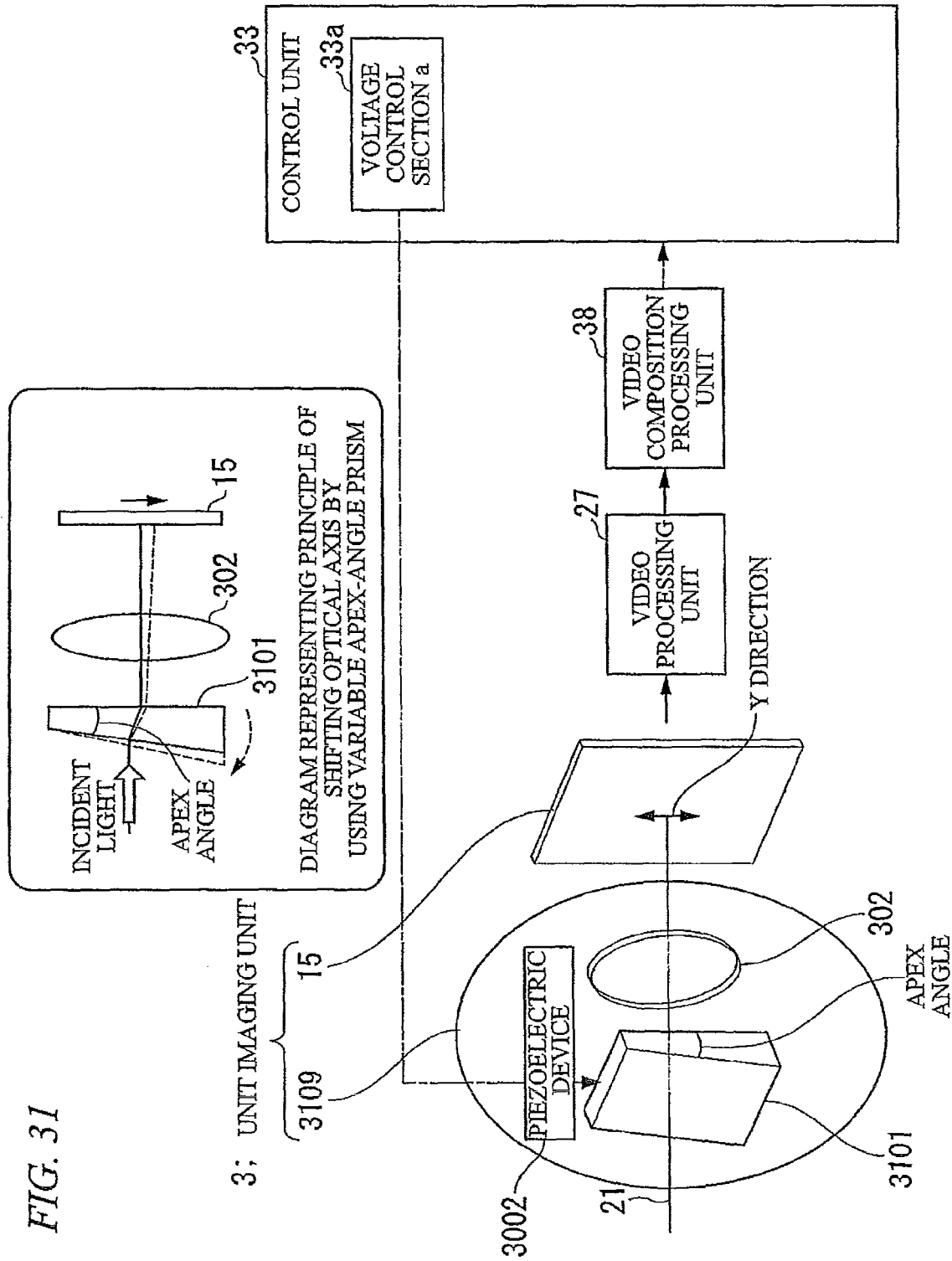
FIG. 31 is a configuration diagram representing the configuration for performing optical-axis shift control according to a third embodiment.

As shown in FIG. 31, by changing the apex angle of a variable apex-angle prism 3101 by using a mechanism such as an actuator using a piezoelectric device 3102, incident light is deflected. Accordingly, the position on the imaging device 15 in which an image is imaged by the solid lens 302 is changed, whereby the optical axis can be shifted. However, even in such a case, the direction of the shift of the optical axis is only in the direction (in the figure, the Y direction) of one axis as shown in FIG. 31. Thus, by additionally disposing a variable apex-angle prism for shifting the optical axis in the X direction, the optical axis can be shifted in an arbitrary direction.

Figure 32:
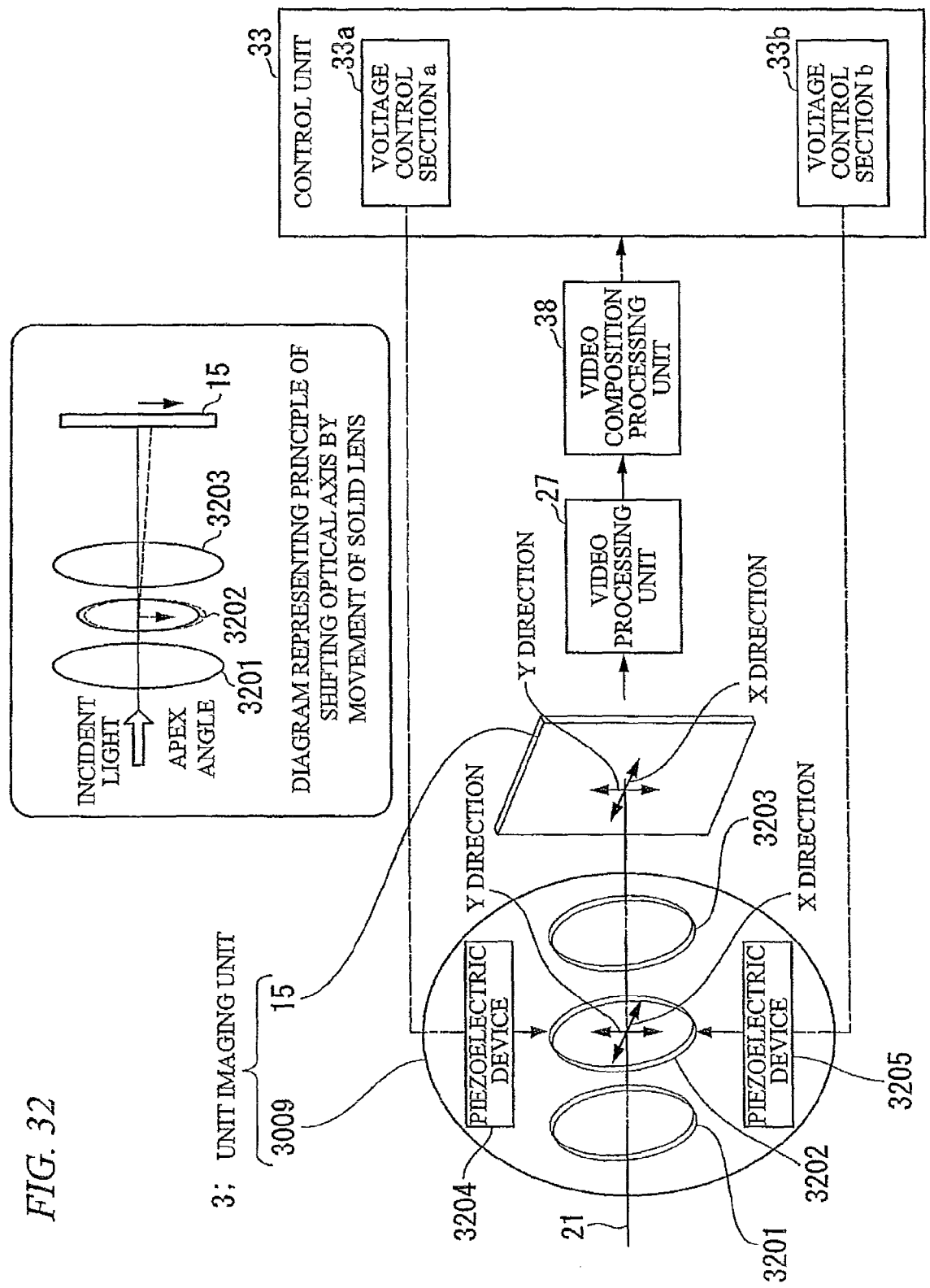
FIG. 32 is a configuration diagram representing the configuration for performing optical-axis shift control according to a fourth embodiment.

Next, a fourth embodiment will be described with reference to FIG. 32. According to an image pickup apparatus of the fourth embodiment, by using a plurality of solid lenses and a plurality of imaging imaging lenses, the whole or a part of the solid lens is moved in the direction approximately perpendicular to the optical axis by using a movement mechanism that is configured by an actuator using a plurality of piezoelectric devices or the like. In FIG. 32, an imaging lens 3209 is configured by three solid lenses 3201, 3202, and 3203, and the solid lens 3202 that is a part thereof is moved by using a movement mechanism configured by an actuator 3204 using a piezoelectric device that is movable in the X direction and a movement mechanism that is configured by an actuator using a piezoelectric device 3205 that is movable in the Y direction. As shown in "DIAGRAM REPRESENTING PRINCIPLE OF SHIFTING OPTICAL AXIS BY MOVEMENT OF SOLID LENS" of FIG. 32, by moving the solid lens 3202 that is a part of the imaging lens 3209, the incident light is deflected. Accordingly, the position on the imaging device 15 in which an image is imaged by the imaging lens 3209 is changed, whereby the optical axis can be shifted. By performing this operation in the X and Y directions, the optical axis can be independently shifted in the X and Y directions on the surface of the imaging device.

Figure 33:
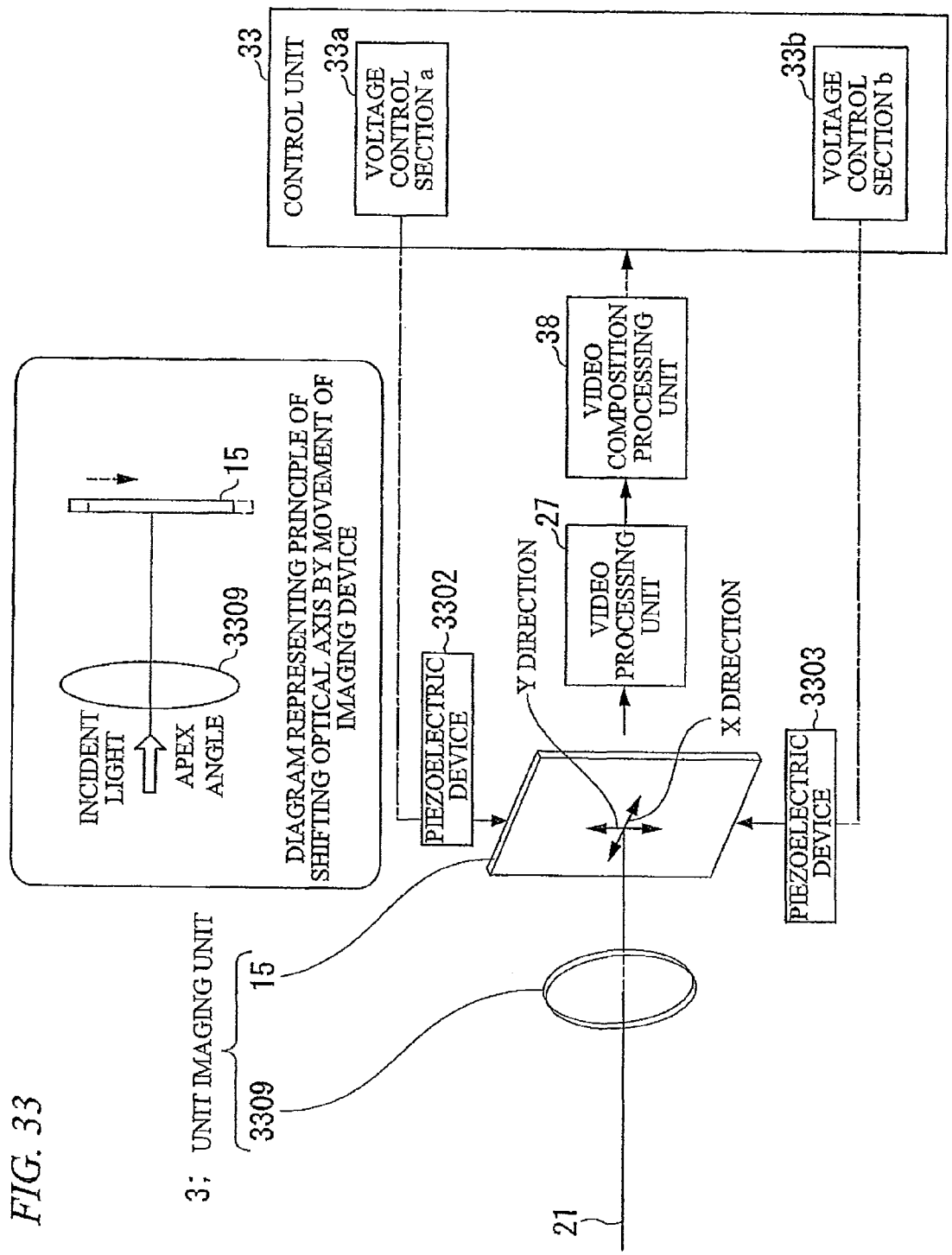
FIG. 33 is a configuration diagram representing the configuration for performing optical-axis shift control according to a fifth embodiment.

Next, a fifth embodiment will be described with reference to FIG. 33. According to an image pickup apparatus of the fifth embodiment, by using a plurality of solid lenses and a plurality of imaging devices, the plurality of imaging devices is directly moved by a movement mechanism configured by an actuator using a piezoelectric device or the like. In such a case, control of the shift amount of the optical axis is performed not for the imaging lens but for the imaging device 15. A configuration in which each of the imaging devices of the unit imaging units 2 to 7 of six systems shown in FIG. 1 is directly moved by a movement mechanism configured by an actuator using a piezoelectric device or the like is shown in FIG. 33. As shown in FIG. 33, the imaging device 15 is moved by the movement mechanism configured by an actuator using a piezoelectric device 3302 that moves in the X direction and a movement mechanism configured by an actuator using a piezoelectric device 3303 that moves in the Y direction, the imaging position on the imaging device 15 is moved, whereby the optical axis can be shifted independently in the X and Y directions.

In addition, in FIGS. 30 to 33, as the movement mechanism, the piezoelectric device is used as an actuator. However, this embodiment is not limited thereto. Thus, a mechanism such as a solenoid actuator using an electromagnetic force, an actuator using a motor and a gear mechanism, or an actuator using pressure can be used. In addition, the control mechanism is not limited to the voltage control. In addition, the direction of the shift of the optical axis is described as the direction of one axis or the directions of two axes. However, these embodiments are not limited thereto.

As described above, the non-solid lens such as a liquid crystal lens is changed to be used, and the optical-axis shift control according to another technique is performed. Accordingly, the degree of freedom of the configuration that realizes the optical-axis control can be increased. In particular, in a casing requiring lightness, thinness, shortness, and miniaturization like a cellular phone terminal, in a case where the lens diameter cannot be increased, and the focal length cannot be sufficiently acquired, an appropriate technique can be used in accordance with the layout of components configuring the cellular phone terminal.

Next, a sixth embodiment will be described with reference to FIGS. 34A and 34B. In the above-described first embodiment, there is a photographing distance at which high resolution cannot be implemented in accordance with the correspondence relationship between the photographing distance and the pixel pitch of the imaging devices. However, a case where the high resolution can be implemented by performing optical-axis shift as described above has been shown. Here, in a photographing distance at which the high resolution cannot be implemented in accordance with the correspondence relationship between the photographing distance and the pixel pitch, a case where high resolution can be implemented by performing focus shift, similarly to the optical-axis shift will be described.

Figure 34A:
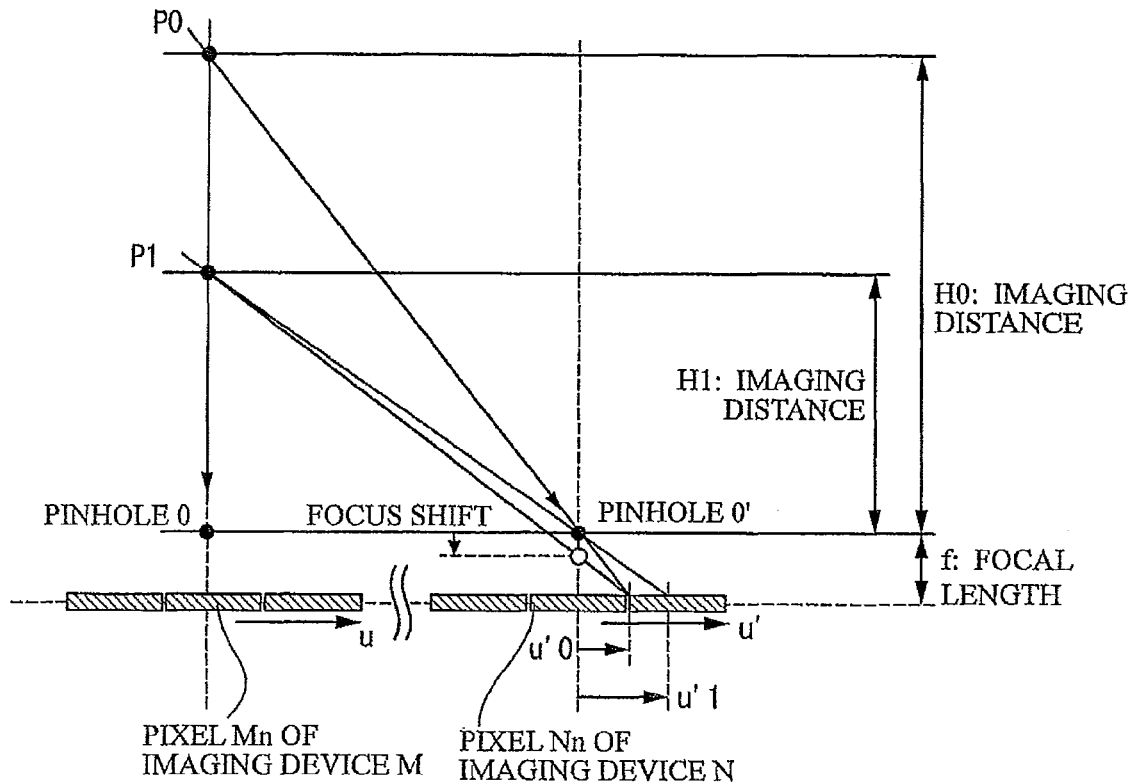
FIG. 34A is a configuration diagram representing the configuration for performing focus shift control according to a sixth embodiment.

FIG. 34A is a schematic diagram illustrating a subject that is changed from the state of being located at a point P0 with a photographing distance H0 to the state of being located at a point P1 with a distance H1. As shown in FIG. 34A, when the focal length is f, the point P0 is imaged at a center portion of a pixel Mn of an imaging device M, and is imaged in an end portion of a pixel Nn of an imaging device N. Accordingly, the image is imaged so as to be deviated by half pixel (u'0 shown in FIG. 34A). On the other hand, for the case of the point P1, the focal length is f and the imaging positions are deviated by one pixel (u'1 shown in FIG. 34A) from each other. Accordingly, the phases of pixels of the imaging device M and the imaging device N approximately coincide with each other. Thus, the state shown in FIG. 34B is formed. Accordingly, the phases of the pixels approximately coincide with each other, whereby high resolution cannot be implemented.

Figure 34B:
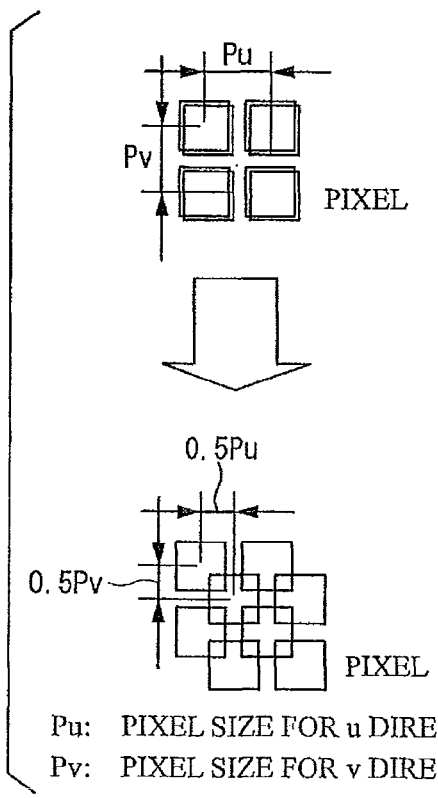
FIG. 34B is another configuration diagram representing the configuration for performing focus shift control according to the sixth embodiment.

Thus, as shown in FIG. 34A, as the focal point of the pinhole O' is shifted (the focal length f is shortened) in the direction of the imaging device N, the state shown on the upper side of FIG. 34B can be changed to the state shown on the lower side thereof. Accordingly, the pixels of the imaging device M and the imaging device N are deviated from each other by half pixel, whereby the optimal phase relationship can be formed. However, when the focal length f of the pinhole O' is shortened until the optimal phase relationship is formed, there is case where the image of the imaging device N ends up with being defocused. The purpose of shortening the focal length f of the pinhole O' is to avoid the state in which the phases of the pixels of the imaging device M and the imaging device N approximately coincide with each other. Accordingly, it is preferable that the focal length is moved in a range in which there is no defocusing of the image on the imaging device N.

Figure 35:
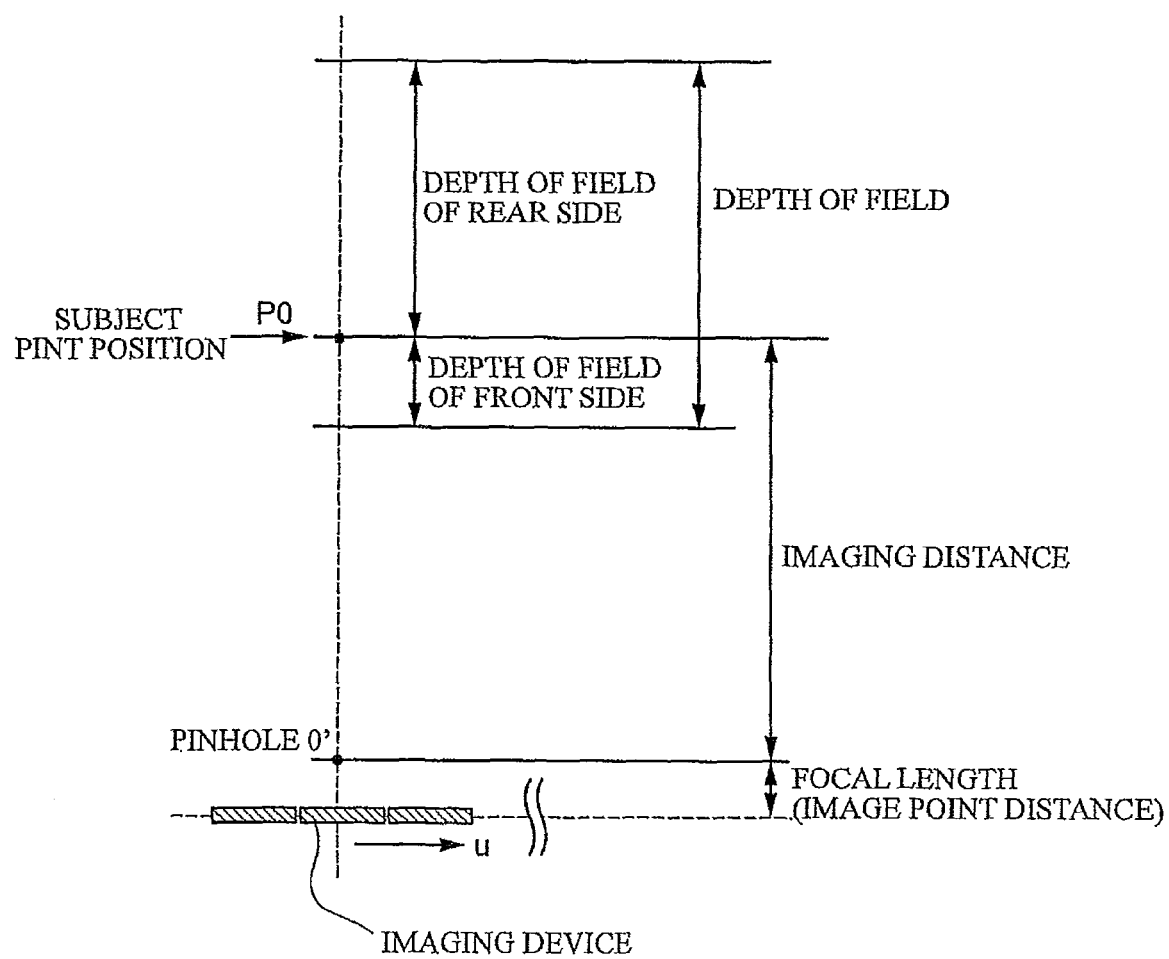
FIG. 35 is a configuration diagram representing the configuration for performing focus shift control according to the sixth embodiment.

The range in which defocusing does not occur on the image of the subject even when the pinhole O' is moved in the direction of the optical axis (the focal length is shortened or lengthened) will be described with reference to FIG. 35. The relationship among the movement amount (in the direction being located closer to the imaging device) of the pinhole O', the depth of field of the front-side, and the multiplication is as follows:

{movement amount of pinhole O'(shortening the focal length)}<(depth of field of front side/multiplication)  (24)

{movement amount of pinhole O'(lengthening the focal length)}<(depth of field of rear side/multiplication)  (25)

Here, following equations are defined.

(the depth of field of the front side)=(permissible circle of confusion)×(aperture value)×(imaging distance)²/{(focal length)²−(permissible circle of confusion)×(aperture value)×(photographing distance)}

(the depth of field of the rear side)={(permissible circle of confusion)×(aperture value)×(imaging distance)²{(focal length)²−(permissible circle of confusion)×(aperture value)×(photographing distance)}

(multiplication)={(imaging distance)/(image point distance)}≈{(imaging distance)/(focal length)}

(depth of field)={(depth of field of front side)+(depth of field of rear side)}

For example, when the focal length is 5 mm, the imaging distance is 600 mm, the permissible circle of confusion is 0.006 mm, and the aperture value is 2 mm, the following equations are defined.

(the depth of field of the front side)=132.2(mm)

(the depth of field of the rear side)=242.7(mm)

(the multiplication)=120

Accordingly, Equations (24) and (25) become:

{movement amount of pinhole O'(shortening the focal length)}<1.1(mm); and

{movement amount of pinhole O'(lengthening the focal length)}<2.0(mm).

By controlling the focal length of the pinhole O' within the range of this movement amount, similarly to a time when the optical-axis is shifted, high resolution can be implemented.

The change in the focal length (shift of the focal point) can be implemented by the liquid crystal lens 301 shown in FIG. 3. The refractive index distribution of the liquid crystal layer 306 may be freely changed in accordance with a method of applying voltages to the first electrode 303 and the second electrode 304. In such a case, the same voltage is applied to the electrodes 304a, 304b, 304c, and 304d shown in FIG. 3. Accordingly, the liquid crystal lens 301 works as a convex lens, and the focal length of the optical lens 302 shown in FIG. 2 can be changed.

In addition, in the image pickup apparatus 1 shown in FIG. 1, it may be configured such that image processing is performed for a plurality of videos acquired by the imaging devices 14 to 19 and the video processing units 26 to 31 by using the video composition processing unit 38, focus information is detected by reconfiguring the entire image, and an auto-focus function is operated by driving the liquid crystal lenses of each liquid crystal lens array through the control units 32 to 37. By controlling the liquid crystal lens 301 in association with the auto-focus function, a high-resolution image of a moving subject can be imaged.

Next, a seventh embodiment will be described with reference to FIG. 36. In the above-described embodiments, a configuration in which all the imaging devices having the same specifications are used, and the pixel pitches of the imaging devices 14 to 19 shown in FIG. 1 are the same. Accordingly, the state shown in the upper diagram of FIG. 34B is formed, the frequency at which the phases of the pixels coincide with each other increases, and there is a case where high resolution cannot be implemented.

According to the seventh embodiment, imaging devices having different pixel pitches are used as the six imaging devices 14 to 19 shown in FIG. 1.

Figure 36:
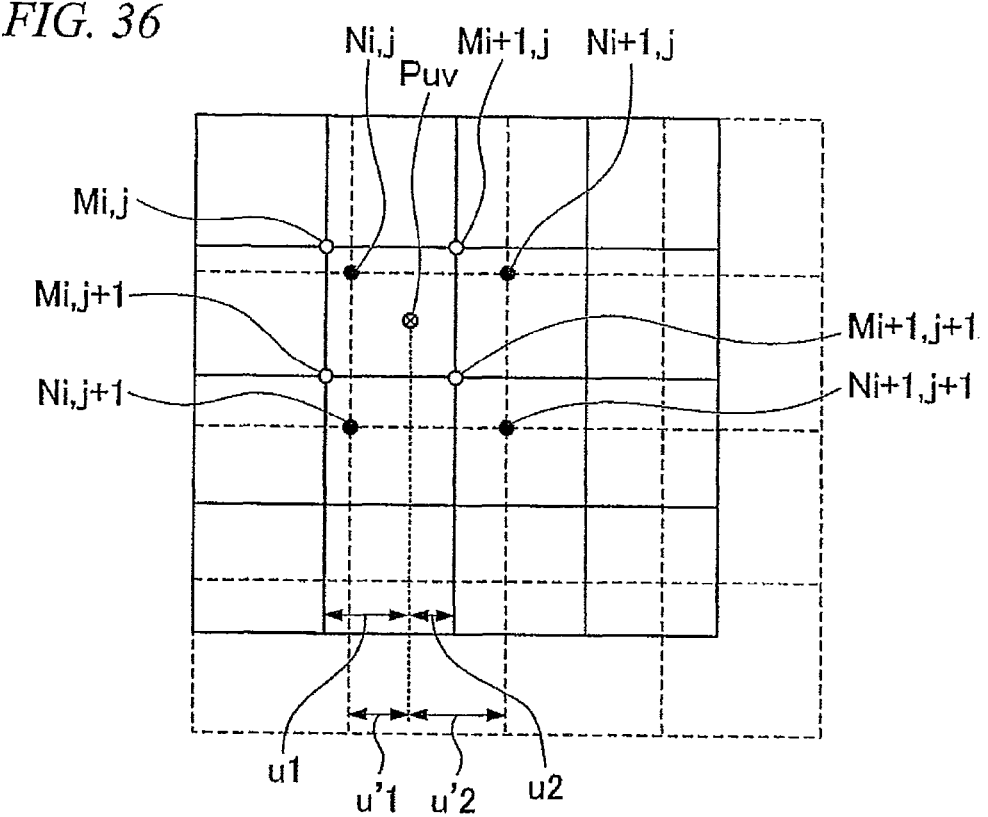
FIG. 36 is a configuration diagram representing the configuration of an imaging device according to a seventh embodiment.

In FIG. 36, intersections of solid lines represent the pixels of the imaging device M, and intersections of dotted lines represent the pixels of the imaging device N. The value of pixel Puv needed for implementing high resolution can be acquired by performing a filter operation by using weighting coefficients according to the distance between (pixel Mi,j, Ni,j), (pixel Mi,j+1, Ni,j+1), (pixel Mi+1,j, Ni+1,j), and (pixel Mi+1, j+1, Ni+1, j+1), which are located on the periphery of the pixel Puv, and the pixel Puv. For example, when a cubic (third-order approximation) filter is used, the weighting w acquired from a pixel located at a distance d is as in the following equation.

$$w = 1 - 2 \times d^2 + d^3 (0 \le d < 1)$$
$$= 4 - 8 \times d + 5 \times d^2 - d^3 (1 \le d < 2)$$
$$= 0 (2 \le d)$$

Next, a modified example of the seventh embodiment will be described. In the above-described seventh embodiment, the imaging devices having different pixel pitches are used as the six imaging devices. However, by optically changing the imaging multiplication by using the six imaging devices having the same pixel pitch, the pixel pitch of the imaging devices may be changed. In other words, in a case where the pixel pitches of the imaging device N and the imaging device N are the same, by changing (enlarging or reducing) the multiplication of the imaging lens of the imaging device M, the image formed on the imaging device M is enlarged or reduced. Accordingly, the phases of the pixels approximately coinciding with each other can be avoided.

Next, another modified example of the seventh embodiment will be described with reference to FIG. 37. In the imaging devices shown in FIG. 37, one imaging device (imaging device N) is disposed to be fixed by being rotated around the periphery of the axis parallel to the optical axis with a predetermined position used as a fulcrum point (for example, a corner of the imaging device that is located on the upper left side) with respect to the other imaging device (imaging device M). Even in such a case, similarly to the case shown in FIG. 36, the pixel positions in the direction of the u axis and the v axis are different from each other. Accordingly, it can be avoided that the phases of the pixel pitches coincide with each other. For example, in a case where one imaging device (imaging device N) is rotated by θ within the light sensing surface of the imaging device, when the pixel pitch of the imaging device N in the direction of the u' axis is p, the pixel pitch p' of the imaging device M in the direction of the u axis (the direction of the u' axis of the imaging device N) is as defined in the following equation.

$$p' = p/\cos\theta$$

In addition, the imaging device may be disposed by being rotated within a plane formed by the axis (optical axis) perpendicular to the light sensing surface of the imaging device N and the u' axis.

As described above, by configuring the pixel pitches of the six imaging devices 14 to 19 shown in FIG. 1 to be different from one another, it can be avoided that the phases of the pixels approximately coincide with each other. Accordingly, a case where high resolution cannot be implemented can be avoided.

Figure 37:
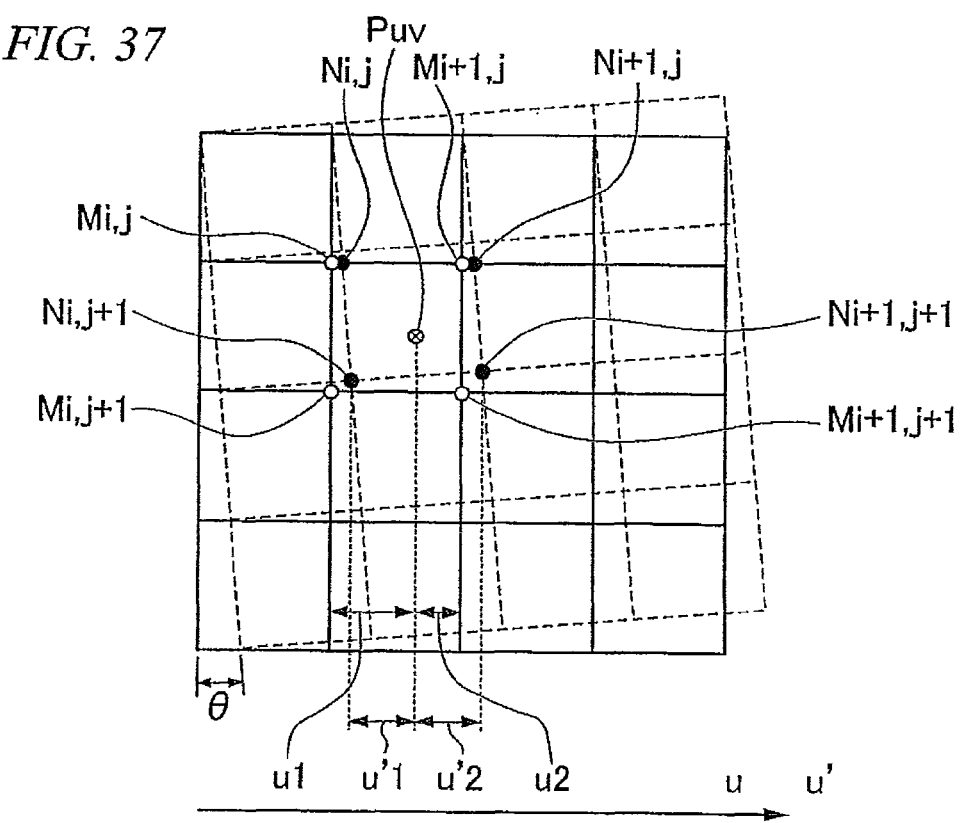
FIG. 37 is a configuration diagram representing the configuration of an imaging device according to a modified example of the seventh embodiment.
Figure 38:
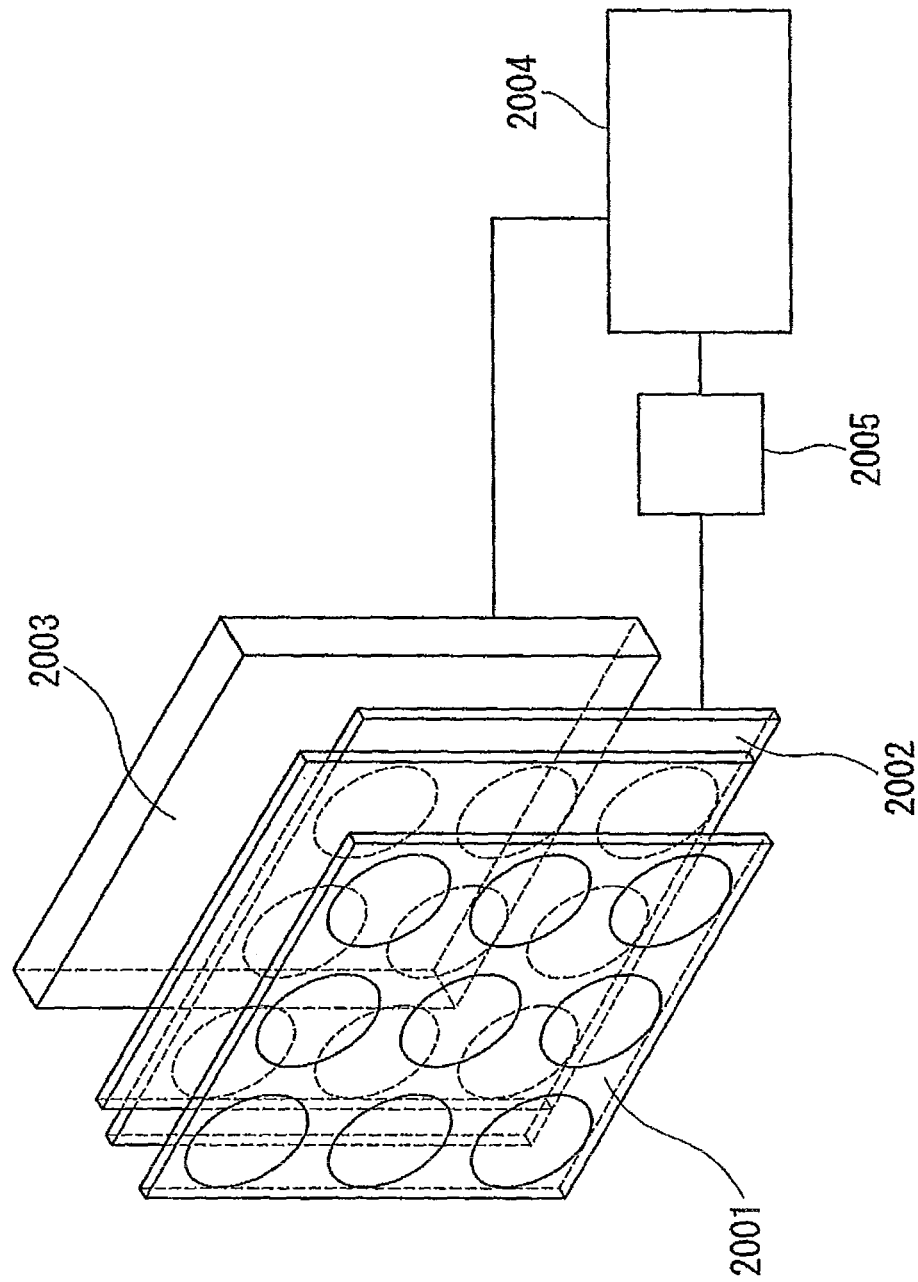
FIG. 38 is a block diagram representing the configuration of a conventional image pickup apparatus.
Figure 39:
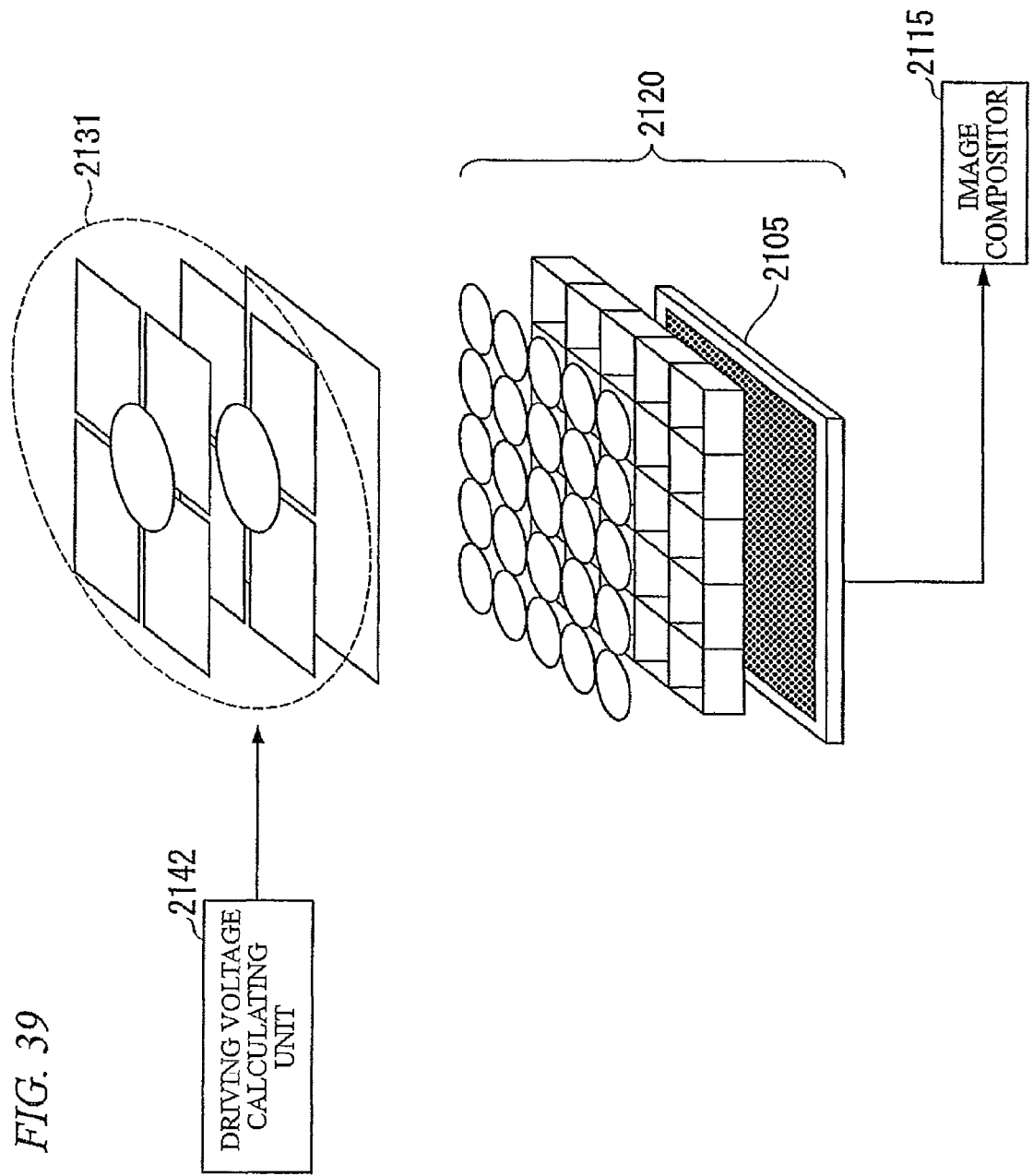
FIG. 39 is a block diagram representing the configuration of another conventional image pickup apparatus.

In addition, as shown in FIGS. 36 and 37, the high-resolution may be implemented by combining disposing the imaging devices such that the pixel pitches of the imaging devices 14 to 19 are different from one another and the above-described operation of controlling the direction of the optical axis. Accordingly, an image having high resolution can be acquired in an easy manner.

As described above, conventionally, deterioration of the image quality occurs due to crosstalk on the imaging device, and accordingly, it is difficult to implement high image quality. However, according to an image pickup apparatus of the present invention, occurrence of crosstalk can be prevented by controlling the optical axis of light incident to the imaging device, whereby an image pickup apparatus having high image quality can be implemented. In addition, since a conventional image pickup apparatus takes in an image imaged on the imaging device by performing image processing, the resolution of the imaging device needs to be increased more than the needed imaging resolution. However, according to the image pickup apparatus of the present invention, control not only for setting the direction of the optical axis of the liquid crystal lens but also for setting the optical axis of light incident to the imaging device to an arbitrary position can be performed. Accordingly, the size of the imaging device can be decreased, and the imaging device can be built in a cellular phone terminal requiring lightness, thinness, shortness, and miniaturization or the like.

The invention claimed is:

1. An image pickup apparatus comprising:
a plurality of imaging devices;
a plurality of solid lenses configured to respectively form an image on the plurality of the imaging devices;
a plurality of non-solid lenses configured to respectively form the image on the plurality of the imaging devices, and to respectively be changed a refractive index distribution thereof;
a video composition processing unit configured to generate a video signal by composing image signals output by the plurality of the imaging devices; and
a control unit configured to control an optical axis of a light entering at least one of the plurality of the imaging devices by changing the refractive index distribution of at least one of the plurality of the non-solid lenses such that an energy of first frequency for the video signal becomes greater than a predetermined threshold value, wherein the first frequency is higher than a second frequency, and the second frequency is maximum frequency imageable by the at least one of the plurality of the imaging devices.

2. The image pickup apparatus according to claim 1, wherein the control unit is configured to:
obtain, from the video signal, energies of each frequency by a Fourier transform;
obtain, again, the energies of each frequency by the Fourier transform by changing the refractive index distribution of the at least one of the plurality of the non-solid lenses, in case that the energy of the first frequency is smaller than the predetermined threshold value; and
control the optical axis of the light entering the at least one of the plurality of the imaging devices by changing the refractive index distribution of the at least one of the plurality of the non-solid lenses until the energy of the first frequency is greater than the predetermined threshold value.

3. The image pickup apparatus according to claim 1, wherein the control unit is configured to control a direction of the optical axis of the light entering the at least one of the imaging devices, the control being made based on a relative positional relationship with a known imaging target.

4. The image pickup apparatus according to claim 1, wherein a first pixel pitch in one imaging device among the plurality of the imaging devices is different from a second pixel pitch in another imaging device among the plurality of the imaging devices.

5. The image pickup apparatus according to claim 1, wherein one imaging device and another imaging device among the plurality of the imaging devices are disposed by being rotated around the optical axis with different angles.

6. The image pickup apparatus according to claim 1, wherein a first focal length of one solid lens among the plurality of the solid lenses is different from a second focal length of another solid lens among the plurality of the solid lenses.

7. The imaging pickup apparatus according to claim 1, wherein the control unit is configured to change an apparent focal length of the plurality of the solid lenses by changing the refractive index distribution of the at least one of the plurality of the non-solid lenses.

8. An optical-axis control method comprising:
generating a video signal by composing image signals output by a plurality of imaging devices on which a plurality of solid lenses respectively form an image; and
controlling an optical axis of a light entering at least one of the plurality of the imaging devices by changing a refractive index distribution of at least one of a plurality of non-solid lenses whose refractive index distribution is changeable, the plurality of the non-solid lenses forming the image on the plurality of the imaging devices, such that an energy of first frequency for the video signal becomes greater than a predetermined threshold value, wherein the first frequency is higher than a second frequency, and the second frequency is a maximum frequency imageable by the at least one of the plurality of the imaging devices.

9. An optical-axis control method according to claim 8, wherein the control is performed to control a direction of the optical axis of the light entering the at least one of the imaging devices, the control being made based on a relative positional relationship with a known imaging target.

10. An optical-axis control method according to claim 8, wherein the control is performed to change an apparent focal length of the plurality of the solid lenses by changing the refractive index distribution of the at least one of the plurality of the non-solid lenses.

* * * * *